United States Patent
Park et al.

(10) Patent No.: US 11,538,482 B2
(45) Date of Patent: Dec. 27, 2022

(54) INTELLIGENT VOICE ENABLE DEVICE SEARCHING METHOD AND APPARATUS THEREOF

(71) Applicant: LG Electronics Inc., Seoul (KR)

(72) Inventors: Heewan Park, Seoul (KR); Donghoon Yi, Seoul (KR); Yuyong Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 565 days.

(21) Appl. No.: 16/603,054

(22) PCT Filed: Apr. 25, 2019

(86) PCT No.: PCT/KR2019/005021
§ 371 (c)(1),
(2) Date: Oct. 4, 2019

(87) PCT Pub. No.: WO2020/218645
PCT Pub. Date: Oct. 29, 2020

(65) Prior Publication Data
US 2022/0051677 A1  Feb. 17, 2022

(51) Int. Cl.
*G10L 15/00* (2013.01)
*G10L 15/30* (2013.01)
*G10L 15/22* (2006.01)
*G10L 15/08* (2006.01)
*G10L 15/02* (2006.01)

(52) U.S. Cl.
CPC .............. *G10L 15/30* (2013.01); *G10L 15/22* (2013.01); *G10L 15/02* (2013.01); *G10L 15/08* (2013.01)

(58) Field of Classification Search
CPC combination set(s) only.
See application file for complete search history.

(56) References Cited

U.S. PATENT DOCUMENTS

2018/0189258 A1   7/2018   Bhaya et al.

FOREIGN PATENT DOCUMENTS

| KR | 1020190007504 | 1/2019 |
| KR | 1020190014569 | 2/2019 |
| WO | WO2017213684 | 12/2017 |
| WO | WO2018005334 | 1/2018 |

*Primary Examiner* — Vu B Hang
(74) *Attorney, Agent, or Firm* — Fish & Richardson P.C.

(57) ABSTRACT

An intelligent voice enable device searching method and apparatus are disclosed. A method for searching a plurality of voice enable devices according to one embodiment of the present disclosure includes receiving first device information from a first device receiving a wake-up voice; searching a first account associated with the first device based on the first device information; searching devices of a first group registered in the first account; searching a second account associated with a second device other than the first device among the devices of the first group; searching devices of a second group registered in the second account; searching devices of a third group sharing an IP address with the devices of the first group or the devices of the second group; and selecting a voice enable device to respond to the wake-up voice among the devices of the first group, the second group, and the third group. The method has an effect that a device that responds to a wake-up voice may be searched more accurately than in a conventional approach.

14 Claims, 44 Drawing Sheets

(a)

Repetition "on"

(b)

Repetition "off"
CRI feedback (a) In-band system (b) Guard-band system (c) Stand-alone system

INTELLIGENT VOICE ENABLE DEVICE SEARCHING METHOD AND APPARATUS THEREOF

CROSS-REFERENCE TO RELATED APPLICATIONS

This application is a National Stage application under 35 U.S.C. § 371 of International Application No. PCT/KR2019/005021, filed on Apr. 25, 2019. The disclosure of the prior application is incorporated by reference in its entirety.

TECHNICAL FIELD

The present disclosure relates to a voice enable device searching method and apparatus. More particularly, the present disclosure relates to a voice enable device searching method and apparatus capable of accurately searching a target device without fail.

BACKGROUND ART

A voice recognition device is a device for voice recognition. In recent years, thanks to the development of mobile communication technology, a variety of technologies have been developed to recognize a wake-up voice uttered by the user and to control IoT (Internet of Things) equipment or devices using the result of analyzing the voice.

For example, if a user utters a wake-up voice to wake up an IoT device (for example, "Hi LG"), IoT devices around the user receive the wake-up voice and analyze the wake-up voice in the form of a voice signal. If it is determined that the corresponding wake-up voice is a wake-up signal for waking up the corresponding IoT device itself, the corresponding IoT device is ready to receive another command from the user, that is, to perform wake-up.

In the conventional case, when a plurality of IoT devices within a range capable of receiving a user's wake-up voice receive an wake-up voice and transmit an audio signal recognizing the wake-up voice to the server in response thereto, the server creates a candidate device group and selects an enable device to respond to the voice from among the devices in the group.

However, among the devices transmitting the audio signals to the server, there is a device that recognizes a wake-up voice other than the wake-up voice uttered by the same speaker. Thus, it is inaccurate to determine the candidate device group. Further, there is a disadvantage in that a device may not recognize the wake-up voice due to a mechanical error even though the user intends to wake-up the device, or may fail to transmit an audio signal recognizing the wake-up voice to the server.

DISCLOSURE

Technical Problem

An object of the present disclosure is to meet the needs and solve the problems.

Further, the present disclosure aims to implement a method and apparatus for searching a voice enable device to more precisely search and select a device intended to wake-up by the user without error.

Technical Solution

In a first aspect of the present disclosure, there is provided a method for searching a plurality of voice enable devices included in a single communication network, the method comprising: receiving first device information from a first device receiving a wake-up voice; searching a first account associated with the first device based on the first device information; searching devices of a first group registered in the first account; searching a second account associated with a second device other than the first device among the devices of the first group; searching devices of a second group registered in the second account; searching devices of a third group sharing an IP address with the devices of the first group or the devices of the second group; and selecting a voice enable device to respond to the wake-up voice among the devices of the first group, the second group, and the third group.

In one implementation of the first aspect, the first device information includes at least one of a device ID of the first device, an IP address shared by the first device, and a first audio signal generated by the first device recognizing the wake-up voice.

In one implementation of the first aspect, the method comprises: receiving a second audio signal from a second device within a threshold time duration after receiving the first device information; when the second device is included in the first group, the second group, or the third group, determining whether a speaker of the second audio signal is identical with a speaker of the first audio signal; and when the speaker of the second audio signal is identical with the speaker of the first audio signal, selecting the voice enable device among the devices of the first group, the second group and the second device.

In one implementation of the first aspect, the method comprises: when the second device is not included in the first group, the second group, or the third group, or when the speaker of the second audio signal is not identical with the speaker of the first audio signal, generating a fourth group including the second device; and selecting a voice enable device to respond to the second audio signal among devices of the fourth group.

In one implementation of the first aspect, the method comprises: searching a plurality of third accounts associated with the second device; searching a plurality of third devices registered in the plurality of third accounts; searching a plurality of the fourth devices sharing an IP address with the plurality of third devices; and selecting a voice enable device to respond to the wake-up voice among the plurality of third devices and the plurality of fourth devices.

In one implementation of the first aspect, determining whether the speaker of the second audio signal is identical with the speaker of the first audio signal includes applying Gaussian mixture model (GMM), support vector machine (SVM), or deep neural network (DNN) to the first audio signal and the second audio signal.

In one implementation of the first aspect, the method comprises deleting each of the first group, the second group, the third group and the fourth group after a threshold time duration has elapsed after each of the first group, the second group, the third group and the fourth group has been generated.

In a first aspect of the present disclosure, there is provided an apparatus for searching a plurality of voice enable devices, the apparatus comprising: a communication unit for receiving first device information from a first device receiving a wake-up voice; and a processor configured for: searching a first account associated with the first device based on the first device information; searching devices of a first group registered in the first account; searching a second account associated with a second device other than the first device among the devices of the first group; searching devices of a second group registered in the second account; searching devices of a third group sharing an IP address with the devices of the first group or the devices of the second group; and selecting a voice enable device to respond to the wake-up voice among the devices of the first group, the second group, and the third group.

In one implementation of the second aspect, the first device information includes at least one of a device ID of the first device, an IP address shared by the first device, and a first audio signal generated by the first device recognizing the wake-up voice.

In one implementation of the second aspect, the processor is configured for: receiving a second audio signal from a second device within a threshold time duration after receiving the first device information; when the second device is included in the first group, the second group, or the third group, determining whether a speaker of the second audio signal is identical with a speaker of the first audio signal; and when the speaker of the second audio signal is identical with the speaker of the first audio signal, selecting the voice enable device among the devices of the first group, the second group and the second device.

In one implementation of the second aspect, the processor is configured for: when the second device is not included in the first group, the second group, or the third group, or when the speaker of the second audio signal is not identical with the speaker of the first audio signal, generating a fourth group including the second device; and selecting a voice enable device to respond to the second audio signal among devices of the fourth group.

In one implementation of the second aspect the processor is configured for: searching a plurality of third accounts associated with the second device; searching a plurality of third devices registered in the plurality of third accounts; searching a plurality of the fourth devices sharing an IP address with the plurality of third devices; and selecting a voice enable device to respond to the wake-up voice among the plurality of third devices and the plurality of fourth devices.

In one implementation of the second aspect the processor is configured for applying Gaussian mixture model (GMM), support vector machine (SVM), or deep neural network (DNN) to the first audio signal and the second audio signal.

In one implementation of the second aspect the processor is configured for deleting each of the first group, the second group, the third group and the fourth group after a threshold time duration has elapsed after each of the first group, the second group, the third group and the fourth group has been generated.

Advantageous Effects

The voice enable device searching method and apparatus according to one embodiment of the present disclosure has the effect of more accurately searching a voice enable device to respond to a wake-up voice.

Further, the voice-enabled device searching method and apparatus according to one embodiment of the present disclosure can compare candidate devices without exception.

Further, the voice-enabled device searching method and apparatus according to one embodiment of the present disclosure can include all devices registered in a plurality of different accounts into the candidate device group based on a wake-up voice recognition result and analyze the candidate device group.

Further, the voice-enabled device searching method and apparatus according to one embodiment of the present disclosure has the advantage that only one device responds to one wake-up voice as the user intends.

DETAILED DESCRIPTIONS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus may be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Autonomous Vehicle and 5G Network

Figure 1:
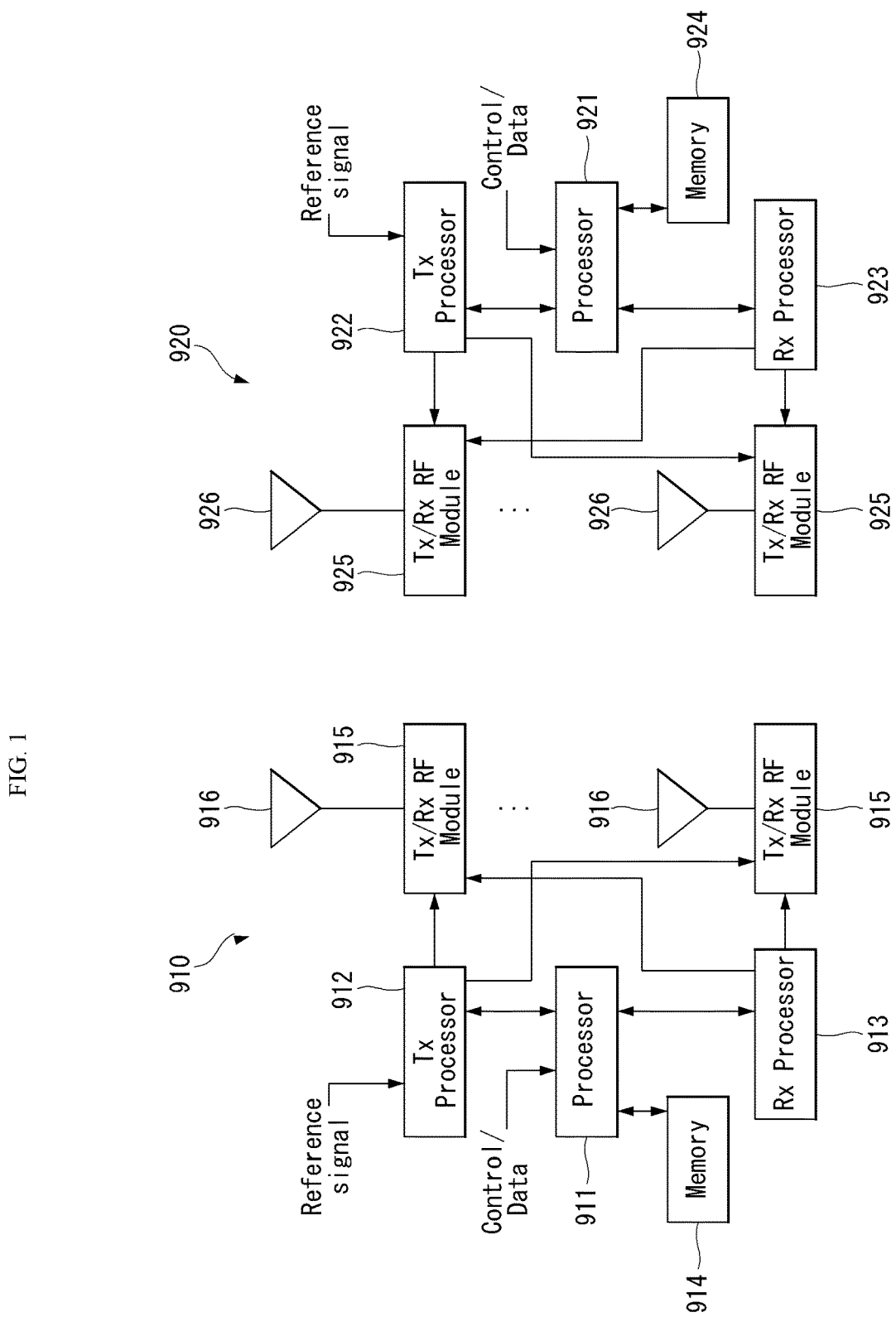
FIG. 1 is a block diagram of a wireless communication system to which the methods proposed herein may be applied.

FIG. 1 is a block diagram of a wireless communication system to which methods proposed in the disclosure are applicable.

Referring to FIG. 1, a device including an autonomous driving module is defined as a first communication device (910 of FIG. 1 and see paragraph N for detailed description), and a processor 911 may perform detailed autonomous driving operations.

Another vehicle or a 5G network communicating with the autonomous driving device is defined as a second communication device (920 of FIG. 1, and see paragraph N for details), and a processor 921 may perform detailed autonomous driving operations.

Details of a wireless communication system, which is defined as including a first communication device, which is an autonomous vehicle, and a second communication device, which is a 5G network, may refer to paragraph N.

B. AI Operation Using 5G Communication

Figure 2:
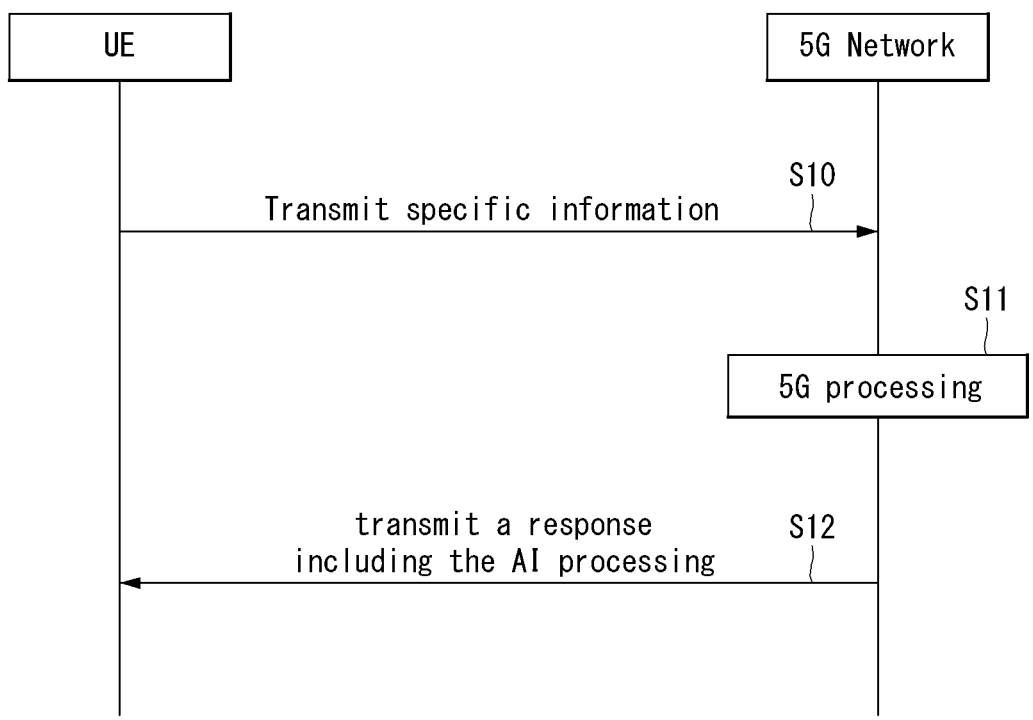
FIG. 2 shows an example of a basic operation of an user equipment and a 5G network in a 5G communication system.

FIG. 2 shows an example of a basic operation of a user equipment and a 5G network in a 5G communication system.

The UE transmits the specific information transmission to the 5G network (S1).

Then, the 5G network performs 5G processing on the specific information (S2).

In this connection, the 5G processing may include AI processing.

Then, the 5G network transmits a response including the AI processing result to the UE (S3).

Figure 3:
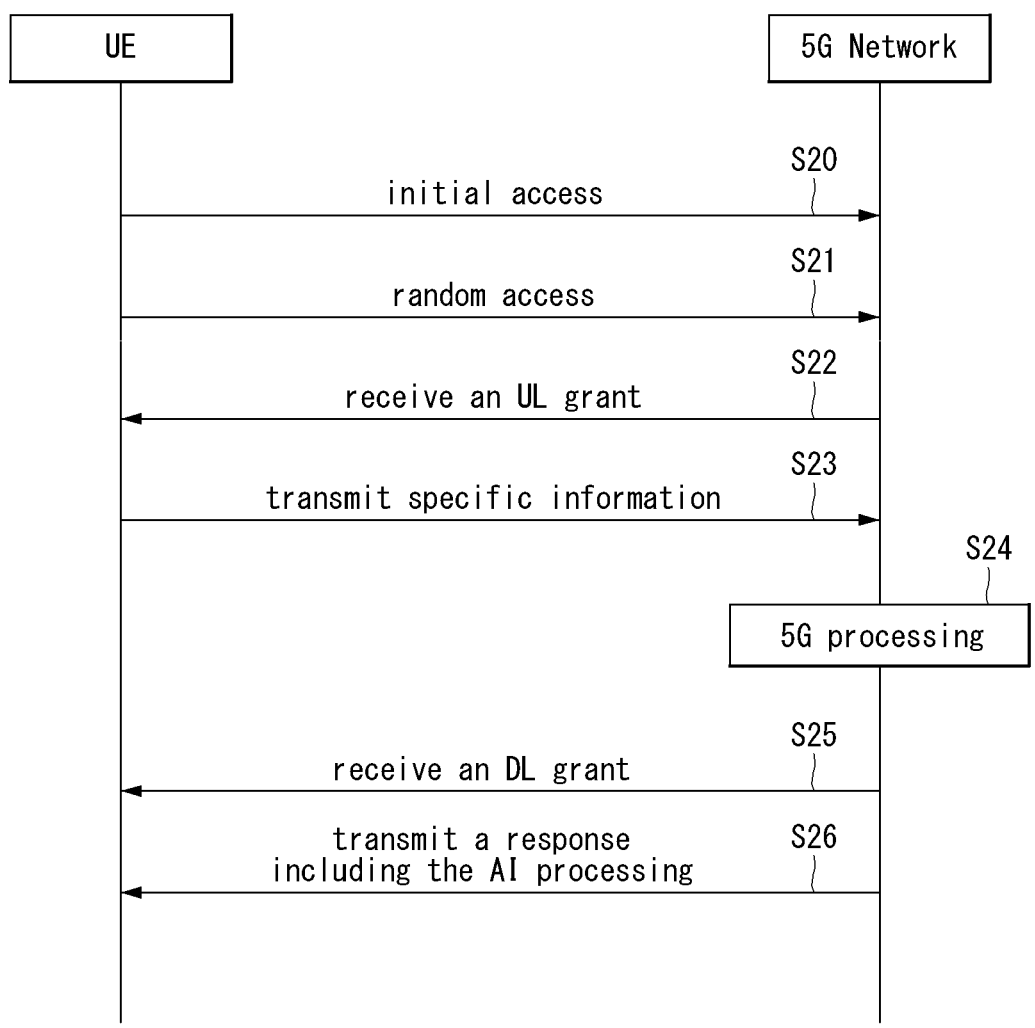
FIG. 3 illustrates an example of application operation of an user equipment and a 5G network in a 5G communication system.

FIG. 3 shows an example of application operation of a user terminal and a 5G network in a 5G communication system.

The UE performs an initial access procedure with the 5G network (S20). The initial connection procedure will be described in more detail in paragraph F.

Then, the UE performs a random access procedure with the 5G network (S21). The random access procedure will be described in more detail in paragraph G.

The 5G network transmits an UL grant for scheduling transmission of specific information to the UE (S22). The process of the UE receiving the UL grant will be described in more detail in the UL transmission/reception operation in paragraph H.

Then, the UE transmits specific information to the 5G network based on the UL grant (S23).

Then, the 5G network performs 5G processing on the specific information (S24).

In this connection, the 5G processing may include AI processing.

Then, the 5G network transmits a DL grant for scheduling transmission of the 5G processing result of the specific information to the UE (S25).

Then, the 5G network transmits a response including the AI processing result to the UE based on the DL grant (S26).

In FIG. 3, an example in which the AI operation and the initial connection process, or the random access process and the DL grant reception process are combined with each other has been exemplarily described using the S20 to S26. However, the present disclosure is not limited thereto.

For example, the initial connection process and/or the random access process may be performed using the process of S20, S22, S23, S24, and S24. In addition, the initial connection process and/or the random access process may be performed using, for example, the process of S21, S22, S23, S24, and S26. Further, the AI operation and the downlink grant reception procedure may be combined with each other using the process of S23, S24, S25, and S26.

C. UE Operation Using 5G Communication

FIG. 4 to FIG. 7 show an example of the operation of the UE using 5G communication.

Figure 4:
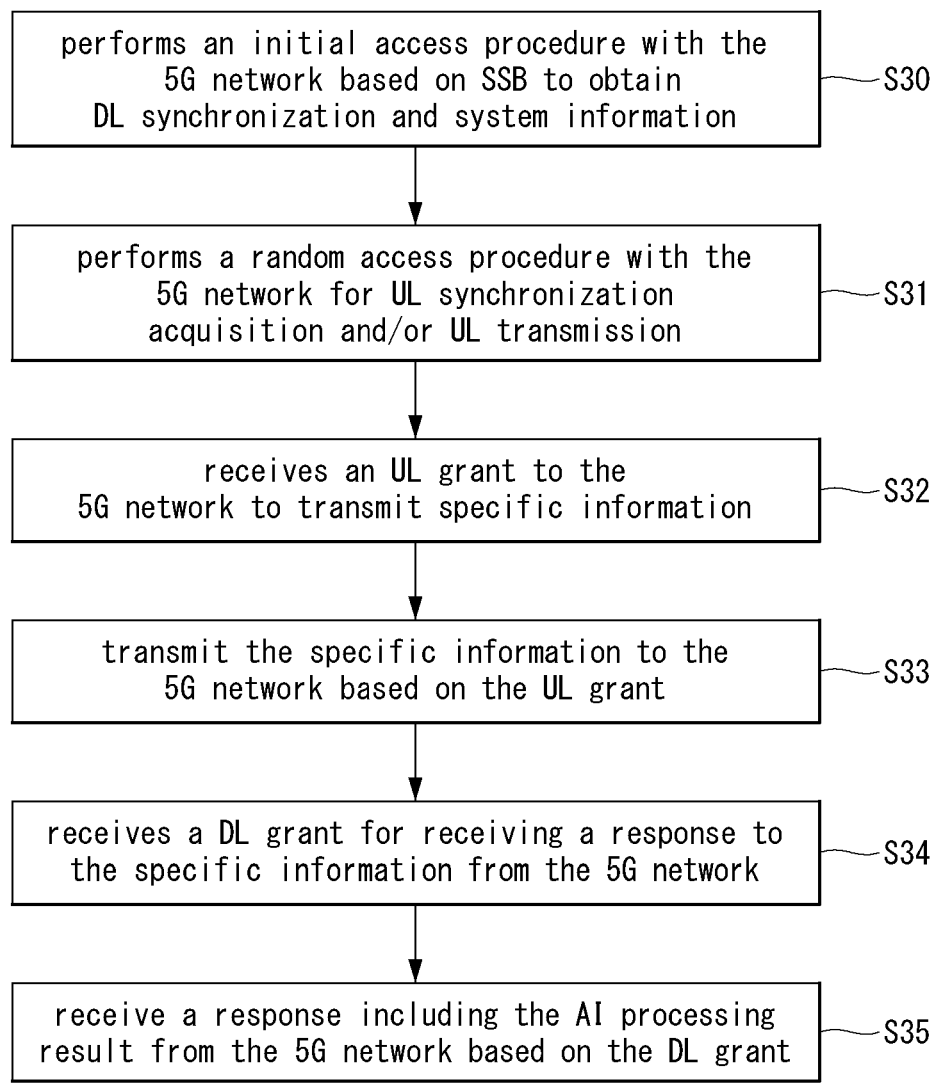
FIGS. 4 to 7 show an example of an operation of an user equipment using 5G communication.

Referring first to FIG. 4, the UE performs an initial access procedure with the 5G network based on SSB to obtain DL synchronization and system information (S30).

Then, the UE performs a random access procedure with the 5G network for UL synchronization acquisition and/or UL transmission (S31).

Then, the UE receives an UL grant to the 5G network to transmit specific information (S32).

Then, the UE transmits the specific information to the 5G network based on the UL grant (S33).

Then, the UE receives a DL grant for receiving a response to the specific information from the 5G network (S34).

Then, the UE receives a response including the AI processing result from the 5G network based on the DL grant (S35).

A beam management (BM) process may be added to S30. A beam failure recovery process may be added to S31. A quasi-co location relationship may be added to S32 to S35. A more detailed description thereof will be described in more detail in paragraph I.

Figure 5:
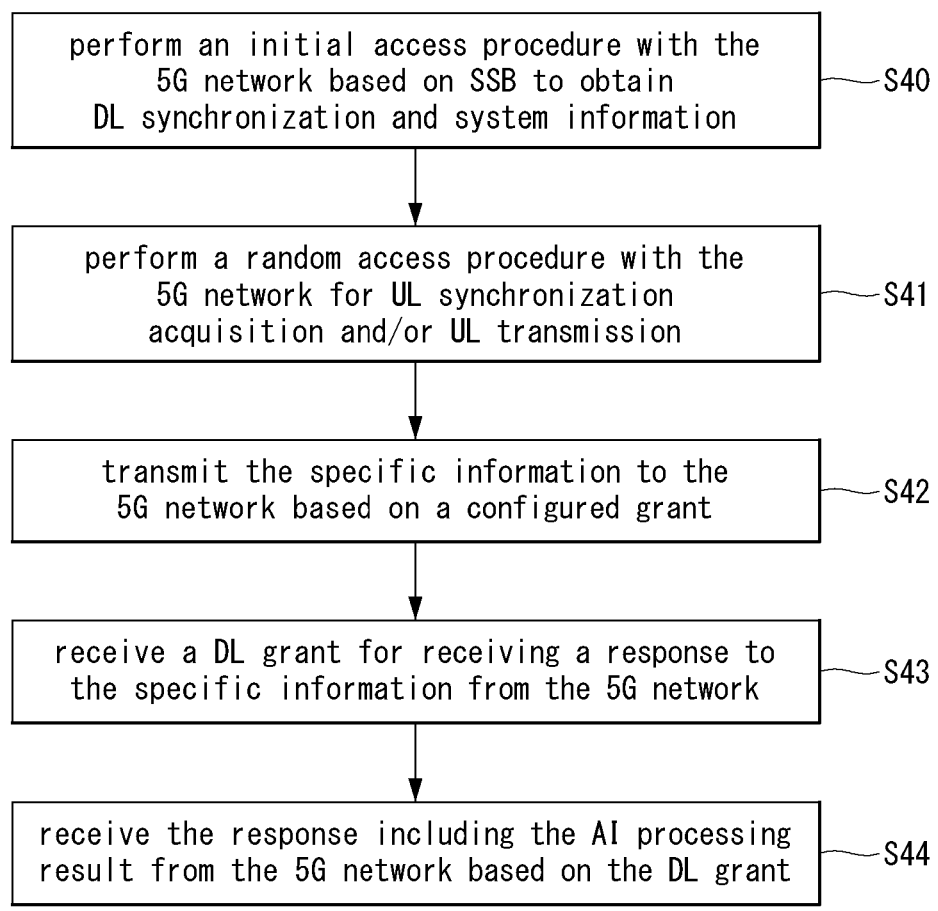

Next, referring to FIG. 5, the UE performs an initial access procedure with the 5G network based on SSB to obtain DL synchronization and system information (S40).

Then, the UE performs a random access procedure with the 5G network for UL synchronization acquisition and/or UL transmission (S41).

Then, the UE transmits the specific information to the 5G network based on a configured grant (S42). A procedure for configuring the grant in place of receiving the UL grant from the 5G network will be described in more detail in paragraph H.

Then, the UE receives a DL grant for receiving a response to the specific information from the 5G network (S43).

Then, the UE receives the response including the AI processing result from the 5G network based on the DL grant (S44).

Figure 6:
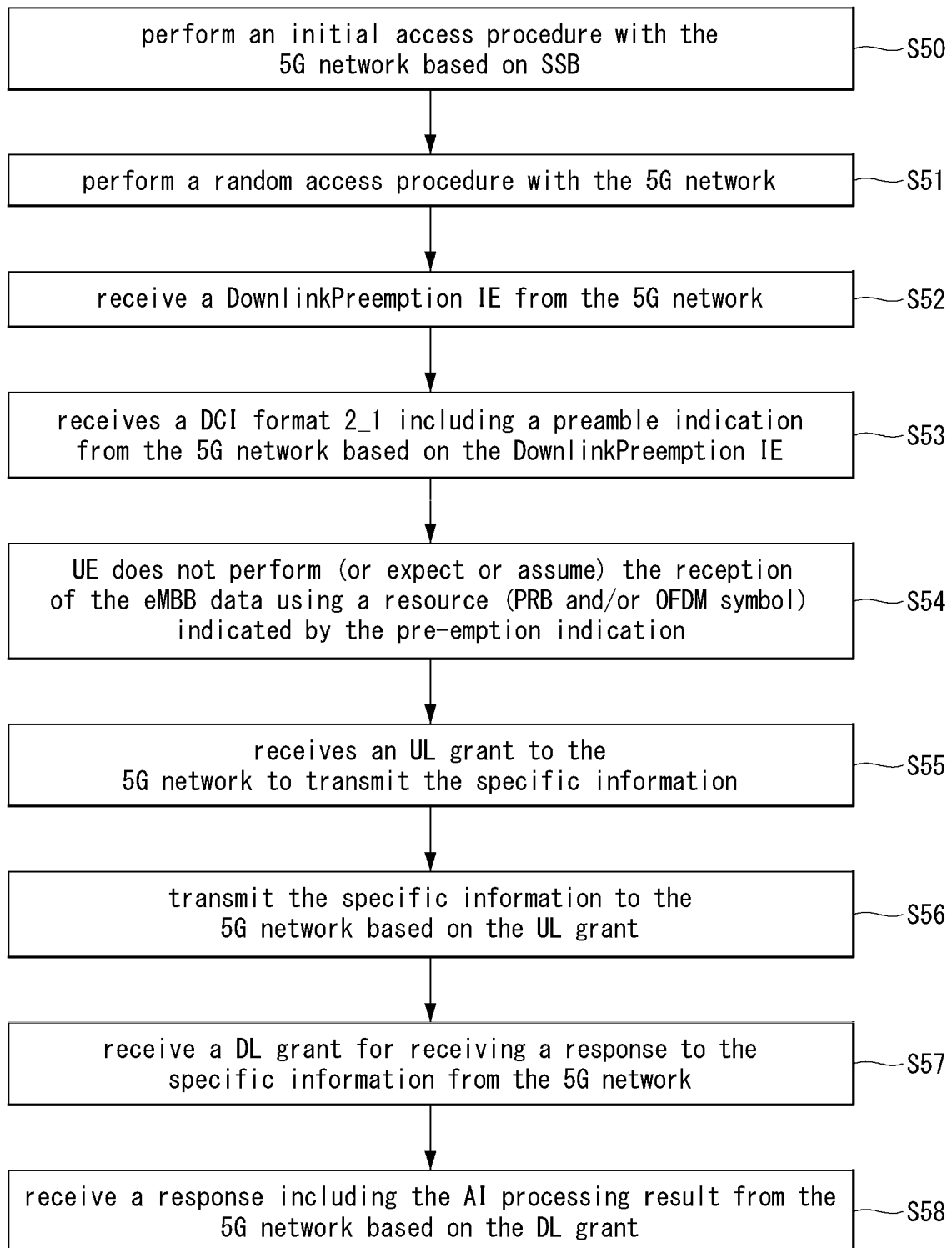

Next, referring to FIG. 6, the UE performs an initial access procedure with the 5G network based on the SSB to obtain DL synchronization and system information (S50).

Then, the UE performs a random access procedure with the 5G network for UL synchronization acquisition and/or UL transmission (S51).

Then, the UE receives a DownlinkPreemption IE from the 5G network (S52).

The UE receives a DCI format 2_1 including a preamble indication from the 5G network based on the DownlinkPreemption IE (S53).

Then, the UE does not perform (or expect or assume) the reception of the eMBB data using a resource (PRB and/or OFDM symbol) indicated by the pre-emption indication (S54).

The operation related to the preemption indication is described in more detail in paragraph J.

Then, the UE receives an UL grant to the 5G network to transmit the specific information (S55).

Then, the UE transmits the specific information to the 5G network based on the UL grant (S56).

Then, the UE receives a DL grant for receiving a response to the specific information from the 5G network (S57).

Then, the UE receives a response including the AI processing result from the 5G network based on the DL grant (S58).

Figure 7:
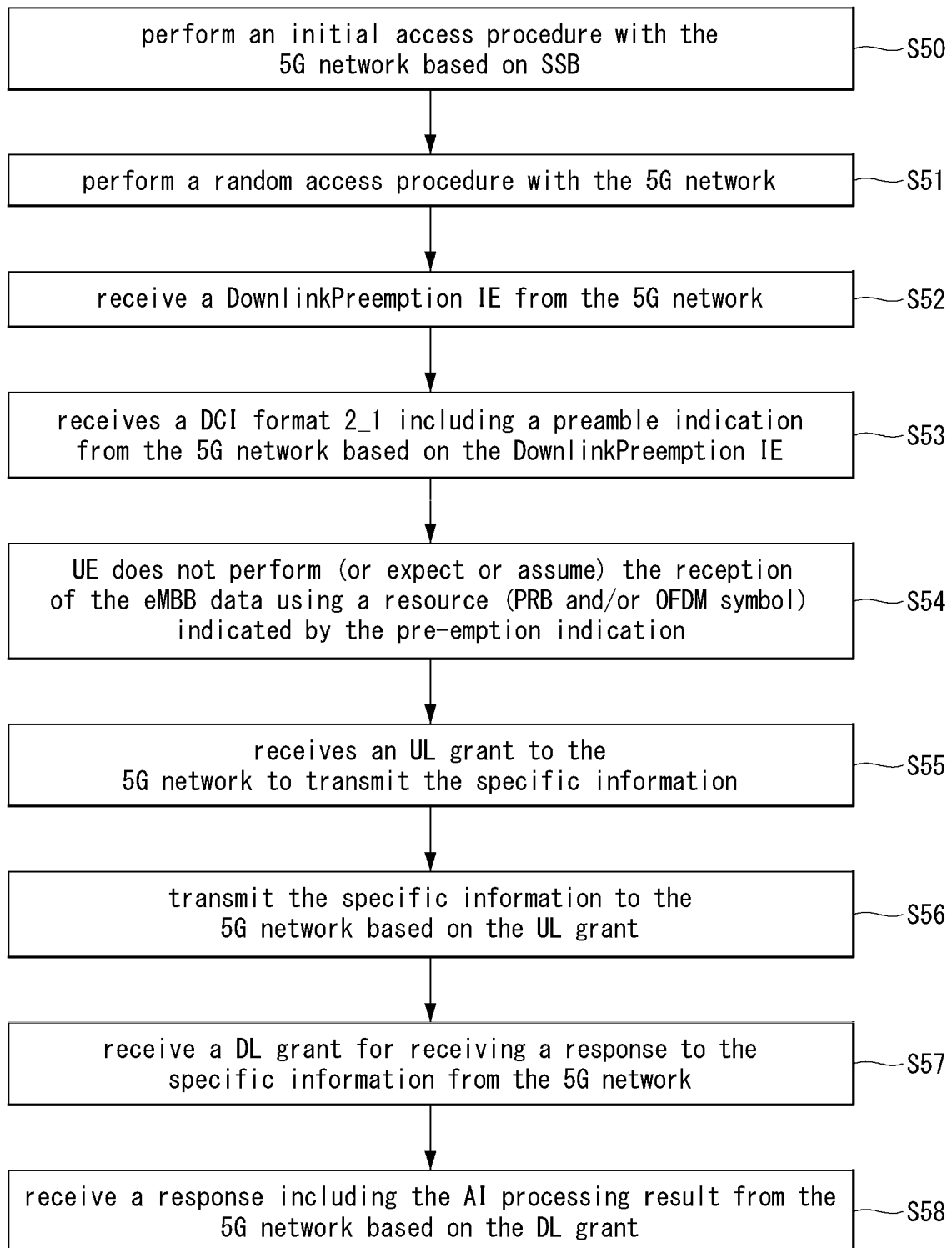

Next, referring to FIG. 7, the UE performs an initial access procedure with the 5G network based on SSB to obtain DL synchronization and system information (S60).

Then, the UE performs a random access procedure with the 5G network for UL synchronization acquisition and/or UL transmission (S61).

Then, the UE receives an UL grant to the 5G network to transmit the specific information (S62).

The UL grant includes information on the number of repetitions of transmission of the specific information. The specific information is repeatedly transmitted based on the information on the repetition number (S63).

The UE transmits the specific information to the 5G network based on the UL grant.

Then, the iterative transmission of the specific information is performed using the frequency hopping. The first transmission of the specific information may be done using a first frequency resource, and the second transmission of the specific information may be done using a second frequency resource.

The specific information may be transmitted over a narrow band of 6RB (Resource Block) or 1RB (Resource Block).

Then, the UE receives a DL grant for receiving a response to the specific information from the 5G network (S64).

Then, the UE receives a response including the AI processing result from the 5G network based on the DL grant (S65).

The mMTC described in FIG. 7 will be described in more detail in the paragraph K.

D. Introduction

Hereinafter, downlink (DL) refers to communication from a base station (BS) to user equipment (UE), and uplink (UL) refers to communication from a UE to a BS. In the downlink, a transmitter may be part of the BS and a receiver may be part of the UE. In the uplink, a transmitter may be part of the UE and a receiver may be part of the BS. Herein, the UE may be represented as a first communication device and the BS may be represented as a second communication device. The BS may be replaced with a term such as a fixed station, a Node B, an evolved NodeB (eNB), a next generation nodeB (gNB), a base transceiver system (BTS), an access point (AP), a network or a 5G (5th generation), artificial intelligence (AI) system, a road side unit (RSU), robot, and the like. Also, the UE may be replaced with a terminal, a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, and the like.

Techniques described herein may be used in a variety of wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3rd Generation Partnership Project (3GPP) Long Term Evolution (LTE) is a part of Evolved UMTS (E-UMTS) using E-UTRA. LTE-Advanced (LTE-A)/LTE-A pro is an evolution of 3GPP LTE. 3GPP NR NR(New Radio or New Radio Access Technology) is an evolution of 3GPP LTE/LTE-A/LTE-A pro.

For clarity, the following description focuses on a 3GPP communication system (e.g., LTE-A, NR), but technical features of the present disclosure is not limited thereto. LTE refers to technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP 5G (5th generation) technology refers to technology after TS 36.xxx Release 15 and technology after TS 38.XXX Release 15. The technology after TS 38.xxx Release 15 may be referred to as 3GPP NR, and technology after TS 36.xxx Release 15 may be referred to as enhanced LTE. "xxx" refers to a standard document detail number. LTE/NR may be collectively referred to as a 3GPP system.

In this disclosure, a node refers to a fixed point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a power level lower than a power level of a BS. At least one antenna is installed per node. The antenna may refer to a physical antenna or refer to an antenna port, a virtual antenna, or an antenna group. A node may be referred to as a point.

In this specification, a cell refers to a prescribed geographical area to which one or more nodes provide a communication service. A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times.

In this specification, communicating with a specific cell may refer to communicating with a BS or a node which provides a communication service to the specific cell. In addition, a DL/UL signal of a specific cell refers to a DL/UL signal from/to a BS or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between a BS or node which provides a communication service to the specific cell and a UE.

Meanwhile, a "cell" associated with radio resource may be defined as a combination of DL resources and UL resources, that is, a combination of a DL component carrier (CC) and a UL CC. A cell may be configured to be a DL resource alone or a combination of DL resources and UL resources. If carrier aggregation is supported, a linkage between a carrier frequency of a DL resource (or DL CC) and a carrier frequency of a UL resource (or UL CC) may be indicated by system information transmitted through a corresponding cell. Here, the carrier frequency may be the same as or different from a center frequency of each cell or CC. Hereinafter, a cell operating at a primary frequency will be referred to as a primary cell (Pcell) or a PCC, and a cell operating at a secondary frequency will be referred to as a secondary cell (Scell) Or SCC. The Scell may be configured after the UE performs a radio resource control (RRC) connection establishment with the BS to establish an RRC connection therebetween, that is, after the UE is RRC_CONNECTED. Here, RRC connection may refer to a channel through which an RRC of the UE and an RRC of the BS may exchange RRC messages with each other. The Scell may be configured to provide additional radio resources to the UE. Depending on the capabilities of the UE, the Scell may form a set of serving cells for the UE together with the Pcell. In the case of a UE which is in the RRC_CONNECTED state but is not configured in carrier aggregation or does not support carrier aggregation, there is only one serving cell that is only configured as the Pcell.

Cells support unique wireless access technologies. For example, transmission/reception according to LTE radio access technology (RAT) is performed on an LTE cell, and transmission/reception according to 5G RAT is performed on a 5G cell.

A carrier aggregation (CA) system refers to a system for supporting a wide bandwidth by aggregating a plurality of carriers each having a narrower bandwidth than a target bandwidth. A CA system is different from OFDMA technology in that DL or UL communication is performed using a plurality of carrier frequencies each of which forms a system bandwidth (or a channel bandwidth), whereas the OFDM system carries a base frequency band divided into a plurality of orthogonal subcarriers on a single carrier frequency to perform DL or UL communication. For example, in the case of OFDMA or orthogonal frequency division multiplexing (OFDM), one frequency band having a constant system bandwidth is divided into a plurality of subcarriers having a certain subscriber spacing, and information/data is mapped in the plurality of subcarriers, and the frequency band to which the information/data is mapped is unconverted and transmitted as a carrier frequency of the frequency band. In the case of wireless carrier aggregation, frequency bands having their own system bandwidth and carrier frequency may be simultaneously used for communication, and each frequency band used for carrier aggregation may be divided into a plurality of subcarriers having a predetermined subcarrier spacing.

The 3GPP-based communication standard defines DL physical channels corresponding to resource elements carrying information derived from a higher layer of a physical layer (e.g., a medium access control (MAC) layer, a radio link control (RLC) layer, a packet data convergence protocol (PDCP) layer, a radio resource control (RRC) layer, a service data adaptation protocol (SDAP), and a non-access stratum (NAS) layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), and a physical downlink control channel (PDCCH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS, a positioning RS (PRS), channel state information RS (CSI-RS), and a demodulation reference signal (DMRS) may be defined as DL RSs. Meanwhile, the 3GPP-based communication standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In this specification, a physical downlink control channel (PDCCH) and a physical downlink shared channel (PDSCH) may refer to a set of a time-frequency resources or a set of resource elements carrying downlink control information (DCI) and downlink data, respectively. In addition, a physical uplink control channel, a physical uplink shared channel (PUSCH), and a physical random access channel refer to a set of a time-frequency resources or a set of resource elements carrying uplink control information (UCI), uplink data and random access signals, respectively. Hereinafter, UE's transmitting an uplink physical channel (e.g., PUCCH, PUSCH, or PRACH) means transmitting UCI, uplink data, or a random access signal on the corresponding uplink physical channel or through then uplink physical channel. BS's receiving an uplink physical channel may refer to receiving DCI, uplink data, or random access signal on or through the uplink physical channel. BS's transmitting a downlink physical channel (e.g., PDCCH and PDSCH) has the same meaning as transmitting DCI or downlink data on or through the corresponding downlink physical channel. UE's receiving a downlink physical channel may refer to receiving DCI or downlink data on or through the corresponding downlink physical channel.

In this specification, a transport block is a payload for a physical layer. For example, data given to a physical layer from an upper layer or a medium access control (MAC) layer is basically referred to as a transport block.

In this specification, HARQ (Hybrid Automatic Repeat and reQuest) is a kind of error control method. HARQ-acknowledgement (HARQ-ACK) transmitted through the downlink is used for error control on uplink data, and HARQ-ACK transmitted on the uplink is used for error control on downlink data. A transmitter that performs the HARQ operation transmits data (e.g., a transport block, a codeword) and waits for an acknowledgment (ACK). A receiver that performs the HARQ operation sends an acknowledgment (ACK) only when data is properly received, and sends a negative acknowledgment (NACK) if an error occurs in the received data. The transmitter may transmit (new) data if ACK is received, and retransmit data if NACK is received. After the BS transmits scheduling information and data according to the scheduling information, a time delay occurs until the ACK/NACK is received from the UE and retransmission data is transmitted. This time delay occurs due to channel propagation delay and a time taken for data decoding/encoding. Therefore, when new data is sent after the current HARQ process is finished, a blank space occurs in the data transmission due to the time delay. Therefore, a plurality of independent HARQ processes are used to prevent generation of the blank space in data transmission during the time delay period. For example, if there are seven transmission occasions between an initial transmission and retransmission, the communication device may operate seven independent HARQ processes to perform data transmission without a blank space. Utilizing the plurality of parallel HARQ processes, UL/DL transmissions may be performed continuously while waiting for HARQ feedback for a previous UL/DL transmission.

In this specification, channel state information (CSI) refers to information indicating quality of a radio channel (or a link) formed between a UE and an antenna port. The CSI may include at least one of a channel quality indicator (CQI), a precoding matrix indicator (PMI), a CSI-RS resource indicator (CRI), an SSB resource indicator (SSBRI), a layer indicator (LI), a rank indicator (RI), or a reference signal received power (RSRP).

In this specification, frequency division multiplexing (FDM) may refer to transmission/reception of signals/channels/users at different frequency resources, and time division multiplexing (TDM) may refer to transmission/reception of signals/channels/users at different time resources.

In the present disclosure, a frequency division duplex (FDD) refers to a communication scheme in which uplink communication is performed on an uplink carrier and downlink communication is performed on a downlink carrier wave linked to the uplink carrier, and time division duplex (TDD) refers to a communication scheme in which uplink and downlink communications are performed by dividing time on the same carrier.

For background information, terms, abbreviations, etc. used in the present specification, may refer to those described in standard documents published before the present disclosure. For example, the following document may be referred:

3GPP LTE
3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2—Measurements
3GPP TS 36.321: Medium Access Control (MAC) protocol
3GPP TS 36.322: Radio Link Control (RLC) protocol 3GPP TS 36.323: Packet Data Convergence Protocol (PDCP)
3GPP TS 36.331: Radio Resource Control (RRC) protocol
3GPP TS 23.303: Proximity-based services (Prose); Stage 2
3GPP TS 23.285: Architecture enhancements for V2X services
3GPP TS 23.401: General Packet Radio Service (GPRS) enhancements for Evolved Universal Terrestrial Radio Access Network (E-UTRAN) access
3GPP TS 23.402: Architecture enhancements for non-3GPP accesses
3GPP TS 23.286: Application layer support for V2X services; Functional architecture and information flows
3GPP TS 24.301: Non-Access-Stratum (NAS) protocol for Evolved Packet System (EPS); Stage 3
3GPP TS 24.302: Access to the 3GPP Evolved Packet Core (EPC) via non-3GPP access networks; Stage 3
3GPP TS 24.334: Proximity-services (ProSe) User Equipment (UE) to ProSe function protocol aspects; Stage 3
3GPP TS 24.386: User Equipment (UE) to V2X control function; protocol aspects; Stage 3
3GPP NR
3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: NR and NG-RAN Overall Description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description
3GPP TS 23.287: Application layer support for V2X services; Functional architecture and information flows
3GPP TS 23.501: System Architecture for the 5G System
3GPP TS 23.502: Procedures for the 5G System
3GPP TS 23.503: Policy and Charging Control Framework for the 5G System; Stage 2
3GPP TS 24.501: Non-Access-Stratum (NAS) protocol for 5G System (5GS); Stage 3
3GPP TS 24.502: Access to the 3GPP 5G Core Network (SGCN) via non-3GPP access networks
3GPP TS 24.526: User Equipment (UE) policies for 5G System (5GS); Stage 3

E. 3GPP signal transmission/reception method

Figure 8:
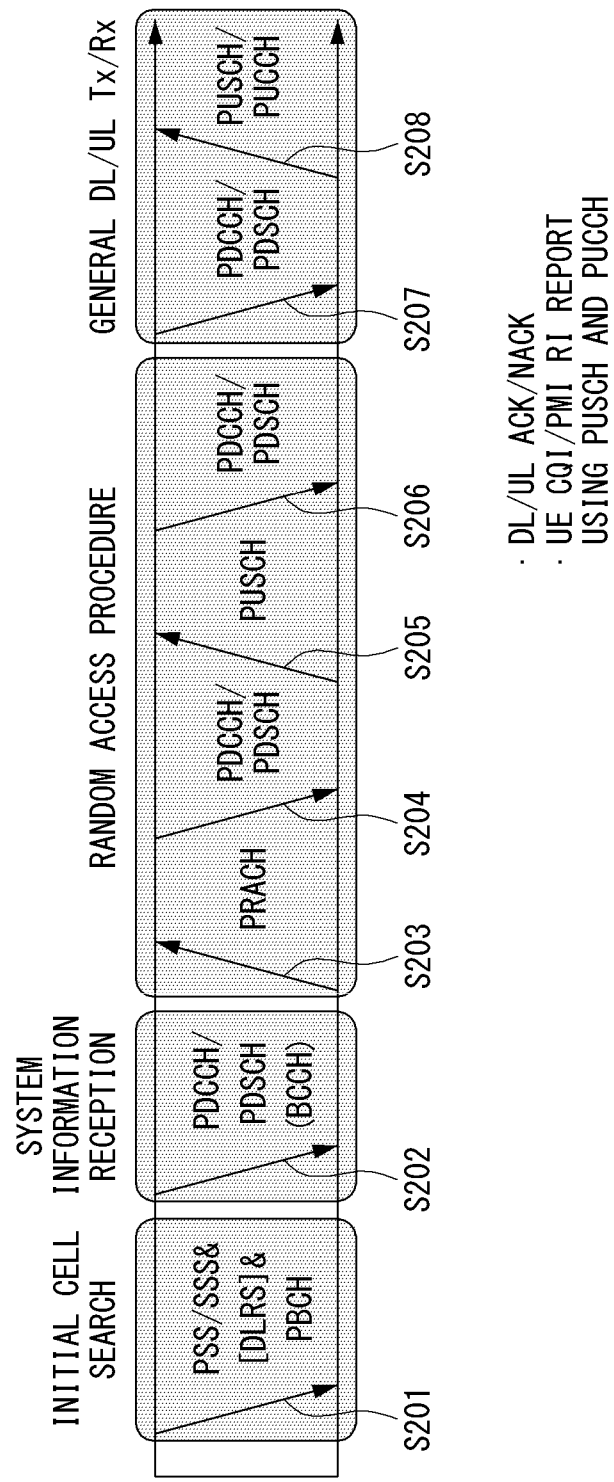
FIG. 8 is a diagram illustrating an example of a 3GPP signal transmission/reception method.

FIG. 8 is a diagram illustrating an example of a 3GPP signal transmission/reception method.

Referring to FIG. 8, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). The initial cell search procedure is described in detail in paragraph F below.

After initial cell search, the UE can acquire broadcast information in the cell by receiving a physical broadcast channel (PBCH) from the BS. Further, the UE can receive a downlink reference signal (DL RS) in the initial cell search step to check a downlink channel state.

After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the B S or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed. The random access procedure is described in detail in paragraph G below.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH.

The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

F. Initial Access (IA) Process

Synchronization signal block (SSB) transmission and related operation

Figure 9:
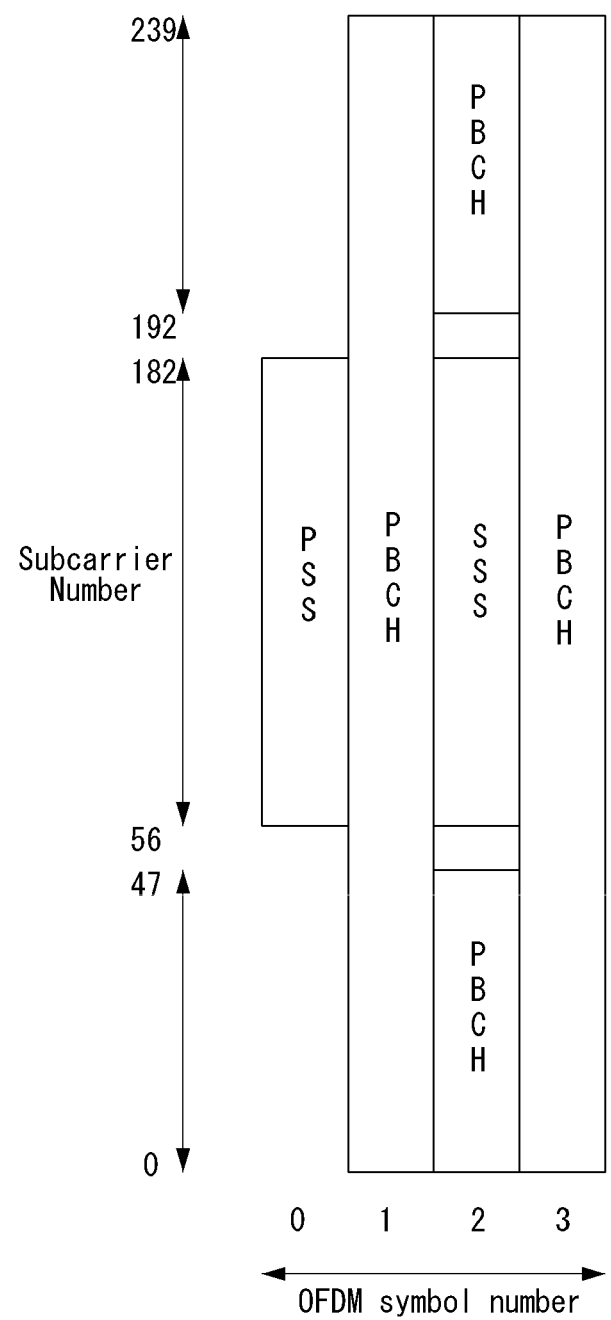
FIG. 9 illustrates an SSB structure and FIG. 10 illustrates SSB transmission.

FIG. 9 illustrates an SSB structure. The UE can perform cell search, system information acquisition, beam alignment for initial access, and DL measurement on the basis of an SSB. The SSB is interchangeably used with a synchronization signal/physical broadcast channel (SS/PBCH) bloc.

Referring to FIG. 9, the SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers. The PBCH is encoded/decoded on the basis of a polar code and modulated/demodulated according to quadrature phase shift keying (QPSK). The PBCH in the OFDM symbol includes data resource elements (REs) to which a complex modulation value of a PBCH is mapped and DMRS REs to which a demodulation reference signal (DMRS) for the PBCH is mapped. There are three DMRS REs per resource block of the OFDM symbol, and there are three data REs between the DMRS REs.

Cell Search

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

The cell search procedure of the UE may be summarized as shown in Table 1 below.

TABLE 1

| | Type of Signals | Operations |
|---|---|---|
| 1st step | PSS | * SS/PBCH block (SSB) symbol timing acquisition<br>* Cell ID detection within a cell ID group(3 hypothesis) |
| 2nd Step | SSS | * Cell ID group detection (336 hypothesis) |
| 3rd Step | PBCH DMRS | * SSB index and Half frame (HF) index (Slot and frame boundary detection) |
| 4th Step | PBCH | * Time information (80 ms, System Frame Number (SFN), SSB index, HF)<br>* Remaining Minimum System Information (RMSI) Control resource set (CORESET)/Search space configuration |
| 5th Step | PDCCH and PDSCH | * Cell access information<br>* RACH configuration |

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

Figure 10:
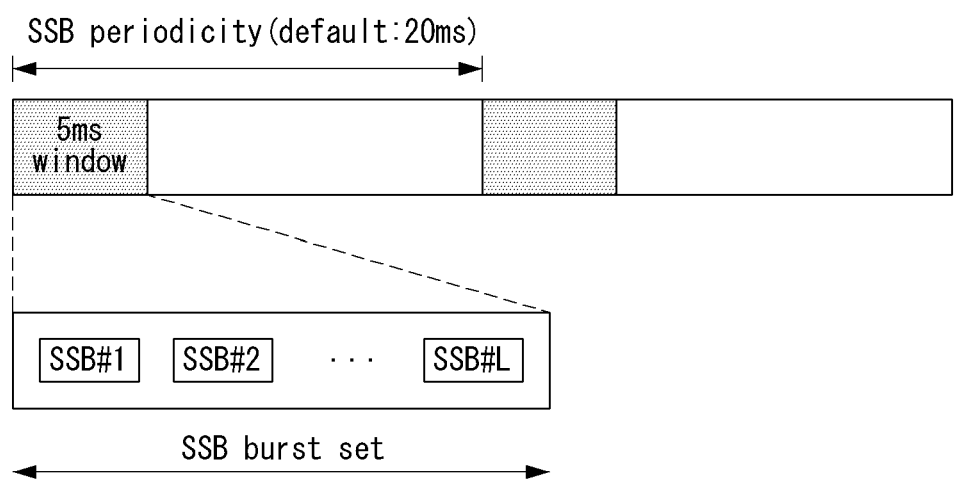

FIG. 10 illustrates SSB transmission.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS). An SSB burst set is configured at a start portion of the SSB period. The SSB burst set includes a 5 ms time window (i.e., half-frame), and the SSB may be transmitted up to N times within the SS burst set. The maximum transmission number L of the SSB may be given as follows according to a frequency band of a carrier wave. One slot includes a maximum of two SSBs.

For frequency range up to 3 GHz, L=4
For frequency range from 3 GHz to 6 GHz, L=8
For frequency range from 6 GHz to 52.6 GHz, L=64

A time position of an SSB candidate in the SS burst set may be defined according to a subscriber spacing. The SSB candidate time position is indexed from 0 to L−1 (SSB index) in time order within the SSB burst set (i.e., half-frame).

A plurality of SSBs may be transmitted within a frequency span of a carrier wave. Physical layer cell identifiers of these SSBs need not be unique, and other SSBs may have different physical layer cell identifiers.

The UE may acquire the DL synchronization by detecting the SSB. The UE may identify a structure of the SSB burst set on the basis of the detected SSB (time) index and thus detect a symbol/slot/half-frame boundary. The number of the frame/half-frame to which the detected SSB belongs may be identified using system frame number (SFN) information and half-frame indication information.

Specifically, the UE may acquire a 10-bit SFN for a frame to which the PBCH belongs from the PBCH. Next, the UE may acquire 1-bit half-frame indication information. For example, if the UE detects a PBCH with a half-frame indication bit set to 0, it may determine that the SSB, to which the PBCH belongs, belongs to a first half-frame in the frame, and if the UE detects a PBCH with a half-frame indication bit set to 1, it may determine that the SSB, to which the PBCH belongs, belongs to a second half-frame in the frame. Finally, the UE may acquire an SSB index of the SSB to which the PBCH belongs on the basis of a DMRS sequence and PBCH payload carried by the PBCH.

Acquisition of System Information (SI)

SI is divided into a master information block (MIB) and a plurality of system information blocks (SIBs). The SI other than the MIB may be referred to as remaining minimum system information (RMSI). Details thereof may be referred to the following:

The MIB includes information/parameters for monitoring the PDCCH scheduling PDSCH carrying system information block1 (SIB1) and is transmitted by the BS through the PBCH of the SSB. For example, the UE may check whether a control resource set (CORESET) exists for the Type 0-PDCCH common search space on the basis of the MIB. The Type 0-PDCCH common search space is a kind of PDCCH search space and is used to transmit a PDCCH for scheduling an SI message. If the Type 0-PDCCH common search space is present, the UE may determine (i) a plurality of contiguous resource blocks and one or more consecutive resource blocks constituting a CORESET on the basis of information in the MIB (e.g., pdcch-ConfigSIB1) and (ii) a PDCCH occasion (e.g., time domain position for PDCCH reception). If no Type 0-PDCCH common search space exists, pdcch-ConfigSIB1 provides information on a frequency location where SSB/SIB1 exists and information on a frequency range where SSB/SIB1 does not exist.

SIB1 includes information related to availability and scheduling (e.g., transmission periodicity and SI-window size) of the remaining SIBs (hereinafter, SIBx, x is an integer equal to or greater than 2). For example, SIB1 may indicate whether the SIBx is periodically broadcast or provided according to a request from the UE on an on-demand basis. If SIBx is provided on the on-demand basis, SIB1 may include information necessary for the UE to perform the SI request. The SIB1 is transmitted through the PDSCH, the PDCCH for scheduling the SIB1 is transmitted through the Type 0-PDCCH common search space, and the SIB1 is transmitted through the PDSCH indicated by the PDCCH.

The SIM is included in the SI message and transmitted via the PDSCH. Each SI message is transmitted within a time window (i.e., SI-window) that occurs periodically.

G. Random Access Procedure

Figure 11:
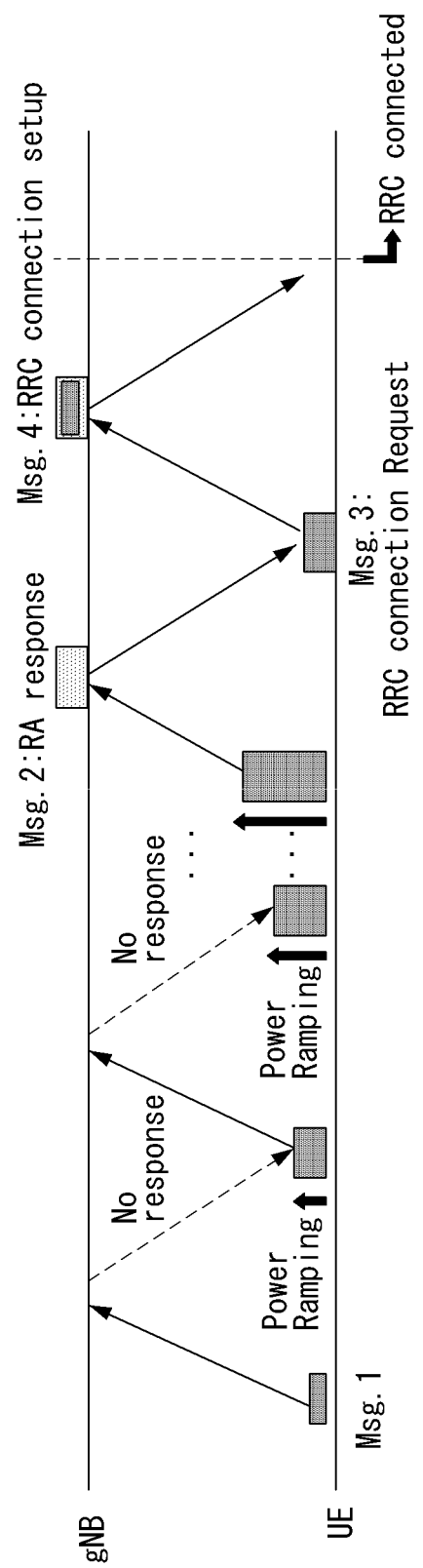
FIG. 11 illustrates an example of a random access procedure.

The random access procedure of the UE may be summarized as shown in Table 2 and FIG. 11.

TABLE 2

| | Signal type | Acquired operation/information |
|---|---|---|
| First step | PRACH preamble in UL | * Acquire initial beam<br>* Random selection of random access preamble ID |
| Second step | Random access response on PDSCH | * Timing advance information<br>* Random access preamble ID<br>* Initial UL grant, temporary C-RNTI |
| Third step | UL transmission on PUSCH | * RRC connection request<br>* UE identifier |
| Fourth step | Contention resolution on DL | * Temporary C-RNTI on PDCCH for initial access<br>* C-RNTI on PDCCH for RRC_CONNECTED UE |

The random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure.

FIG. 11 illustrates an example of a random access procedure. In particular, FIG. 11 illustrates a contention-based random access procedure.

First, a UE can transmit a random access preamble through a PRACH as Msg1 of a random access procedure in UL.

Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

Multiple preamble formats are defined by one or more RACH OFDM symbols and different cyclic prefixes (and/or guard time). RACH configuration for a cell is included in the system information of the cell and is provided to the UE. The RACH configuration includes information on a subcarrier spacing of the PRACH, available preambles, preamble format, and the like. The RACH configuration includes association information between SSBs and RACH (time-frequency) resources. The UE transmits a random access preamble in the RACH time-frequency resource associated with the detected or selected SSB.

A threshold value of the SSB for the RACH resource association may be set by the network, and RACH preamble is transmitted or retransmitted on the basis of the SSB in which reference signal received power (RSRP) measured on the basis of the SSB satisfies the threshold value. For example, the UE may select one of the SSB (s) satisfying the threshold value and may transmit or retransmit the RACH preamble on the basis of the RACH resource associated with the selected SSB.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

When the random access response information includes timing advance information for UL synchronization and an UL grant, and when a temporary UE receives a random response information regarding the UE itself on the PDSCH, the UE may know timing advance information for UL synchronization, an initial UL grant, and a UE temporary cell RNTI (cell RNTI, C-RNTI). The timing advance information is used to control uplink signal transmission timing. In order to ensure that the PUSCH/PUCCH transmission by the UE is better aligned with the subframe timing at a network end, the network (e.g. BS) may measure a time difference between the PUSCH/PUCCH/SRS reception and subframes and send timing advance information on the basis of the time difference. The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

Meanwhile, the contention-free random access procedure may be performed when the UE performs handover to another cell or BS or when the contention-free random access procedure is requested by a BS command. A basic process of the contention-free random access procedure is similar to the contention-based random access procedure. However, unlike the contention-based random access procedure in which the UE randomly selects a preamble to be used among a plurality of random access preambles, in the case of the contention-free random access procedure, a preamble (hereinafter referred to as a dedicated random access preamble) to be used by the UE is allocated by the BS to the UE. Information on the dedicated random access preamble may be included in an RRC message (e.g., a handover command) or may be provided to the UE via a PDCCH order. When the random access procedure is started, the UE transmits a dedicated random access preamble to the BS. When the UE receives the random access procedure from the BS, the random access procedure is completed.

As mentioned above, the UL grant in the RAR schedules PUSCH transmission to the UE. The PUSCH carrying initial UL transmission based on the UL grant in the RAR will be referred to as Msg3 PUSCH. The content of the RAR UL grant starts at an MSB and ends at a LSB and is given in Table 3.

TABLE 3

| RAR UL grant field | Number of bits |
| --- | --- |
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

The TPC command is used to determine transmission power of the Msg3 PUSCH and is interpreted, for example, according to Table 4.

TABLE 4

| TPC command | value [dB] |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In the contention-free random access procedure, the CSI request field in the RAR UL grant indicates whether the UE includes an aperiodic CSI report in the corresponding PUSCH transmission. A subcarrier spacing for the Msg3 PUSCH transmission is provided by an RRC parameter. The UE will transmit the PRACH and Msg3 PUSCH on the same uplink carrier of the same service providing cell. A UL BWP for Msg3 PUSCH transmission is indicated by SIB1 (SystemInformationBlock1).

H. DL and UL Transmitting/Receiving Operations

DL Transmitting/Receiving Operation

A downlink grant (also referred to as a downlink assignment) may be divided into (1) dynamic grant and (2) configured grant. The dynamic grant, which is intended to maximize resource utilization, refers to a method of data transmission/reception on the basis of dynamic scheduling by the BS.

The BS schedules downlink transmission through a DCI. The UE receives on the PDCCH the DCI for downlink scheduling (i.e., including scheduling information of the PDSCH) from the BS. DCI format 1_0 or 1_1 may be used for downlink scheduling. The DCI format 1_1 for downlink scheduling may include, for example, the following information: an identifier for DCI format, a bandwidth part indicator, a frequency domain resource assignment, time domain resource assignment, MCS.

The UE may determine a modulation order, a target code rate, and a transport block size for the PDSCH on the basis of the MCS field in the DCI. The UE may receive the PDSCH in time-frequency resource according to frequency domain resource allocation information and time domain resource allocation information.

The DL grant is also referred to as semi-persistent scheduling (SPS). The UE may receive an RRC message including a resource configuration for transmission of DL data from the BS. In the case of the DL SPS, an actual DL configured grant is provided by the PDCCH and is activated or deactivated by the PDCCH. If the DL SPS is configured, at least the following parameters are provided to the UE via RRC signaling from the BS: a configured scheduling RNTI (CS-RNTI) for activation, deactivation and retransmission; and cycle. The actual DL grant of the DL SPS is provided to the UE by the DCI in the PDCCH addressed to the CS-RNTI. The UE activates an SPS associated with the CS-RNTI if specific fields of the DCI in the PDCCH addressed to the CS-RNTI are set to specific values for scheduling activation. The UE may receive downlink data through the PDSCH on the basis of the SPS.

UL Transmitting/Receiving Operation

The BS transmits a DCI including uplink scheduling information to the UE. The UE receives on the PDCCH the DCI for uplink scheduling (i.e., including scheduling information of the PUSCH) from the BS. DCI format 0_0 or 0_1 may be used for uplink scheduling. The DCI format 0_1 for uplink scheduling may include the following information: an identifier for DCI format, a bandwidth part indicator, a frequency domain resource assignment, a time domain resource assignment, MCS.

The UE transmits uplink data on the PUSCH on the basis of the DCI. For example, when the UE detects the PDCCH including the DCI format 0_0 or 0_1, the UE transmits the PUSCH according to an instruction based on the DCI. Two transmission schemes are supported for PUSCH transmission: codebook-based transmission and non-codebook-based transmission.

When an RRC parameter 'txConfig' receives an RRC message set to 'codebook', the UE is configured to a codebook-based transmission. Meanwhile, when an RRC message in which the RRC parameter 'txConfig' is set to 'nonCodebook' is received, the UE is configured to a non-codebook-based transmission. The PUSCH may be semi-statically scheduled by the DCI format 0_0, by the DCI format 0_1, or by RRC signaling.

The uplink grant may be divided into (1) a dynamic grant and (2) a configured grant.

Figure 12:
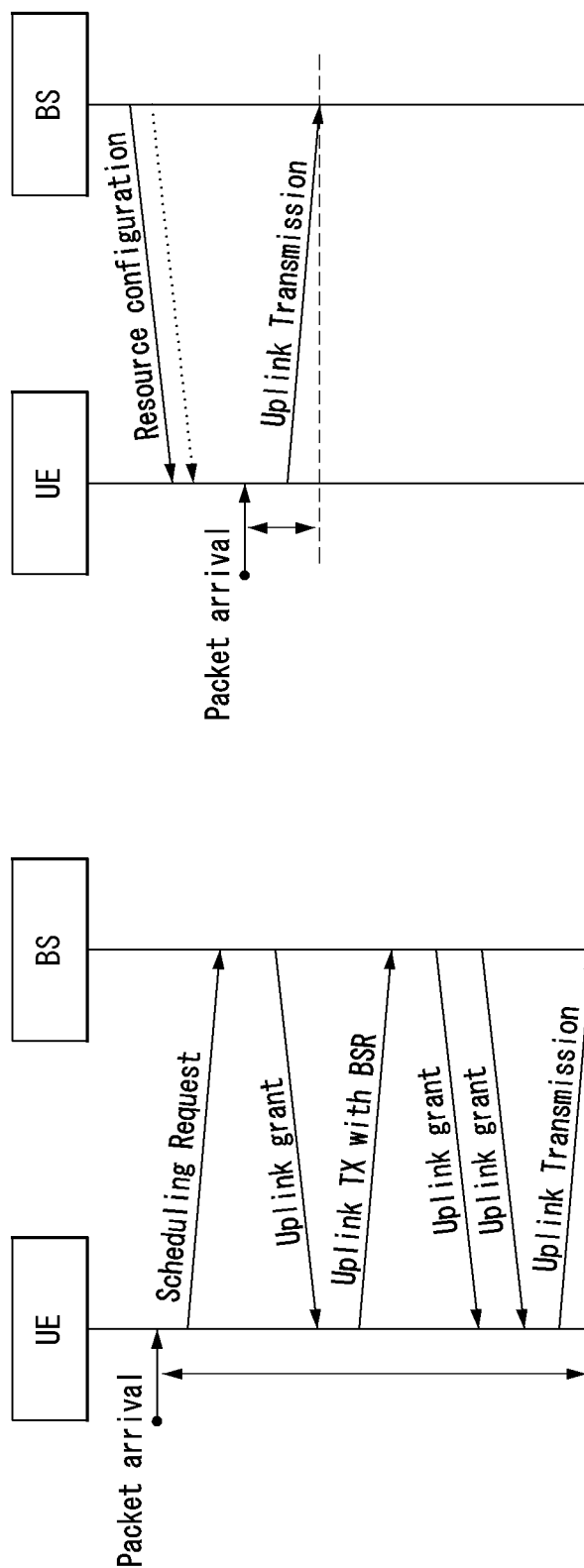
FIG. 12 shows an example of an uplink grant.

FIG. 12 shows an example of an uplink grant. FIG. 12(a) illustrates an UL transmission process based on the dynamic grant, and FIG. 12(b) illustrates an UL transmission process based on the configured grant.

A dynamic grant, which is to maximize utilization of resources, refers to a data transmission/reception method based on dynamic scheduling by a BS. This means that when the UE has data to be transmitted, the UE requests uplink resource allocation from the BS and transmits the data using only uplink resource allocated by the BS. In order to use the uplink radio resource efficiently, the B S must know how much data each UE transmits on the uplink. Therefore, the UE may directly transmit information on uplink data to be transmitted to the BS, and the BS may allocate uplink resources to the UE on the basis of the information. In this case, the information on the uplink data transmitted from the UE to the BS is referred to as a buffer status report (BSR), and the BSR relates to the amount of uplink data stored in a buffer of the UE.

Referring to FIG. 12(a), an uplink resource allocation process for actual data when the UE does not have an uplink radio resource available for transmission of the BSR is illustrated. For example, since the UE which does not have a UL grant cannot available for UL data transmission cannot transmit the BSR through a PUSCH, the UE must request resource for uplink data must by starting transmission of a scheduling request via a PUCCH, and in this case, an uplink resource allocation process of five steps is used.

Referring to FIG. 12(a), if there is no PUSCH resource for transmitting a BSR, the UE first transmits a scheduling request (SR) to the BS in order to be allocated a PUSCH resource. The SR is used by the UE to request the BS for PUSCH resources for uplink transmission when a reporting event occurs but there is no PUSCH resource available to the UE. Depending on whether there is a valid PUCCH resource for the SR, the UE transmits the SR via the PUCCH or initiates a random access procedure. When the UE receives the UL grant from the BS, it transmits the BSR to the BS via the PUSCH resource allocated by the UL grant. The BS checks the amount of data to be transmitted by the UE on the uplink on the basis of the BSR and transmits a UL grant to the UE. The UE receiving the UL grant transmits actual uplink data to the BS through the PUSCH on the basis of the UL grant.

Referring to FIG. 12(b), the UE receives an RRC message including a resource configuration for transmission of UL data from the BS. There are two types of UL-configured grants in the NR system: Type 1 and Type 2. In the case of UL-configured grant type 1, an actual UL grant (e.g., time resource, frequency resource) is provided by RRC signaling, and in the case of Type 2, an actual UL grant is provided by the PDCCH and is activated or deactivated by the PDCCH. If the grant type 1 is configured, at least the following parameters are provided to the UE via RRC signaling from the BS: CS-RNTI for retransmission; periodicity of the configured grant type 1; information about a start symbol index S and a symbol length L for an intra-slot PUSCH; time domain offset representing an offset of the resource for SFN=0 in the time domain; MCS index indicating modulation order, target code rate, and transport block size. If the grant type 2 is configured, at least the following parameters are provided to the UE via RRC signaling from the BS: CS-RNTI for activation, deactivation and retransmission; periodicity of configured grant type 2. The actual UL grant of the configured grant type 2 is provided to the UE by the DCI in the PDCCH addressed to the CS-RNTI. If the specific fields of the DCI in the PDCCH addressed to the CS-RNTI are set to a specific value for scheduling activation, the UE activates the configured grant type 2 associated with the CS-RNTI.

The UE may perform uplink transmission via the PUSCH on the basis of the configured grant according to the type 1 or type 2.

Resources for initial transmission by the configured grant may or may not be shared by one or more UEs.

Figure 13:
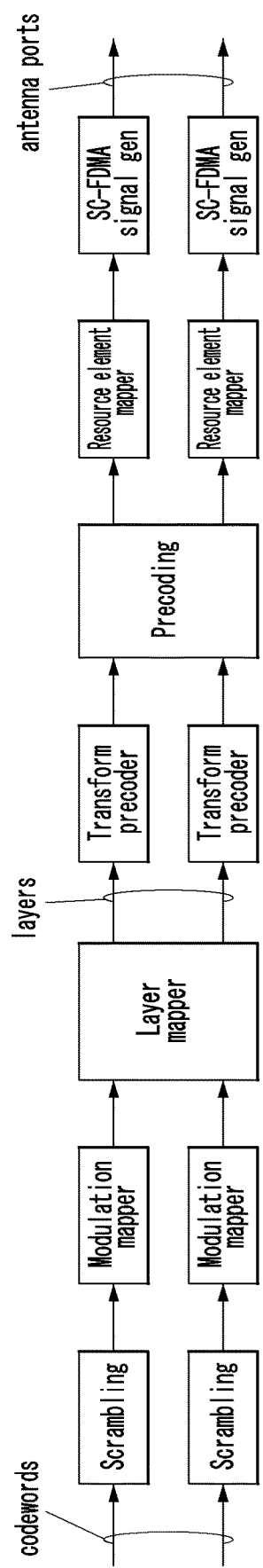
FIG. 13 shows an example of a conceptual diagram of uplink physical channel processing.

FIG. 13 shows an example of a conceptual diagram of uplink physical channel processing.

Each of the blocks shown in FIG. 13 may be performed in each module in the physical layer block of a transmission device. More specifically, the uplink signal processing in FIG. 13 may be performed in the processor of the UE/BS described in this specification. Referring to FIG. 13, the uplink physical channel processing may be performed through scrambling, modulation mapping, layer mapping, transform precoding, precoding, resource element mapping, and SC-FDMA signal generation (SC-FDMA signal generation). Each of the above processes may be performed separately or together in each module of the transmission device. The transform precoding is spreading UL data in a special way to reduce a peak-to-average power ratio (PAPR) of a waveform, and is a kind of discrete Fourier transform (DFT). OFDM using a CP together with the transform precoding that performs DFT spreading is called DFT-s-OFDM, and OFDM using a CP without DFT spreading is called CP-OFDM. Transform precoding may optionally be applied if it is enabled for the UL in an NR system. That is, the NR system supports two options for UL waveforms, one of which is CP-OFDM and the other is DFT-s-OFDM. Whether the UE must use the CP-OFDM as a UL transmit waveform or the DFT-s-OFDM as a UL transmit waveform is provided from the BS to the UE via RRC parameters. FIG. 13 is a conceptual diagram of uplink physical channel processing for DFT-s-OFDM. In the case of CP-OFDM, the transform precoding among the processes of FIG. 13 is omitted.

More specifically, the transmission device scrambles coded bits in a codeword by a scrambling module, and then transmits the coded bits through a physical channel. Here, the codeword is acquired by encoding a transport block. The scrambled bits are modulated by a modulation mapping module into complex-valued modulation symbols. The modulation mapping module may modulate the scrambled bits according to a predetermined modulation scheme and arrange the modulated bits as complex-valued modulation symbols representing a position on a signal constellation. pi/2-BPSK (pi/2-Binary Phase Shift Keying), m-PSK (m-Phase Shift Keying) or m-QAM (m-Quadrature Amplitude Modulation) may be used for modulating the coded data. The complex-valued modulation symbols may be mapped to one or more transport layers by a layer mapping module. The complex-valued modulation symbols on each layer may be precoded by a precoding module for transmission on an antenna port. If the transform precoding is enabled, the precoding module may perform precoding after performing transform precoding on the complex-valued modulation symbols as shown in FIG. 13. The precoding module may process the complex-valued modulation symbols in a MIMO manner according to multiple transmission antennas to output antenna-specific symbols, and distribute the antenna-specific symbols to a corresponding resource element mapping module. An output z of the precoding module may be acquired by multiplying an output y of the layer mapping module by a precoding matrix W of N×M. Here, N is the number of antenna ports and M is the number of layers. The resource element mapping module maps the complex-valued modulation symbols for each antenna port to an appropriate resource element in the resource block allocated for transmission. The resource element mapping module may map the complex-valued modulation symbols to appropriate subcarriers and multiplex the same according to users. The SC-FDMA signal generation module (CP-OFDM signal generation module if the transform precoding is disabled) modulates the complex-valued modulation symbol according to a specific modulation scheme, for example, an OFDM scheme, to generate a complex-valued time domain OFDM (Orthogonal Frequency Division Multiplexing) symbol signal. The signal generation module may perform Inverse Fast Fourier Transform (IFFT) on the antenna specific symbol, and a CP may be inserted into the time domain symbol on which the IFFT has been performed. The OFDM symbol undergoes digital-to-analog conversion, upconverting, and the like, and transmitted to a reception device through each transmission antenna. The signal generation module may include an IFFT module and a CP inserter, a digital-to-analog converter (DAC), and a frequency uplink converter.

A signal processing procedure of a reception device may be the reverse of the signal processing procedure of the transmission device. Details thereof may be referred to the above contents and FIG. 13.

Next, the PUCCH will be described.

The PUCCH supports a plurality of formats, and the PUCCH formats may be classified according to symbol duration, payload size, multiplexing, and the like. Table 5 below illustrates PUCCH formats.

TABLE 5

| Format | PUCCH length in OFDM symbols | Number of bits | Usage | Etc. |
|---|---|---|---|---|
| 0 | 1-2 | ≤2 | 1 | Sequence selection |
| 1 | 4-14 | ≤2 | 2 | Sequence modulation |
| 2 | 1-2 | >2 | 4 | CP-OFDM |
| 3 | 4-14 | >2 | 8 | DFT-s-OFDM(no UE multiplexing) |
| 4 | 4-14 | >2 | 16 | DFT-s-OFDM(Pre DFT orthogonal cover code(OCC)) |

The PUCCH formats shown in Table 5 may be divided into (1) a short PUCCH and (2) a long PUCCH. PUCCH formats 0 and 2 may be included in the short PUCCH, and PUCCH formats 1, 3 and 4 may be included in the long PUCCH.

Figure 14:
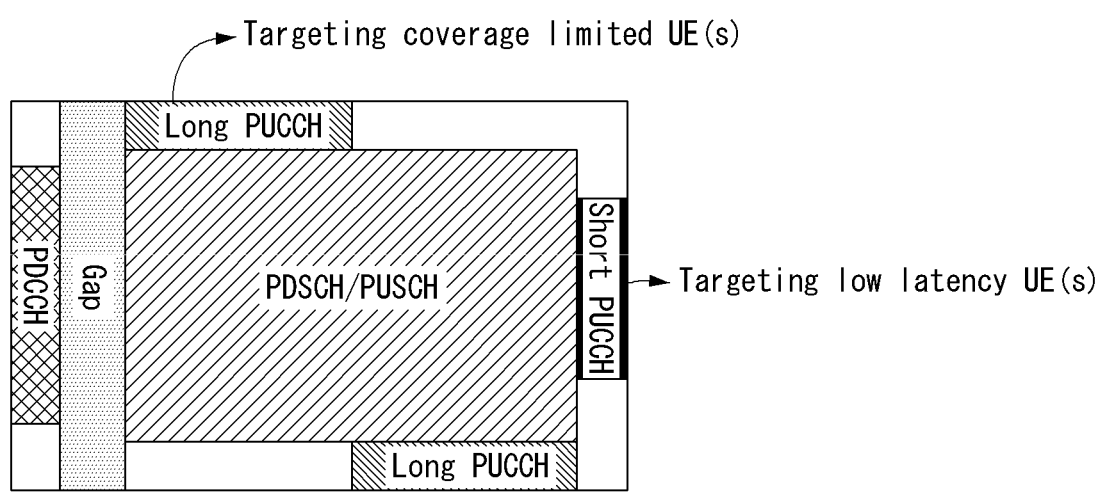
FIG. 14 shows an example of an NR slot in which a PUCCH is transmitted.

FIG. 14 shows an example of an NR slot in which a PUCCH is transmitted.

The UE transmits one or two PUCCHs through serving cells in different symbols in one slot. When the UE transmits two PUCCHs in one slot, at least one of the two PUCCHs has a structure of the short PUCCH.

I. eMBB (Enhanced Mobile Broadband Communication)

In the case of the NR system, a massive multiple input multiple output (MIMO) environment in which the transmit/receive antennas are significantly increased may be considered. That is, as the large MIMO environment is considered, the number of transmit/receive antennas may increase to several tens or hundreds or more. Meanwhile, the NR system supports communication in above 6 GHz band, that is, the millimeter frequency band. However, the millimeter frequency band has a frequency characteristic in which signal attenuation according to a distance is very sharp due to the use of a frequency band which is too high. Therefore, an NR system using the band of 6 GHz or higher uses a beamforming technique in which energy is collected and transmitted in a specific direction, not in all directions, in order to compensate for sudden propagation attenuation characteristics. In the massive MIMO environment, a hybrid type beamforming technique combining an analog beamforming technique and a digital beamforming technique is required depending on a position to which a beamforming weight vector/precoding vector is applied, to reduce complexity of hardware implementation, increase performance using multiple antennas, obtain flexibility of resource allocation, and facilitate beam control for each frequency.

Hybrid Beamforming

Figure 15:
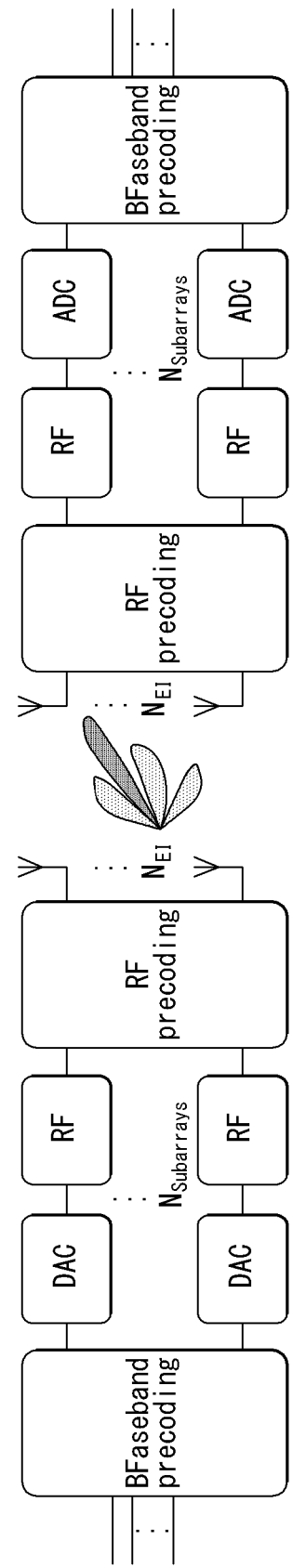
FIG. 15 is a block diagram of a transmitter and a receiver for hybrid beamforming

FIG. 15 illustrates an example of a block diagram of a transmitter and a receiver for hybrid beamforming.

As a method for forming a narrow beam in a millimeter frequency band, a beam forming scheme in which energy is increased only in a specific direction by transmitting the same signal using a phase difference suitable for a large number of antennas in a BS or a UE is mainly considered. Such beamforming scheme includes digital beamforming to create a phase difference in a digital baseband signal, analog beamforming to create a phase difference in a modulated analog signal using time delay (i.e., cyclic shift), and hybrid beamforming using both digital beamforming and analog beamforming, or the like. If each antenna element has an RF unit (or transceiver unit (TXRU)) to adjust transmission power and phase, independent beamforming is possible for each frequency resource. However, it is not effective in terms of price to install an RF unit in all 100 antenna elements. That is, since the millimeter frequency band requires a large number of antennas to compensate for the sudden attenuation characteristics and digital beamforming requires an RF component (e.g., a digital-to-analog converter (DAC), a mixer, a power amplifier, a linear amplifier, and the like), implementation of digital beamforming in the millimeter frequency band causes the price of the communication device to increase. Therefore, when a large number of antennas are required such as in the millimeter frequency band, the use of analog beamforming or hybrid beamforming is considered. In the analog beamforming scheme, a plurality of antenna elements are mapped to one TXRU and a direction of a beam is adjusted by an analog phase shifter. Such an analog beamforming scheme may generate only one beam direction in the entire band, and thus, it cannot perform frequency selective beamforming (BF). Hybrid BF is an intermediate form of digital BF and analog BF and has B RF units fewer than Q antenna elements. In the case of the hybrid BF, directions of beams that may be transmitted at the same time is limited to B or less, although there is a difference depending on a method of connecting the B RF units and Q antenna elements.

Beam Management (BM)

The BM process includes processes for acquiring and maintaining a set of BS (or a transmission and reception point (TRP)) and/or UE beams that may be used for downlink (DL) and uplink (UL) transmission/reception and may include the following processes and terms.

beam measurement: operation for BS or UE to measure characteristic of received beamforming signal.

beam determination: operation for BS or UE to select its own Tx beam/Rx beam.

beam sweeping: an operation to cover spatial domain using transmission and/or reception beam during a predetermined time interval in a predetermined manner.

beam report: an operation for UE to report information of beamformed signal on the basis of beam measurement.

The BM process may be classified into (1) DL BM process using SSB or CSI-RS and (2) UL BM process using SRS (sounding reference signal). Also, each BM process may include Tx beam sweeping to determine Tx beam and Rx beam sweeping to determine Rx beam.

DL BM Process

The DL BM process may include (1) transmission of beamformed DL RSs (e.g., CSI-RS or SSB) by the BS, and (2) beam reporting by the UE.

Here, the beam report may include a preferred DL RS ID(s) and a corresponding reference signal received power (RSRP). The DL RS ID may be an SSBRI (SSB Resource Indicator) or a CRI (CSI-RS Resource Indicator).

Figure 16:
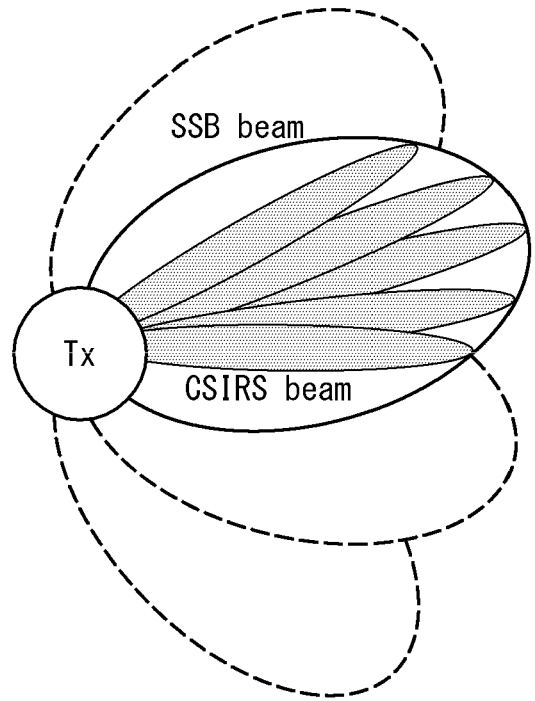
FIG. 16 shows an example of beamforming using an SSB and a CSI-RS.

FIG. 16 shows an example of beamforming using SSB and CSI-RS.

As shown in FIG. 16, the SSB beam and the CSI-RS beam may be used for beam measurement. The measurement metric is an RSRP per resource/block. The SSB may be used for coarse beam measurement, and the CSI-RS may be used for fine beam measurement. SSB may be used for both Tx beam sweeping and Rx beam sweeping. Rx beam sweeping using the SSB may be performed by attempting to receive the SSB while the UE changes the Rx beam for the same SSBRI across multiple SSB bursts. Here, one SS burst may include one or more SSBs, and one SS burst set includes one or more SSB bursts.

1. DL BM Using SSB

Figure 17:
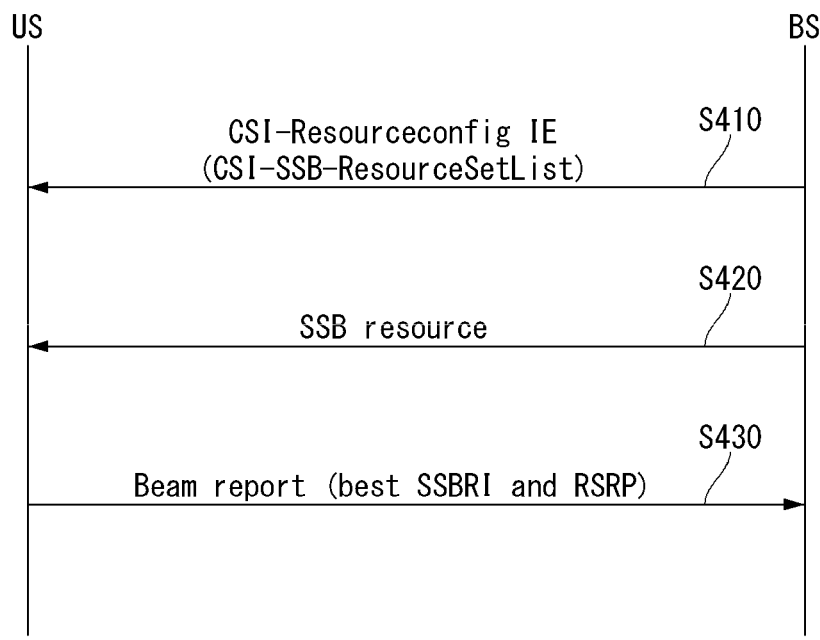
FIG. 17 is a flowchart illustrating an example of a DL BM process using an SSB.

FIG. 17 is a flowchart illustrating an example of a DL BM process using SSB.

A configuration for beam report using the SSB is performed at the time of channel state information (CSI)/beam configuration in RRC_CONNECTED.

The UE receives from the BS a CSI-ResourceConfig IE including a CSI-SSB-ResourceSetList for the SSB resources used for the BM (S410). The RRC parameter csi-SSB-ResourceSetList represents a list of SSB resources used for beam management and reporting in one resource set. Here, the SSB resource set may be configured to {SSBx1, SSBx2, SSBx3, SSBx4}. The SSB index may be defined from 0 to 63.

The UE receives signals on the SSB resources from the BS on the basis of the CSI-SSB-ResourceSetList (S420).

If the CSI-RS reportConfig associated with reporting on the SSBRI and reference signal received power (RSRP) is configured, the UE reports the best SSBRI and its corresponding RSRP to the BS S430). For example, if the reportQuantity of the CSI-RS reportConfig IE is set to ssb-Index-RSRP', the UE reports the best SSBRI and a corresponding RSRP to the BS.

When the CSI-RS resource is configured in the same OFDM symbol (s) as the SSB and 'QCL-Type D' is applicable, the UE may assume that the CSI-RS and the SSB are quasi co-located (QCL-ed) in terms of 'QCL-TypeD'. Here, QCL-TypeD may refer to QCL-ed between antenna ports in terms of spatial Rx parameter. The same receive beam may be applied when the UE receives signals of a plurality of DL antenna ports in the QCL-TypeD relationship. Details of QCL may refer to a section 4. QCL below.

2. DL BM Using CSI-RS

Referring to the use of CSI-RS, i) if a repetition parameter is set for a specific CSI-RS resource set and TRS_info is not configured, CSI-RS is used for beam management. ii) If the repetition parameter is not set and TRS_info is set, the CSI-RS is used for a tracking reference signal (TRS). Iii) If the repetition parameter is not set and TRS_info is not set, the CSI-RS is used for CSI acquisition.

(RRC Parameter) If the repetition is set to 'ON', it relates to a Rx beam sweeping process of the UE. If the repetition is set to 'ON', the UE may assume that if NZP-CSI-RS-ResourceSet is configured, signals of at least one CSI-RS resource in the NZP-CSI-RS-ResourceSet are transmitted in the same downlink space domain filter. That is, at least one CSI-RS resource in the NZP-CSI-RS-ResourceSet is transmitted through the same Tx beam. Here, signals of at least one CSI-RS resource in the NZP-CSI-RS-ResourceSet may be transmitted in different OFDM symbols.

Figure 18:
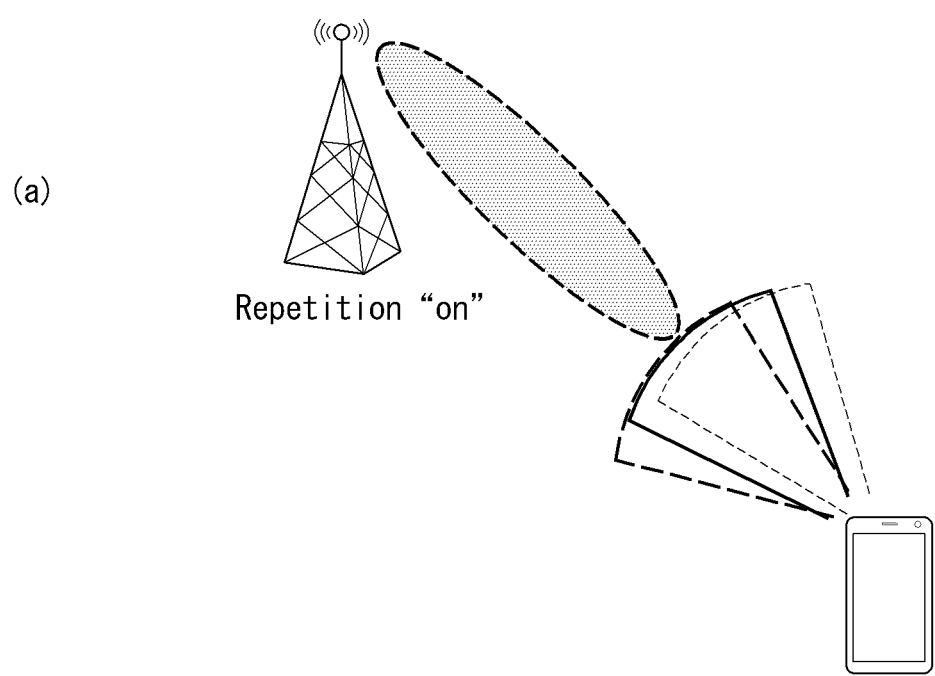
FIG. 18 shows another example of DL BM process using a CSI-RS.
Figure 18:
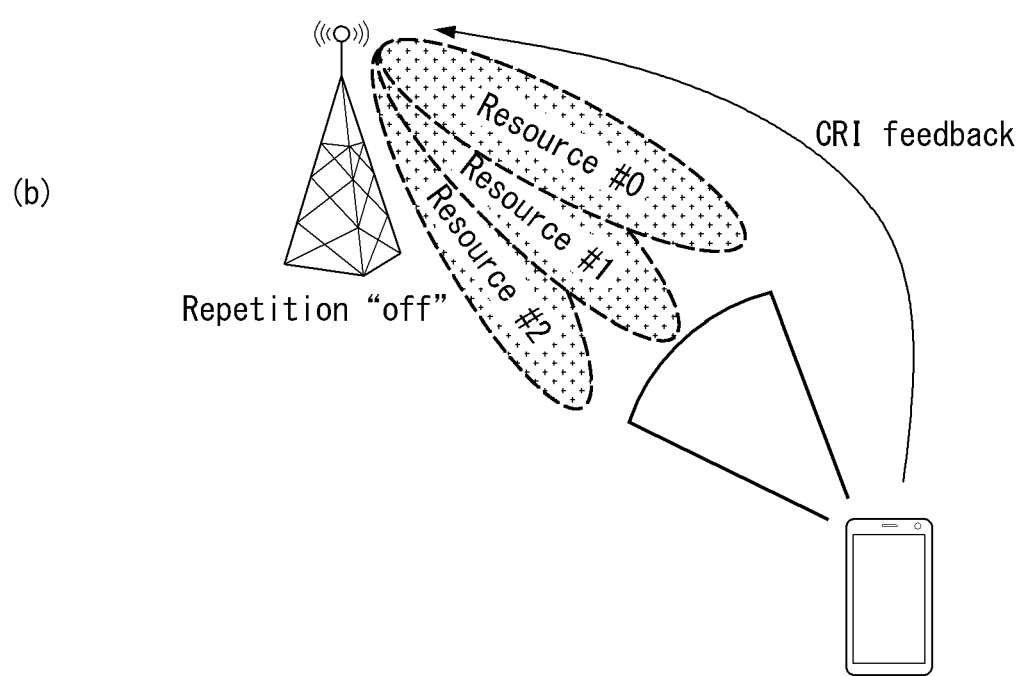

Meanwhile, if the repetition is set to 'OFF', it relates to a Tx beam sweeping process of the BS. If the repetition is set to 'OFF', the UE does not assume that signals of at least one CSI-RS resource in the NZP-CSI-RS-ResourceSet are transmitted in the same downlink spatial domain transmission filter. That is, the signals of at least one CSI-RS resource in the NZP-CSI-RS-ResourceSet are transmitted through different Tx beams. FIG. 18 shows another example of the DL BM process using CSI-RS.

FIG. 18(*a*) shows a process of Rx beam determination (or refinement) of the UE, and FIG. 18(*b*) shows a Tx beam sweeping process of the BS. FIG. 18 (*a*) shows a case where the repetition parameter is set to 'ON', and FIG. 18(*b*) shows a case where the repetition parameter is set to 'OFF'.

A process of determining the Rx beam of the UE will be described with reference to FIGS. 18(*a*) and 19.

Figure 19:
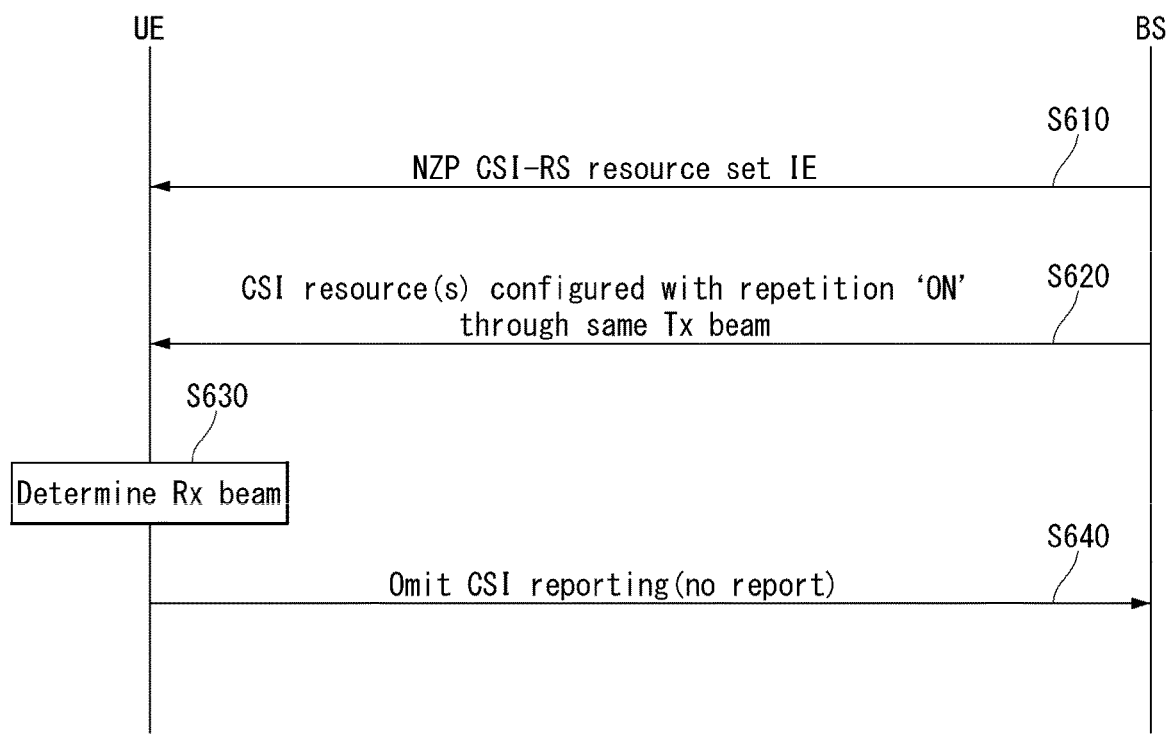
FIG. 19 is a flowchart illustrating an example of a process of determining a reception beam of a UE.

FIG. 19 is a flowchart illustrating an example of a process of determining a reception beam of a UE.

The UE receives an NZP CSI-RS resource set IE including the RRC parameter regarding 'repetition' from the BS through RRC signaling (S610). Here, the RRC parameter 'repetition' is set to 'ON'.

The UE repeatedly receives signals on the resource(s) in the CSI-RS resource in which the RRC parameter 'repetition' is set to 'ON' in different OFDM (s) through the same Tx beam (or DL space domain transmission filter) of the BS (S620).

The UE determines its own Rx beam (S630).

The UE omits the CSI reporting (S640). That is, the UE may omit CSI reporting when the uplink RRC parameter 'repetition' is set to 'ON'.

A Tx beam determining process of the BS will be described with reference to FIGS. 18(*b*) and 20.

Figure 20:
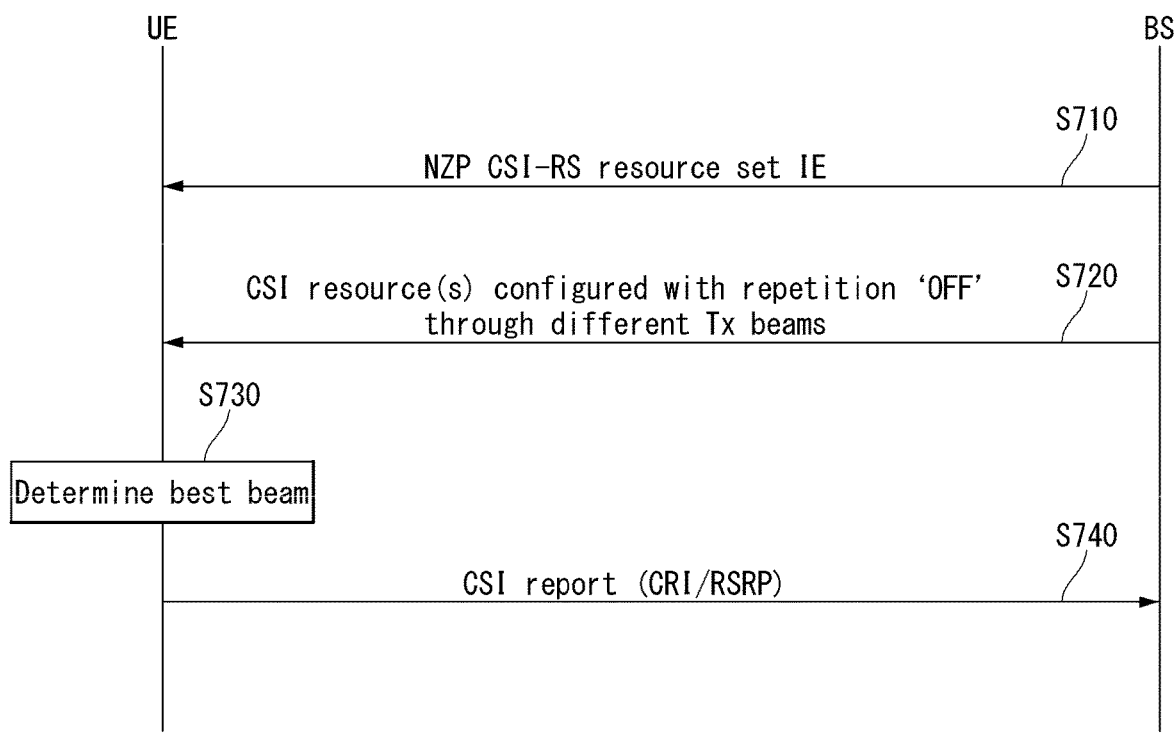
FIG. 20 is a flowchart illustrating an example of a transmission beam determining process of a BS.

FIG. 20 is a flowchart illustrating an example of a transmission beam determining process of the BS.

The UE receives an NZP CSI-RS resource set IE including an RRC parameter regarding 'repetition' from the BS through RRC signaling (S710). Here, the RRC parameter 'repetition' is set to 'OFF' and is related to the Tx beam sweeping process of the BS.

The UE receives signals on the resources in the CSI-RS resource in which the RRC parameter 'repetition' is set to 'OFF' through different Tx beams (DL spatial domain transmission filters) of the BS (S720).

The UE selects (or determines) the best beam (S730)

The UE reports an ID (e.g., CRI) for the selected beam and related quality information (e.g., RSRP) to the BS (S740). That is, the UE reports the CRI and the RSRP to the BS when the CSI-RS is transmitted for the BM.

Figure 21:
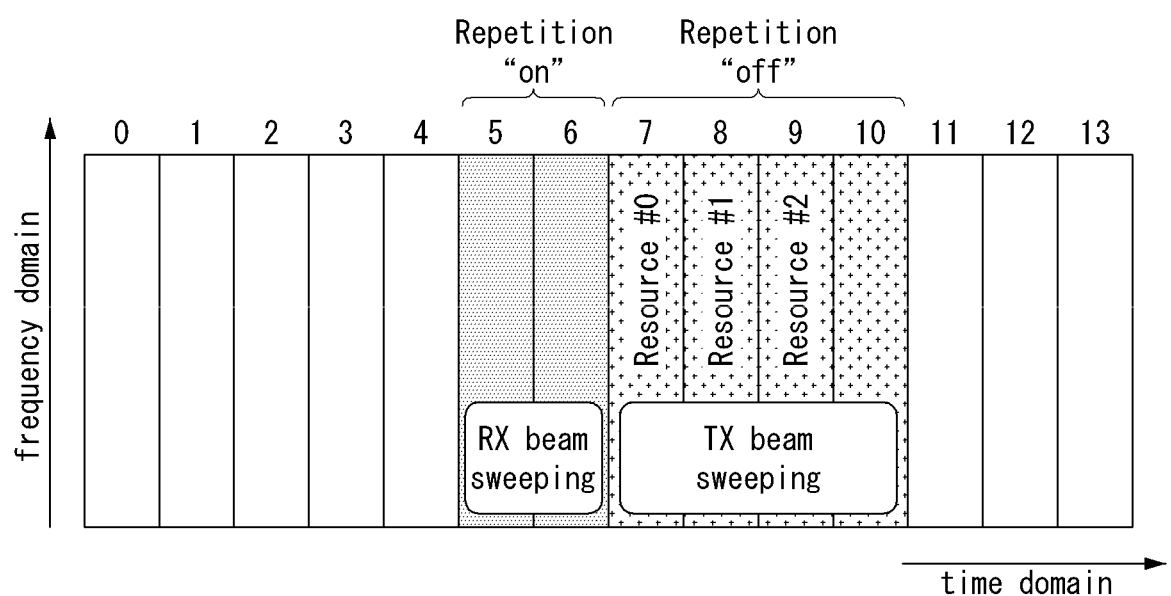
FIG. 21 shows an example of resource allocation in time and frequency domains related to an operation of FIG. 18.

FIG. 21 shows an example of resource allocation in time and frequency domains related to the operation of FIG. 18.

When repetition 'ON' is set in the CSI-RS resource set, a plurality of CSI-RS resources are repeatedly used by applying the same transmission beam, and when repetition 'OFF' is set in the CSI-RS resource set, different CSI-RS resources may be transmitted in different transmission beams.

3. DL BM-Related Beam Indication

The UE may receive a list of up to M candidate transmission configuration indication (TCI) states for at least a quasi co-location (QCL) indication via RRC signaling. Here, M depends on UE capability and may be 64.

Each TCI state may be configured with one reference signal (RS) set. Table 6 shows an example of a TCI-State IE. The TCI-State IE is associated with a quasi co-location (QCL) type corresponding to one or two DL reference signals (RSs).

TABLE 6

| | |
|---|---|
| --ASN1START | |
| --TAG-TCI-STATE-START | |
| TCI-State ::= | SEQUENCE { |
|   tci-StateId | TCI-StateId, |
|   qcl-Type1 | QCL-Info, |
|   qcl-Type2 | QCL-Info |
|   ... | |
| } | |
| QCL-Info ::= | SEQUENCE { |
|   cell | |
|   ServCellIndex | |
|   bwp-Id | BWP-Id |
|   referenceSignal | CHOICE { |
|     csi-rs | |
|   NZP-CSI-RS-ResourceId, | |
|     ssb | |
|   }, | |

TABLE 6-continued

```
    qcl-Type                        ENUMERATED
    {typeA, typeB, typeC, typeD},
    ...
  }
  --TAG-TCI-STATE-STOP
--ASN1STOP
```

In Table 6, 'bwp-Id' denotes a DL BWP where RS is located, 'cell' denotes a carrier where RS is located, 'referencesignal' denotes a reference antenna port(s) which is a QCL-ed source for target antenna port(s) or a reference signal including the same. The target antenna port(s) may be CSI-RS, PDCCH DMRS, or PDSCH DMRS.

4. QCL (Quasi-Co Location)

The UE may receive a list including up to M TCI-state configurations to decode the PDSCH according to the detected PDCCH having an intended DCI for the UE and a given cell. Here, M depends on the UE capability.

As illustrated in Table 6, each TCI-State includes a parameter for establishing a QCL relationship between one or two DL RSs and the DM-RS port of the PDSCH. The QCL relationship is configured with a RRC parameter qcl-Type1 for the first DL RS and a qcl-Type2 (if set) for the second DL RS.

The QCL type corresponding to each DL RS is given by the parameter 'qcl-Type' in QCL-Info and may have one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, corresponding NZP CSI-RS antenna ports may be instructed/configured to be QCL-ed with a specific TRS in terms of QCL-Type A and QCL-ed with a specific SSB in terms of QCL-Type D. The thusly instructed/configured UE may receive the corresponding NZP CSI-RS using a Doppler and delay value measured by the QCL-TypeA TRS and apply a reception beam used for receiving the QCL-TypeD SSB to the corresponding NZP CSI-RS reception.

UL BM Process

In the UL BM, a Tx beam-Rx beam reciprocity (or beam correspondence) may be or may not be established depending on UE implementation. If the Tx beam-Rx beam reciprocity is established in both the BS and the UE, a UL beam pair may be matched through a DL beam pair. However, if the Tx beam-Rx beam reciprocity is not established in either the BS or the UE, a UL beam pair determining process is required, apart from DL beam pair determination.

In addition, even when the BS and the UE maintain beam correspondence, the BS may use the UL BM process for DL Tx beam determination without requesting the UE to report a preferred beam.

The UL BM may be performed through beamformed UL SRS transmission and whether to apply the UL BM of the SRS resource set is configured by the RRC parameter in a (RRC parameter) usage. If the usage is configured as 'Beam-Management (BM)', only one SRS resource may be transmitted for each of a plurality of SRS resource sets at a given time instant.

The UE may be configured with one or more sounding reference signal (SRS) resource sets (through RRC signaling, etc.) set by the (RRC parameter) SRS-ResourceSet. For each SRS resource set, K≥1 SRS resources may be set for the UE. Here, K is a natural number, and a maximum value of K is indicated by SRS_capability.

Like the DL BM, the UL BM process may also be divided into Tx beam sweeping of the UE and Rx beam sweeping of the BS.

Figure 22:
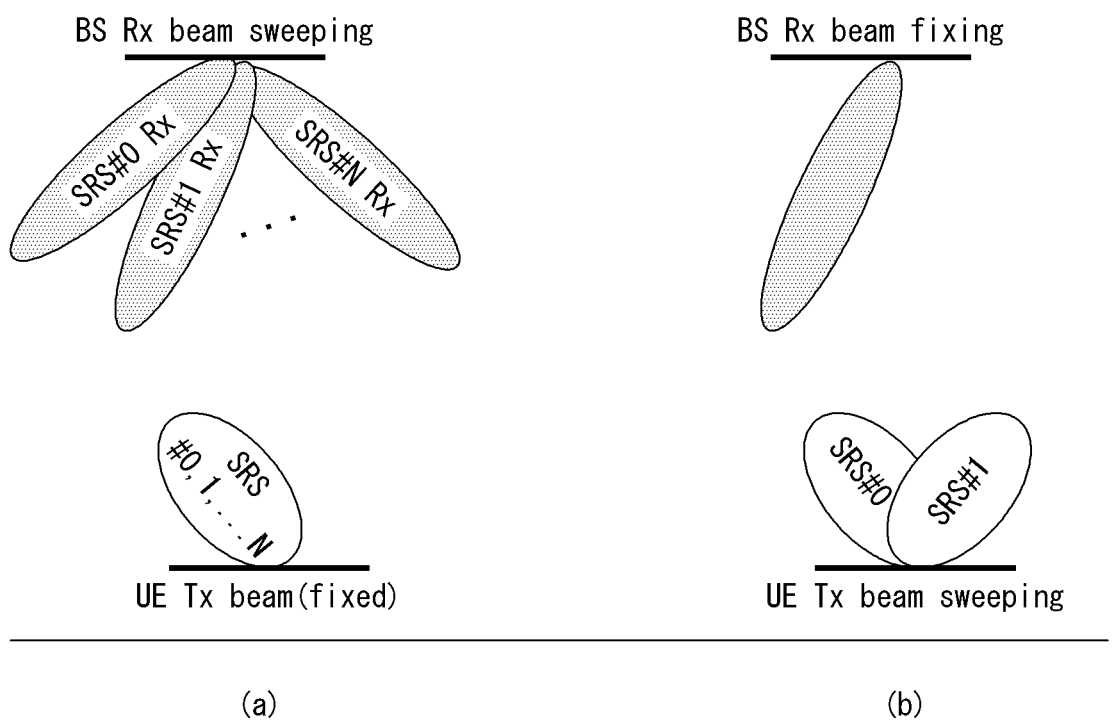
FIG. 22 shows an example of a UL BM process using an SRS.

FIG. 22 shows an example of a UL BM process using SRS.

FIG. 22(a) shows a process of determining Rx beamforming of a BS, and FIG. 22(b) shows a process of sweeping Tx beam of the UE.

Figure 23:
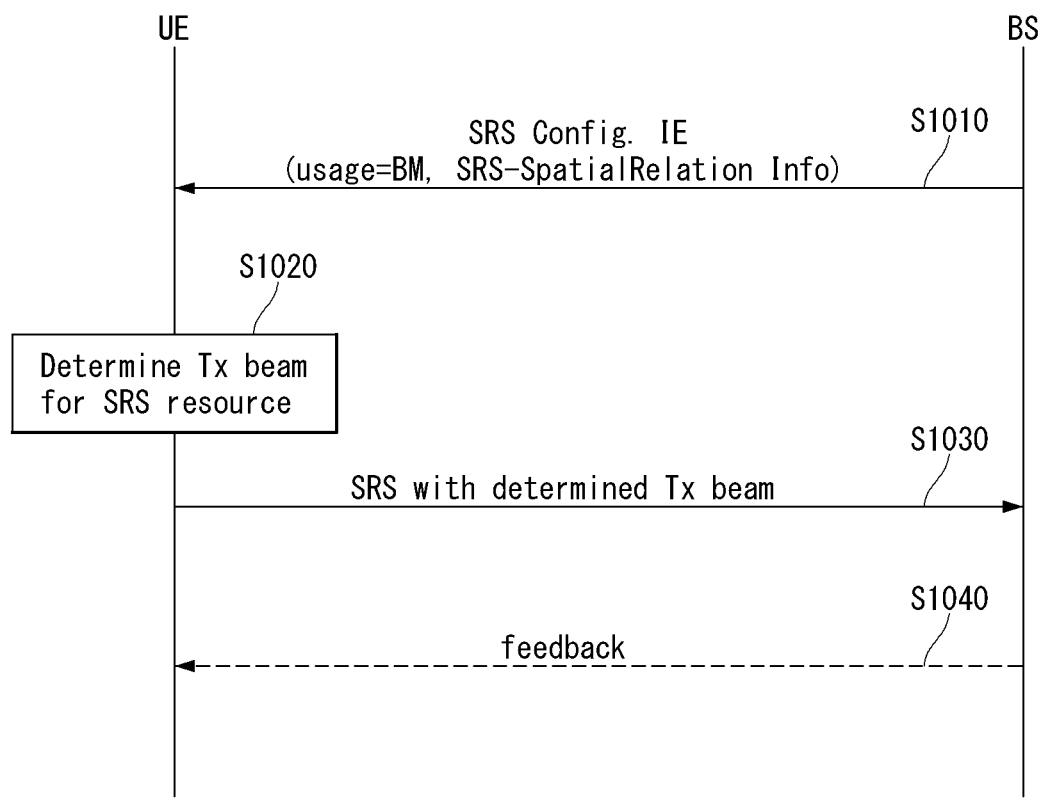
FIG. 23 is a flowchart illustrating an example of a UL BM process using an SRS.

FIG. 23 is a flowchart illustrating an example of a UL BM process using SRS.

The UE receives RRC signaling (e.g., SRS-Config IE) including an (RRC parameter) usage parameter set to 'beam management' from the BS (S1010). An SRS-Config IE is used for configuration of SRS transmission. The SRS-Config IE includes a list of SRS-Resources and a list of SRS-ResourceSets. Each SRS resource set refers to a set of SRS-resources.

The UE determines Tx beamforming for the SRS resource to be transmitted on the basis of SRS-SpatialRelation Info included in the SRS-Config IE (S1020). Here, the SRS-SpatialRelation Info is configured for each SRS resource and indicates whether to apply the same beamforming as that used in SSB, CSI-RS, or SRS for each SRS resource.

If SRS-SpatialRelationInfo is configured in the SRS resource, the same beamforming as that used in SSB, CSI-RS, or SRS is applied and transmitted. However, if SRS-SpatialRelationInfo is not configured in the SRS resource, the UE randomly determines the Tx beamforming and transmits the SRS through the determined Tx beamforming (S1030).

More specifically, regarding P-SRS in which 'SRS-ResourceConfigType' is set to 'periodic':

i) If the SRS-SpatialRelationInfo is set to SSB/PBCH', the UE transmits the corresponding SRS by applying the same spatial domain transmission filter (or generated from the corresponding filter) as the spatial domain Rx filter used for receiving SSB/PBCH; or ii) If the SRS-SpatialRelationInfo is set to 'CSI-RS', the UE transmits the SRS by applying the same spatial domain transmission filter used for receiving the CSI-RS; or iii) When SRS-SpatialRelationInfo is set to 'SRS', the UE transmits the corresponding SRS by applying the same spatial domain transmission filter used for transmitting the SRS.

In addition, the UE may receive or may not receive a feedback on the SRS from the BS as in the following three cases (S1040).

i) When Spatial_Relation_Info is set for all SRS resources in the SRS resource set, the UE transmits the SRS to the beam indicated by the BS. For example, if Spatial_Relation_Info indicates SSB, CRI, or SRI in which Spatial_Relation_Info is the same, the UE repeatedly transmits the SRS on the same beam.

ii) Spatial_Relation_Info may not be set for all SRS resources in the SRS resource set. In this case, the UE may freely transmit while changing the SRS beamforming.

iii) Spatial_Relation_Info may only be set for some SRS resources in the SRS resource set. In this case, the SRS is transmitted on the indicated beam for the set SRS resource, and for an SRS resource in which Spatial_Relation_Info is not set, the UE may transit the SRS resource by randomly applying Tx beamforming.

A Beam Failure Recovery (BFR) Process

In a beamformed system, a radio link failure (RLF) may occur frequently due to rotation, movement, or beamforming blockage of the UE. Therefore, BFR is supported in NR to prevent frequent occurrence of the RLFs. The BFR is similar to the radio link failure recovery process and may be supported if the UE knows the new candidate beam(s).

For beam failure detection, the BS configures beam failure detection reference signals for the UE, and if the number of times of beam failure indications from the physical layer of the UE reaches a threshold set by the RRC signaling within a period set by the RRC signaling of the BS, the UE declares beam failure.

After the beam failure is detected, the UE triggers a beam failure recovery by initiating a random access procedure on the PCell; and performs beam failure recovery by selecting a suitable beam (If the BS provides dedicated random access resources for certain beams, they are prioritized by the UE). Upon completion of the random access procedure, beam failure recovery is considered to be completed.

J. URLLC (Ultra-Reliable and Low Latency Communication)

The URLLC transmission defined by the NR may refer to transmission for (1) a relatively low traffic size, (2) a relatively low arrival rate, (3) an extremely low latency requirement (e.g., 0.5, 1 ms), (4) relatively short transmission duration (e.g., 2 OFDM symbols), and (5) urgent service/message, etc.

In the case of UL, transmission for a particular type of traffic (e.g., URLLC) needs to be multiplexed with other previously scheduled transmissions (e.g., eMBB) to meet a more stringent latency requirement. In this regard, one method is to give information indicating that a scheduled UE will be preempted for a specific resource, and allow the URLLC UE to use the resource for UL transmission.

Pre-Emption Indication

In the case of NR, dynamic resource sharing between eMBB and URLLC is supported. eMBB and URLLC services may be scheduled on non-overlapping time/frequency resources and URLLC transmission may occur on scheduled resources for ongoing eMBB traffic. The eMBB UE may not know whether PDSCH transmission of the UE is partially punctured and the UE may not be able to decode the PDSCH due to corrupted coded bits. In consideration of this, NR provides a preemption indication.

The preemption indication may also be referred to as an interrupted transmission indication.

With respect to the preamble indication, the UE receives DownlinkPreemption IE through RRC signaling from the BS. Table 7 below shows an example of the DownlinkPreemption IE.

TABLE 7

```
--ASN1START
--TAG-DOWNLINKPREEMPTION-START
DownlinkPreemption ::=                    SEQUENCE {
  int-RNTI                                  RNTI-Value,
  timeFrequency Set                         ENUMERATED {set 0, set 1},
  dci-PayloadSize                           INTEGER (0..maxINT-DCI-PayloadSize),
  int-ConfigurationPerServingCell           SEQUENCE (SIZE (1..maxNrofServing-
                                                     Cells))
OF INT-ConfigurationPerServingCell,
  ...
}
INT-ConfigurationPerServingCell ::=SEQUENCE {
  servingCellId                             ServCellIndex,
  positionInDCI                             INTEGER (0..maxINT-DCI-PayloadSize-1)
}
--TAG-DOWNLINKPREEMPTION-STOP
--ASN1STOP
```

If the UE is provided with the DownlinkPreemption IE, the UE is configured with an INT-RNTI provided by a parameter int-RNTI in the DownlinkPreemption IE to monitor a PDCCH conveying the DCI format 2_1. The UE is further configured with a set of serving cells and a corresponding set of locations for fields in the DCI format 2_1 by positionInDCI by an INT-ConfigurationPerServing Cell including a set of serving cell indices provided by a servingCellID, is configured with an information payload size for DCI format 2_1 by dci-PayloadSize, and is configured with granularity of time-frequency resources by timeFrequencySect.

The UE receives the DCI format 2_1 from the BS on the basis of the DownlinkPreemption IE.

If the UE detects the DCI format 2_1 for a serving cell in the set of serving cells, the UE may assume there is no transmission to the UE in PRBs and symbols indicated by the DCI format 2_1 among sets of PRBs and sets of symbols in the last monitoring period before a monitoring period to which the DCI format 2_1 belongs. For example, referring to FIG. 9A, the UE determines that a signal in the time-frequency resource indicated by pre-emption is not a DL transmission scheduled for the UE itself and decodes data on the basis of signals received in the remaining resource area.

Figure 24:
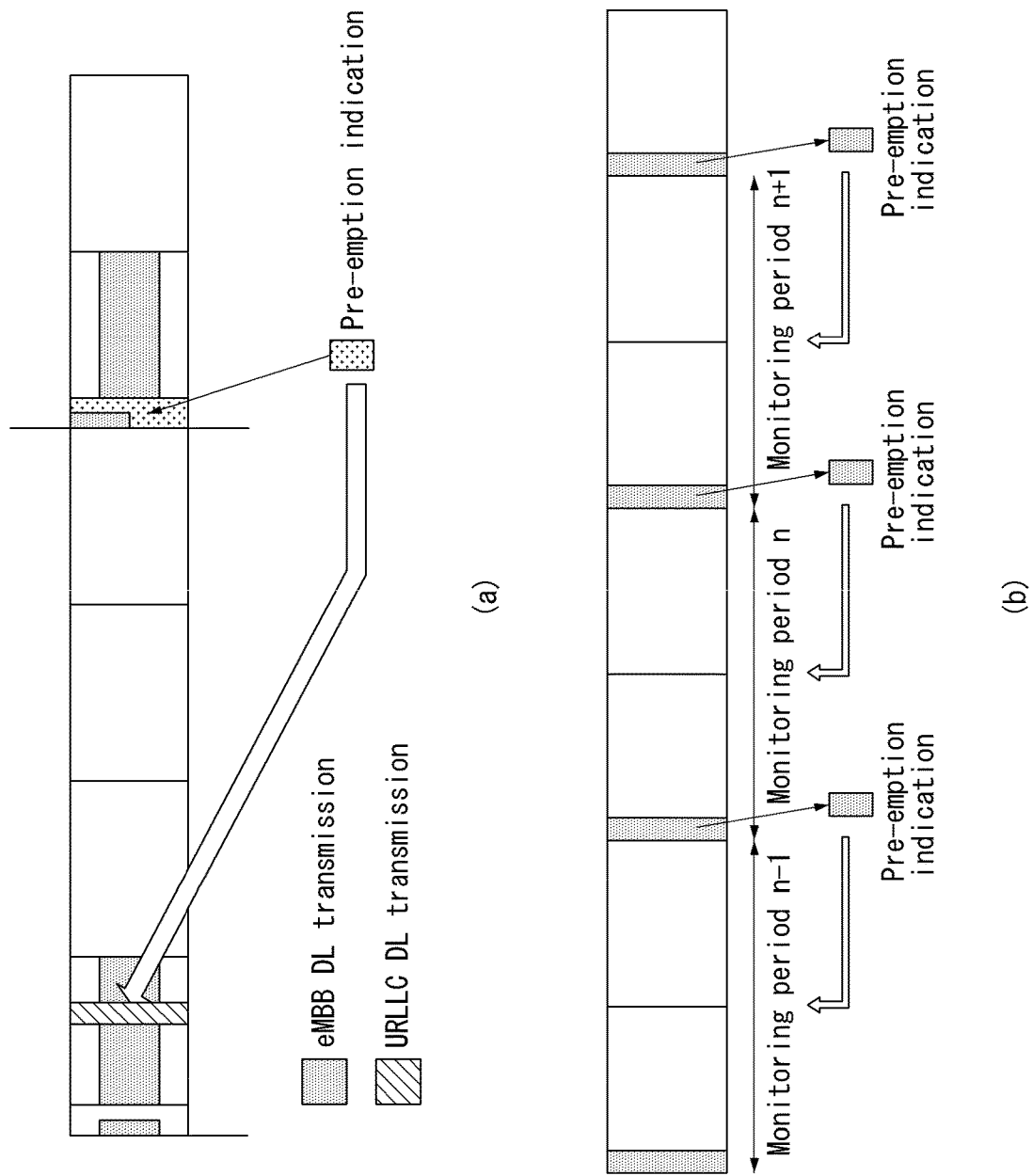
FIG. 24 is a diagram showing an example of a method of indicating a pre-emption.

FIG. 24 is a diagram showing an example of an preemption indication method.

A combination of {M,N} is set by the RRC parameter timeFrequencySet. {M, N}={14,1}, {7,2}.

Figure 25:
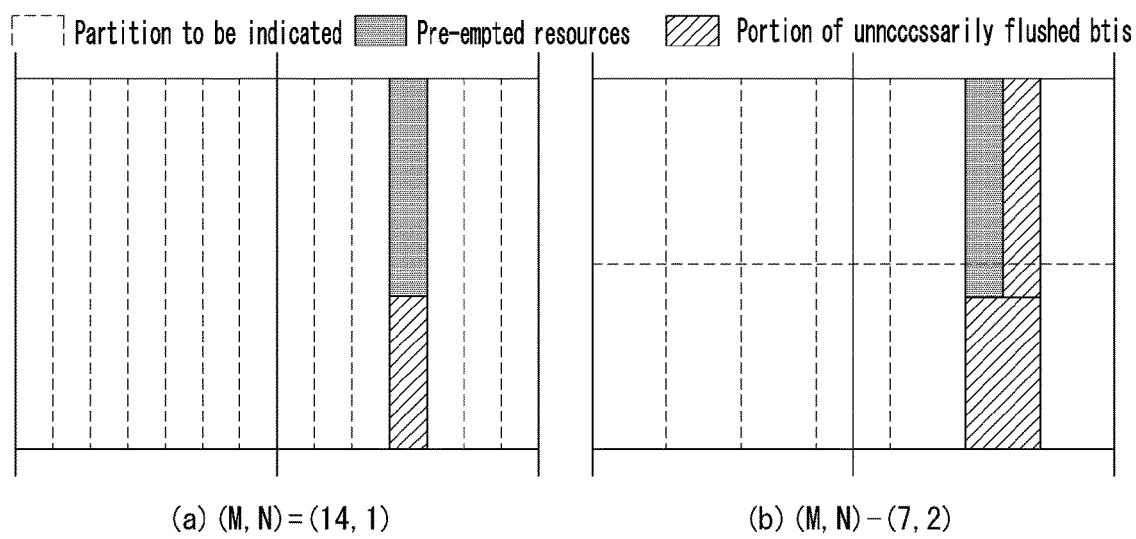
FIG. 25 shows an example of a time/frequency set of pre-emption indication.

FIG. 25 shows an example of a time/frequency set of a preemption indication.

A 14-bit bitmap for a preemption indication indicates one or more frequency parts (N>=1) and/or one or more time domain parts (M>=1). In the case of {M, N}={14,1}, as shown in FIG. 25(a), 14 parts in the time domain correspond one-to-one to 14 bits of the 14-bit bit map, and a part corresponding to a bit set to 1, among the 14 bits, is part including pre-empted resources. In the case of {M, N}={7, 2}, as shown in FIG. 25(b), the time-frequency resources of the monitoring period is divided into seven parts in the time domain and two parts in the frequency domain, so as to be divided into a total of 14 time-frequency parts. The total of 14 time-frequency parts correspond one-to-one to the 14 bits of the 14-bit bitmap, and the part corresponding to the bit set to 1 among the 14 bits includes the pre-empted resources.

K. MMTC (Massive MTC)

The massive machine type communication (mMTC) is one of the 5G scenarios for supporting a hyper-connection service that simultaneously communicates with a large number of UEs. In this environment, the UE intermittently performs communication with a very low transfer rate and mobility. Therefore, mMTC is aimed at how low cost and for how long the UE can be driven. In this regard, MTC and NB-IoT, which are dealt with in 3GPP will be described.

Hereinafter, a case where a transmission time interval of a physical channel is a subframe will be described as an example. For example, a case where a minimum time interval from a start of transmission of one physical channel (e.g., MPDCCH, PDSCH, PUCCH, PUSCH) to a start of transmission of a next physical channel is one subframe will be described as an example. In the following description, the subframe may be replaced by a slot, a mini-slot, or multiple slots.

MTC (Machine Type Communication)

MTC (Machine Type Communication), which is an application that does not require much throughput applicable to M2M (Machine-to-Machine) or IoT (Internet-of-Things), refers to a communication technology adopted to meet the requirements of the IoT service in 3GPP (3rd Generation Partnership Project).

The MTC may be implemented to meet the criteria of (1) low cost & low complexity, (2) enhanced coverage, and (3) low power consumption.

In 3GPP, MTC has been applied since release 10 (3GPP standard document version 10.x.x.) and features of MTC added for each release of 3GPP will be briefly described.

First, the MTC described in 3GPP Release 10 and Release 11 relates to a load control method. The load control method is to prevent IoT (or M2M) devices from suddenly loading the BS. More specifically, 3GPP Release 10 relates to a method of controlling a load by disconnecting IoT devices when the load occurs, and Release 11 relates to a method of preventing connection of the UE in advance by informing the UE about connection to a cell later through system information of the cell. In Release 12, features for low cost MTC are added, for which UE category 0 is newly defined. The UE category is an indicator indicating how much data the UE may handle at a communication modem. A UE in UE category 0 is a UE with a reduced peak data rate and relaxed radio frequency (RF) requirements, thus reducing baseband and RF complexity. In Release 13, a technology called eMTC (enhanced MTC) was introduced, which allows the UE to operate only at 1.08 MHz, a minimum frequency bandwidth supported by legacy LTE, thereby lowering the price and power consumption of the UE.

The contents described hereinafter is features mainly related to eMTC but may also be equally applicable to the MTC, eMTC, 5G (or NR) unless otherwise mentioned. Hereinafter, for convenience of explanation, MTC will be collectively described.

Therefore, the MTC described below may referred to as the enhanced MTC (eMTC), the LTE-M1/M2, BL (bandwidth reduced low complexity/CE (coverage enhanced), non-BL UE (in enhanced coverage), NR MTC, enhanced BL/CE, and the like. That is, the term MTC may be replaced with terms to be defined in the 3GPP standard in the future.

MTC General Features (1) MTC Operates Only within a Specific System Bandwidth (or Channel Bandwidth).

Figure 26:
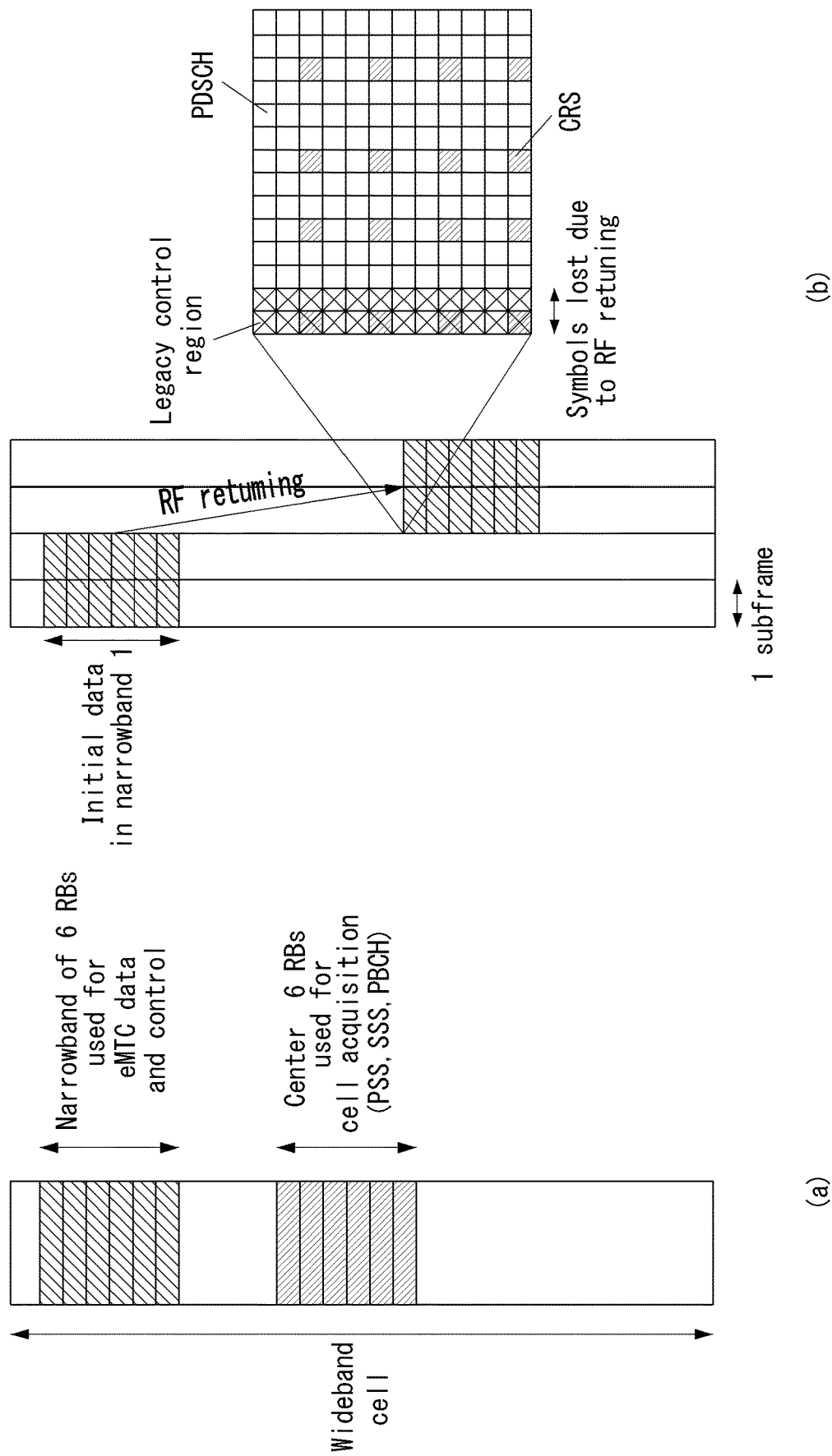
FIG. 26 shows an example of a narrowband operation and frequency diversity.

MTC may use six resource blocks (RBs) in the system band of the legacy LTE as shown in FIG. 26 or use a specific number of RBs in the system band of the NR system. The frequency bandwidth in which the MTC operates may be defined in consideration of a frequency range of NR and subcarrier spacing. Hereinafter, a specific system or frequency bandwidth in which the MTC operates is referred to as an MTC narrowband (NB). In the NR, the MTC may operate in at least one bandwidth part (BWP) or in a specific band of BWP.

MTC follows a narrowband operation to transmit and receive physical channels and signals, and a maximum channel bandwidth in which the MTC UE is operable is reduced to 1.08 MHz or six (LTE) RBs.

The narrowband may be used as a reference unit in resource allocation units of some downlink and uplink channels, and a physical location of each narrowband in the frequency domain may be defined to be different depending on the system bandwidth.

The bandwidth of 1.08 MHz defined in MTC is defined for the MTC UE to follow the same cell search and random access procedure as the legacy UE.

MTC may be supported by cells having a bandwidth (e.g., 10 MHz) much larger than 1.08 MHz but the physical channels and signals transmitted and received by the MTC are always limited to 1.08 MHz. The system with having much larger bandwidth may be legacy LTE, NR systems, 5G systems, and the like.

A narrowband is defined as six non-overlapping consecutive physical resource blocks in the frequency domain.

FIG. 26(a) is a diagram showing an example of a narrowband operation, and FIG. 26(b) is a diagram showing an example of repetition having RF retuning.

Frequency diversity by RF retuning will be described with reference to FIG. 26(b).

Due to narrowband RF, single antenna and limited mobility, the MTC supports limited frequency, space and time diversity. In order to reduce fading and outage, frequency hopping is supported by MTC between different narrow bands by RF retuning.

In MTC, frequency hopping is applied to different uplink and downlink physical channels when repetition is possible. For example, if 32 subframes are used for PDSCH transmission, first 16 subframes may be transmitted on a first narrowband. Here, the RF front end is retuned to another narrow band, and the remaining 16 subframes are transmitted on the second narrow band.

The narrowband of MTC may be set to the UE via system information or DCI (downlink control information) transmitted by the BS.

(2) The MTC operates in a half duplex mode and uses a limited (or reduced) maximum transmit power. The half duplex mode refers to a mode in which a communication device operates only in an uplink or a downlink at one frequency at one time point and operates in a downlink or an uplink at another frequency at another time point. For example, when the communication device operates in the half-duplex mode, the communication device performs communication using the uplink frequency and the downlink frequency, and the communication device may not use the uplink frequency and the downlink frequency at the same time. The communication device divides time to perform uplink transmission through the uplink frequency and the downlink reception by re-tuning to the downlink frequency for another predetermined time.

(3) MTC does not use channels (defined in legacy LTE or NR) that must be distributed over the entire system bandwidth of the legacy LTE or NR. For example, in the MTC, the PDCCH of the legacy LTE is not used because the PDCCH is distributed over the entire system bandwidth. Instead, a new control channel, MPDCCH (MTC PDCCH), is defined in the MTC. The MPDCCH is transmitted/received within a maximum of 6 RBs in the frequency domain.

(4) MTC uses the newly defined DCI format. For example, DCI formats 6-0A, 6-0B, 6-1A, 6-1B, 6-2, etc., may be used as a DCI format for MTC (see 3GPP TS 36.212).

(5) In the case of MTC, a physical broadcast channel (PBCH), a physical random access channel (PRACH), an MTC physical downlink control channel (M-PDCCH), a physical downlink shared channel (PDSCH), a physical uplink control channel (PUCCH), and a physical uplink shared channel (PUSCH) may be repeatedly transmitted. Due to the MTC repeated transmission, an MTC channel may be decoded even when signal quality or power is very poor, such as in an inadequate environment such as a basement, thereby increasing a cell radius and increasing a penetration effect.

(6) In MTC, PDSCH transmission based on PDSCH scheduling (DCI) and PDSCH scheduling may occur in different subframes (cross-subframe scheduling).

(7) In the LTE system, the PDSCH carrying a general SIB1 is scheduled by the PDCCH, whereas all the resource allocation information (e.g., subframe, transport block size, narrowband index) for SIB1 decoding is determined by a parameter of the MIB and no control channel is used for SIB1 decoding of the MTC.

(8) All resource allocation information (subframe, TBS, subband index) for SIB2 decoding is determined by several SIB1 parameters and no control channel for SIB2 decoding of MTC is used.

(9) The MTC supports an extended paging (DRX) cycle. Here, the paging period refers to a period during which the UE must be wake up to check whether there is a paging from a network even when the UE is in a discontinuous reception (DRX) mode in which it does not attempt to receive a downlink signal for power saving.

(10) MTC may use the same PSS (Primary Synchronization Signal)/SSS (Secondary Synchronization Signal)/CRS (Common Reference Signal) used in legacy LTE or NR. In the case of NR, the PSS/SSS is transmitted on an SSB basis, and a tracking RS (TRS) is a cell-specific RS and may be used for frequency/time tracking.

MTC Operation Mode and Level

Next, an MTC operation mode and level will be described. MTC is classified into two operation modes (first mode, second mode) and four different levels for coverage improvement as shown in Table 8 below.

The MTC operation mode is referred to as a CE (Coverage Enhancement) mode. In this case, the first mode may be referred to as a CE mode A, and the second mode may be referred to as a CE mode B.

TABLE 8

| Mode | Level | Description |
| --- | --- | --- |
| Mode A | Level 1 | No repetition for PRACH |
|  | Level 2 | Small Number of Repetition for PRACH |

TABLE 8-continued

| Mode | Level | Description |
| --- | --- | --- |
| Mode B | Level 3 | Medium Number of Repetition for PRACH |
|  | Level 4 | Large Number of Repetition for PRACH |

The first mode is defined for small coverage enhancement to support full mobility and CSI (channel state information, in which there is no repetition or fewer repetition times. The second mode is defined for UEs with extremely poor coverage conditions that support CSI feedback and limited mobility, in which a large number of repetitive transmissions is defined. The second mode provides a coverage improvement of up to 15 dB. Each level of MTC is defined differently in the random access procedure and the paging process.

The MTC operation mode is determined by the BS, and each level is determined by the MTC UE. Specifically, the BS transmits RRC signaling including information on the MTC operation mode to the UE. Here, the RRC signaling may be an RRC connection setup message, an RRC connection reconfiguration message or an RRC connection reestablishment message.

Thereafter, the MTC UE determines a level in each operation mode and transmits the determined level to the BS. Specifically, the MTC UE determines a level in an operation mode on the basis of measured channel quality (e.g., reference signal received power (RSRP), reference signal received quality (RSRQ), or signal to interference plus noise ratio (SINR), and transmits an RACH preamble using a PRACH resource (e.g., frequency, time, preamble resource for PRACH) corresponding to the determined level, thereby informing the BS about the determined level.

MTC Guard Period

As discussed above, MTC operates in narrow band. The location of the narrow band used in the MTC may be different for each particular time unit (e.g., subframe or slot). The MTC UE may tune to different frequencies depending on the time units. A certain amount of time is required for frequency retuning, and certain amount of time is defined as a guard period of MTC. That is, a guard period is required when frequency retuning is performed while transitioning from one time unit to the next time unit, and transmission and reception do not occur during the guard period.

MTC Signal Transmission/Reception Method

Figure 27:
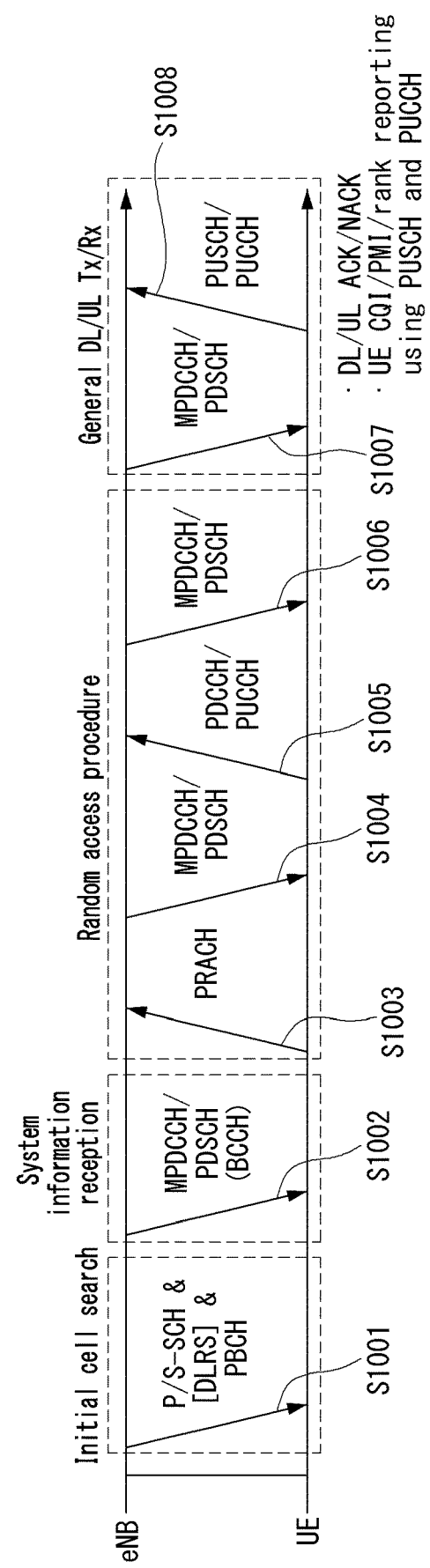
FIG. 27 is a diagram illustrating physical channels that may be used for MTC and a general signal transmission method using the same.

FIG. 27 is a diagram illustrating physical channels that may be used for MTC and a general signal transmission method using the same.

In step S1001, the MTC UE, which is powered on again or enters a new cell, performs an initial cell search operation such as synchronizing with the BS. To this end, the MTC UE receives a primary synchronization signal (PSS) and a secondary synchronization signal (SSS) from the BS, adjusts synchronization with the BS, and acquires information such as a cell ID. The PSS/SSS used in the initial cell search operation of the MTC may be a PSS/SSS, a resynchronization signal (RSS), or the like of an legacy LTE.

Thereafter, the MTC UE may receive a physical broadcast channel (PBCH) signal from the BS to acquire broadcast information in a cell.

Meanwhile, the MTC UE may receive a downlink reference signal (DL RS) in an initial cell search step to check a downlink channel state. The broadcast information transmitted through the PBCH is a master information block (MIB), and in the LTE, the MIB is repeated by every 10 ms.

Among the bits of the MIB of the legacy LTE, reserved bits are used in MTC to transmit scheduling for a new SIB1-BR (system information block for bandwidth reduced device) including a time/frequency location and a transport block size. The SIB-BR is transmitted directly on the PDSCH without any control channel (e.g., PDCCH, MPDDCH) associated with the SIB-BR.

Upon completion of the initial cell search, the MTC UE may receive an MPDCCH and a PDSCH according to the MPDCCH information to acquire more specific system information in step S1002. The MPDCCH may be transmitted only once or repeatedly. The maximum number of repetitions of the MPDCCH is set to the UE by RRC signaling from the BS.

Thereafter, the MTC UE may perform a random access procedure such as steps S1003 to S1006 to complete the connection to the BS. A basic configuration related to the RACH process of the MTC UE is transmitted by SIB2. In addition, SIB2 includes parameters related to paging. In the 3GPP system, a paging occasion (PO) refers to a time unit in which the UE may attempt to receive paging. The MTC UE attempts to receive the MPDCCH on the basis of a P-RNTI in the time unit corresponding to its PO on the narrowband (PNB) set for paging. The UE that has successfully decoded the MPDCCH on the basis of the P-RNTI may receive a PDSCH scheduled by the MPDCCH and check a paging message for itself. If there is a paging message for itself, the UE performs a random access procedure to access a network.

For the random access procedure, the MTC UE transmits a preamble through a physical random access channel (PRACH) (S1003), and receives a response message (RAR) for the preamble through the MPDCCH and the corresponding PDSCH. (S1004). In the case of a contention-based random access, the MTC UE may perform a contention resolution procedure such as transmission of an additional PRACH signal (S1005) and reception of the MPDCCH signal and corresponding PDSCH signal (S1006). The signals and/or messages Msg 1, Msg 2, Msg 3, and Msg 4 transmitted in the RACH process in the MTC may be repeatedly transmitted, and the repeat pattern is set to be different according to the CE level. Msg1 denotes a PRACH preamble, Msg2 denotes a random access response (RAR), Msg3 denotes UL transmission on the basis of a UL grant included in the RAR, and Msg4 denotes a DL transmission of the BS to Msg3.

For random access, PRACH resources for the different CE levels are signaled by the BS. This provides the same control of a near-far effect on the PRACH by grouping together UEs experiencing similar path loss. Up to four different PRACH resources may be signaled to the MTC UE.

The MTC UE estimates RSRP using a downlink RS (e.g., CRS, CSI-RS, TRS, and the like), and selects one of different PRACH resources (e.g., frequency, time, and preamble resources for PRACH) for the random access on the basis of the measurement result. The RAR for the PRACH and search spaces for the contention resolution messages for PRACH are also signaled at the BS via system information.

The MTC UE that has performed the above-described process may then receive an MPDCCH signal and/or a PDSCH signal (S1007) and transmit a physical uplink shared channel (PUSCH) signal and/or a physical uplink control channel (PUCCH) (S1108) as a general uplink/downlink signal transmission process. The MTC UE may transmit uplink control information (UCI) to the BS through the PUCCH or PUSCH. The UCI may include HARQ-ACK/NACK, scheduling request (SR), and/or CSI.

When RRC connection to the MTC UE is established, the MTC UE monitors the MPDCCH in a search space set to acquire uplink and downlink data allocation and attempts to receive the MDCCH.

In the case of MTC, the MPDCCH and the PDSCH scheduled by the MDCCH are transmitted/received in different subframes. For example, the MPDCCH having the last repetition in subframe #n schedules the PDSCH starting at subframe #n+2. The DCI transmitted by the MPDCCH provides information on how many times the MPDCCH is repeated so that the MTC UE may know when the PDSCH transmission is started. For example, when the DCI in the MPDCCH started to be transmitted from the subframe #n includes information that the MPDCCH is repeated 10 times, a last subframe in which the MPDCCH is transmitted is the subframe #n+9 and transmission of the PDSCH may start at subframe #n+11.

The PDSCH may be scheduled in the same as or different from a narrow band in which the MPDCCH scheduling the PDSCH is present. If the MPDCCH and the corresponding PDSCH are located in different narrow bands, the MTC UE needs to retune the frequency to the narrow band in which the PDSCH is present before decoding the PDSCH.

For uplink data transmission, scheduling may follow the same timing as legacy LTE. For example, the MPDCCH which is lastly transmitted at subframe #n may schedule PUSCH transmission starting at subframe #n+4.

Figure 28:
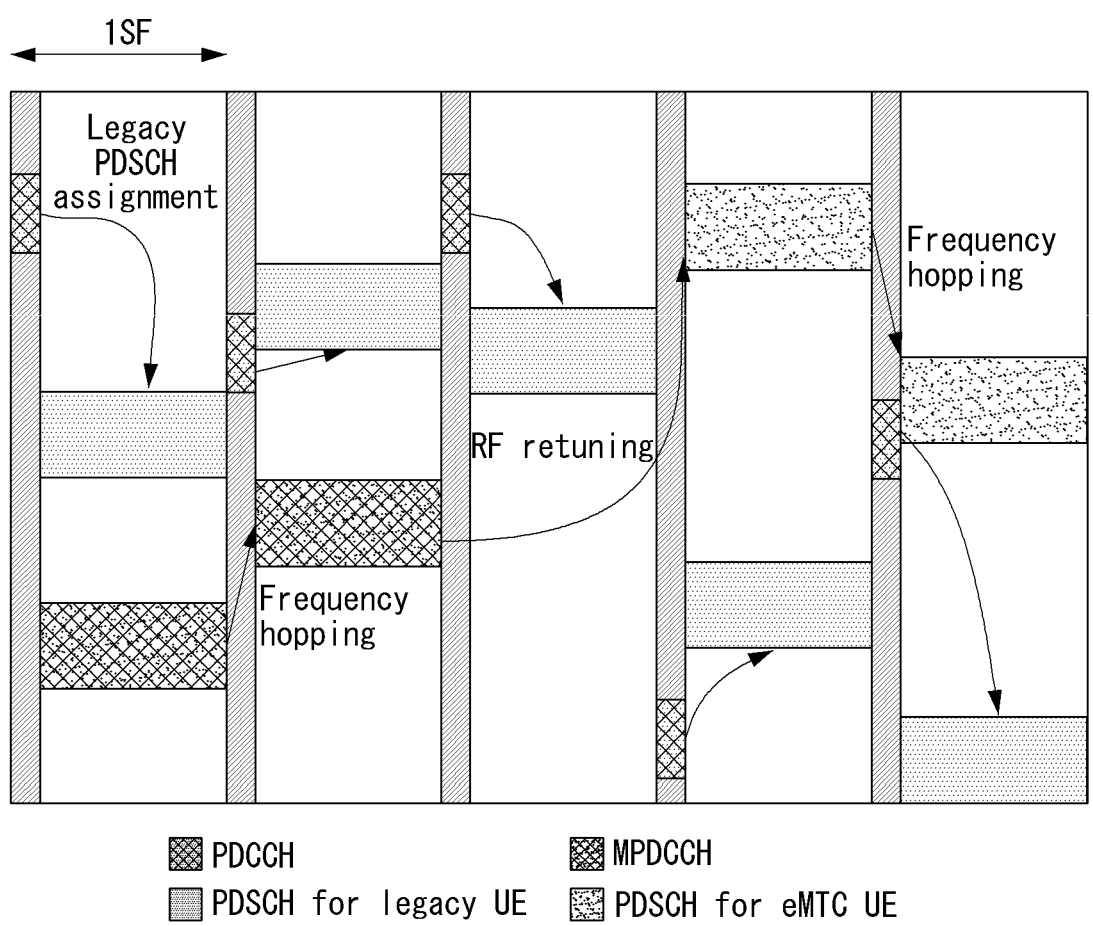
FIG. 28 is a diagram illustrating an example of scheduling for each of MTC and legacy LTE.

FIG. 28 shows an example of scheduling for MTC and legacy LTE, respectively.

In the legacy LTE, the PDSCH is scheduled using the PDCCH, which uses the first OFDM symbol(s) in each subframe, and the PDSCH is scheduled in the same subframe as the subframe in which the PDCCH is received.

In contrast, the MTC PDSCH is cross-subframe scheduled, and one subframe between the MPDCCH and the PDSCH is used as a time period for MPDCCH decoding and RF retuning. The MTC control channel and data channel may be repeated over a large number of subframes including up to 256 subframes for the MPDCCH and up to 2048 subframes for the PDSCH so that they may be decoded under extreme coverage conditions.

NB-IoT (Narrowband-Internet of Things)

The NB-IoT may refer to a system for supporting low complexity, low power consumption through a system bandwidth (system BW) corresponding to one resource block (RB) of a wireless communication system.

Here, NB-IoT may be referred to as other terms such as NB-LTE, NB-IoT enhancement, enhanced NB-IoT, further enhanced NB-IoT, NB-NR. That is, NB-IoT may be replaced with a term defined or to be defined in the 3GPP standard, and hereinafter, it will be collectively referred to as 'NB-IoT' for convenience of explanation.

The NB-IoT is a system for supporting a device (or UE) such as machine-type communication (MTC) in a cellular system so as to be used as a communication method for implementing IoT (i.e., Internet of Things). Here, one RB of the existing system band is allocated for the NB-IoT, so that the frequency may be efficiently used. Also, in the case of NB-IoT, each UE recognizes a single RB as a respective carrier, so that RB and carrier referred to in connection with NB-IoT in the present specification may be interpreted to have the same meaning.

Hereinafter, a frame structure, a physical channel, a multi-carrier operation, an operation mode, and general signal transmission/reception related to the NB-IoT in the present specification are described in consideration of the case of the legacy LTE system, but may also be extendedly applied to a next generation system (e.g., an NR system, etc.). In addition, the contents related to NB-IoT in this specification may be extendedly applied to MTC (Machine Type Communication) oriented for similar technical purposes (e.g., low-power, low-cost, coverage enhancement, etc.).

Hereinafter, a case where a transmission time interval of a physical channel is a subframe are described as an example. For example, a case where a minimum time interval from the start of transmission of one physical channel (e.g., NPDCCH, NPDSCH, NPUCCH, NPUSCH) to the start of transmission of a next physical channel is one subframe will be described, but in the following description, the subframe may be replaced by a slot, a mini-slot, or multiple slots.

Frame Structure and Physical Resource of NB-IoT

Figure 29:
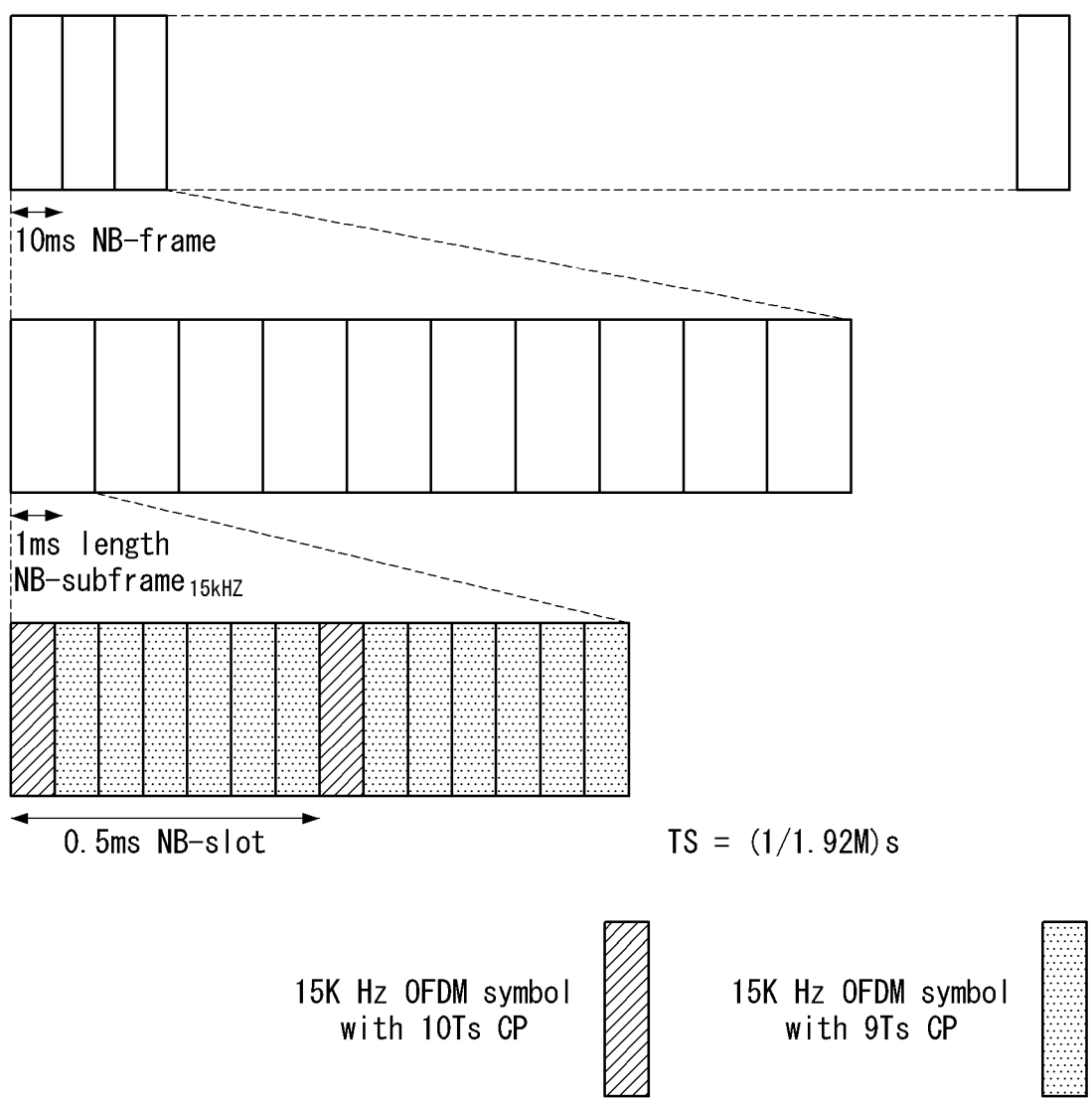
FIG. 29 shows an example of a frame structure when a subcarrier spacing is 15 kHz.
Figure 30:
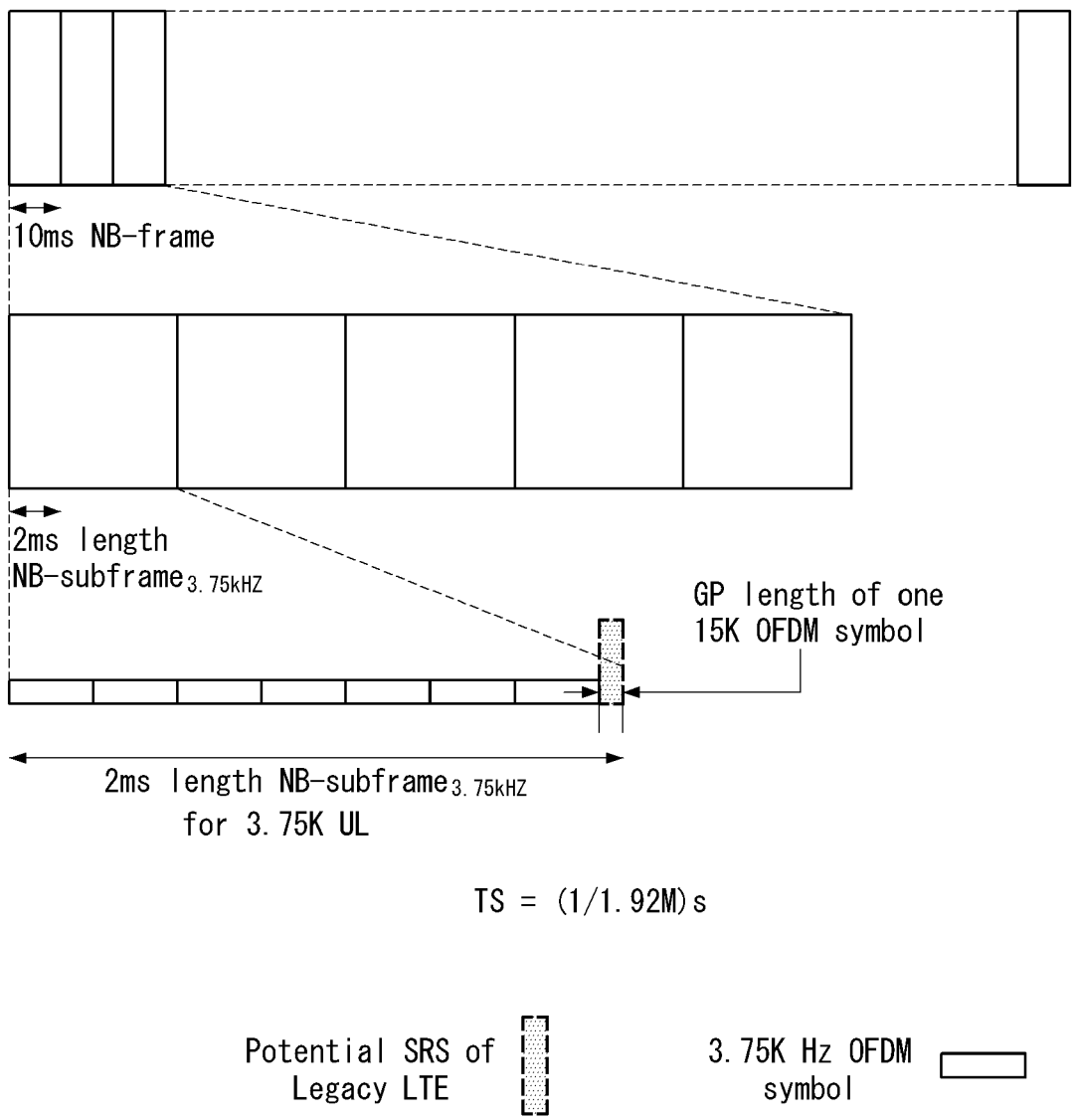
FIG. 30 shows an example of a frame structure when a subscriber spacing is 3.75 kHz.

First, the NB-IoT frame structure may be configured to be different according to subcarrier spacing. Specifically, FIG. 29 shows an example of a frame structure when a subscriber spacing is 15 kHz, and FIG. 30 shows an example of a frame structure when a subscriber spacing is 3.75 kHz. However, the NB-IoT frame structure is not limited thereto, and NB-IoT for other subscriber spacings (e.g., 30 kHz) may be considered with different time/frequency units.

In addition, although the NB-IoT frame structure on the basis of the LTE system frame structure has been exemplified in the present specification, it is merely for the convenience of explanation and the present disclosure is not limited thereto. The method described in this disclosure may also be extendedly applied to NB-IoT based on a frame structure of a next-generation system (e.g., NR system).

Referring to FIG. 29, the NB-IoT frame structure for a 15 kHz subscriber spacing may be configured to be the same as the frame structure of the legacy system (e.g., LTE system) described above. For example, a 10 ms NB-IoT frame may include ten 1 ms NB-IoT subframes, and the 1 ms NB-IoT subframe may include two 0.5 ms NB-IoT slots. Further, each 0.5 ms NB-IoT may include 7 OFDM symbols.

Alternatively, referring to FIG. 30, the 10 ms NB-IoT frame may include five 2 ms NB-IoT subframes, the 2 ms NB-IoT subframe may include seven OFDM symbols and one guard period (GP). Also, the 2 ms NB-IoT subframe may be represented by an NB-IoT slot or an NB-IoT RU (resource unit).

Next, physical resources of the NB-IoT for each of downlink and uplink will be described.

First, the physical resources of the NB-IoT downlink may be configured by referring to physical resources of other wireless communication system (e.g., LTE system, NR system, etc.), except that a system bandwidth is limited to a certain number of RBs (e.g., one RB, i.e., 180 kHz). For example, when the NB-IoT downlink supports only the 15-kHz subscriber spacing as described above, the physical resources of the NB-IoT downlink may be configured as resource regions limiting a resource grid of the LTE system shown in FIG. 31 to one RB in the frequency domain.

Figure 31:
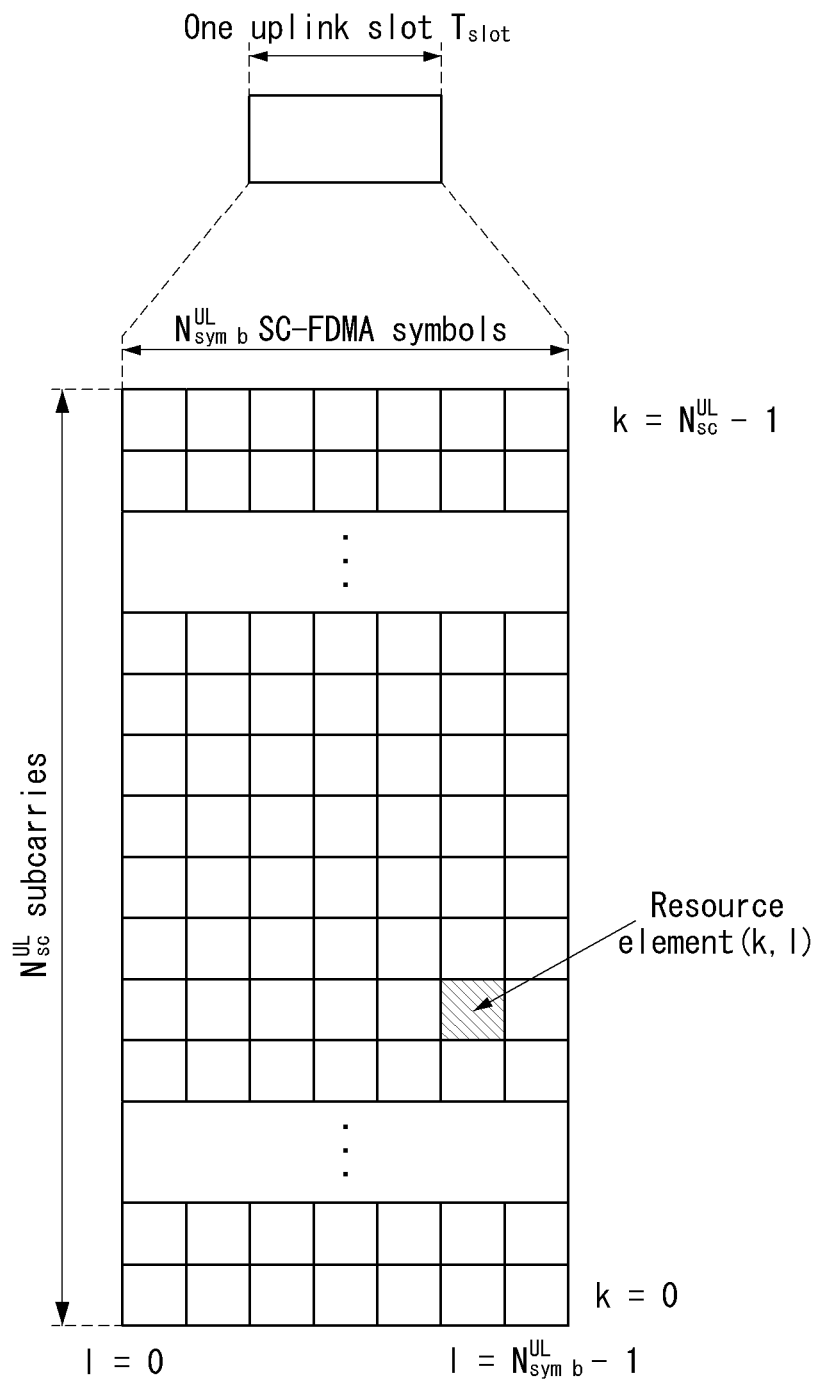
FIG. 31 shows an example of a resource grid for NB-IoT uplink.

Next, in the case of the NB-IoT uplink physical resource, the system bandwidth may be limited to one RB as in the case of downlink. For example, if the NB-IoT uplink supports 15 kHz and 3.75 kHz subscriber spacings as described above, a resource grid for the NB-IoT uplink may be expressed as shown in FIG. 31. In this case, the number of subcarriers NULsc and the slot period Tslot in the uplink band in FIG. 31 may be given as shown in Table 9 below.

TABLE 9

| Subcarrier spacing | NULsc | Tslot |
|---|---|---|
| Δf = 3.75 kHz | 48 | 6144 · Ts |
| Δf = 15 kHz | 12 | 15360 · Ts |

In NB-IoT, resource units (RUs) are used for mapping the PUSCH for NB-IoT (hereinafter referred to as NPUSCH) to resource elements. RU may include NULsymb*NULslot SC-FDMA symbols in the time domain and include NRUsc number of consecutive subcarriers in the frequency domain. For example, NRUsc and NULsymb may be given by Table 10 below for frame structure type 1, which is a frame structure for FDD, and may be given by Table 11 below for frame structure type 2, which is frame structure for TDD.

TABLE 10

| NPUSCH format | Δf | NRUsc | NULslots | NULsymb |
|---|---|---|---|---|
| 1 | 3.75 kHz | 1 | 16 | 7 |
|  | 15 kHz | 1 | 16 |  |
|  |  | 3 | 8 |  |
|  |  | 6 | 4 |  |
|  |  | 12 | 2 |  |
| 2 | 3.75 kHz | 1 | 4 |  |
|  | 15 kHz | 1 | 4 |  |

TABLE 11

| NPUSCH format | Δf | Supported uplink-downlink configurations | NRUsc | NULslots | NULsymb |
|---|---|---|---|---|---|
| 1 | 3.75 kHz | 1, 4 | 1 | 16 | 7 |
|  | 15 kHz | 1, 2, 3, 4, 5 | 1 | 16 |  |
|  |  |  | 3 | 8 |  |
|  |  |  | 6 | 4 |  |
|  |  |  | 12 | 2 |  |
| 2 | 3.75 kHz | 1, 4 | 1 | 4 |  |
|  | 15 kHz | 1, 2, 3, 4, 5 | 1 | 4 |  |

Physical Channel of NB-IoT

A BS and/or a UE supporting the NB-IoT may be configured to transmit/receive physical channels and/or physical signals configured separately from the legacy system. Hereinafter, specific contents related to physical channels and/or physical signals supported by the NB-IoT will be described.

An orthogonal frequency division multiple access (OFDMA) scheme may be applied to the NB-IoT downlink on the basis of a subscriber spacing of 15 kHz. Through this, co-existence with other systems (e.g., LTE system, NR system) may be efficiently supported by providing orthogonality between subcarriers. A downlink physical channel/signal of the NB-IoT system may be represented by adding 'N (Narrowband)' to distinguish it from the legacy system. For example, a downlink physical channel may be referred to as an NPBCH (narrowband physical broadcast channel), an NPDCCH (narrowband physical downlink control channel), or an NPDSCH (narrowband physical downlink shared channel), and a downlink physical signal may be referred to as an NPSS (narrowband primary synchronization signal), an NSSS (narrowband secondary synchronization signal), an NRS (narrowband reference signal), an NPRS (narrowband positioning reference signal), an NWUS (narrowband wake up signal), and the like. Generally, the downlink physical channels and physical signals of the NB-IoT may be configured to be transmitted on the basis of a time domain multiplexing scheme and/or a frequency domain multiplexing scheme. In the case of NPBCH, NPDCCH, NPDSCH, etc., which are the downlink channels of the NB-IoT system, repetition transmission may be performed for coverage enhancement. In addition, the NB-IoT uses a newly defined DCI format. For example, the DCI format for NB-IoT may be defined as DCI format N0, DCI format N1, DCI format N2, and the like.

In the NB-IoT uplink, a single carrier frequency division multiple access (SC-FDMA) scheme may be applied on the basis of a subscriber spacing of 15 kHz or 3.75 kHz. As mentioned in the downlink section, the physical channel of the NB-IoT system may be expressed by adding 'N (Narrowband)' to distinguish it from the existing system. For example, the uplink physical channel may be represented by a narrowband physical random access channel (NPRACH) or a narrowband physical uplink shared channel (NPUSCH), and the uplink physical signal may be represented by a narrowband demodulation reference signal (NDMRS), or the like. NPUSCH may be divided into NPUSCH format 1 and NPUSCH format 2. In one example, NPUSCH Format 1 may be used for uplink shared channel (UL-SCH) transmission (or transport), and NPUSCH Format 2 may be used for uplink control information transmission such as HARQ ACK signaling. In the case of NPRACH, which is an uplink channel of the NB-IoT system, repetition transmission may be performed for coverage enhancement. In this case, repetition transmission may be performed by applying frequency hopping.

Multi-Carrier Operation of NB-IoT

Next, a multi-carrier operation of the NB-IoT will be described. The multicarrier operation may refer to that multiple carriers set for different uses (i.e., different types) are used for transmitting/receiving channels and/or signals between the BS and/or UE in the NB-Iot.

The NB-IoT may operate in a multi-carrier mode. Here, in the NB-IoT, a carrier wave in the N-Iot may be classified as an anchor type carrier (i.e., an anchor carrier, an anchor PRB) and a non-anchor type carrier a non-anchor type carrier (i.e., non-anchor carrier).

The anchor carrier may refer to a carrier that transmits NPSS, NSSS, NPBCH, and NPDSCH for a system information block (N-SIB) for initial access from a point of view of the BS. That is, in NB-IoT, the carrier for initial access may be referred to as an anchor carrier and the other(s) may be referred to as a non-anchor carrier. Here, only one anchor carrier wave may exist in the system, or there may be a plurality of anchor carrier waves.

Operation Mode of NB-IoT

Figure 32:
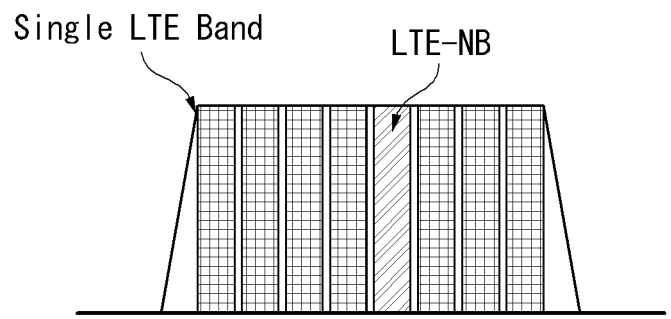
FIG. 32 shows an example of an NB-IoT operation mode.
Figure 32:
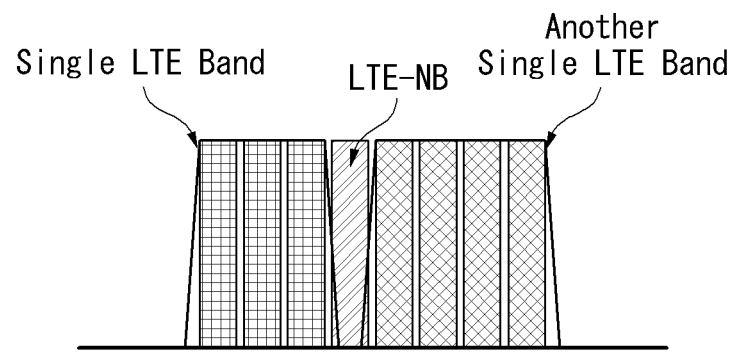
Figure 32:
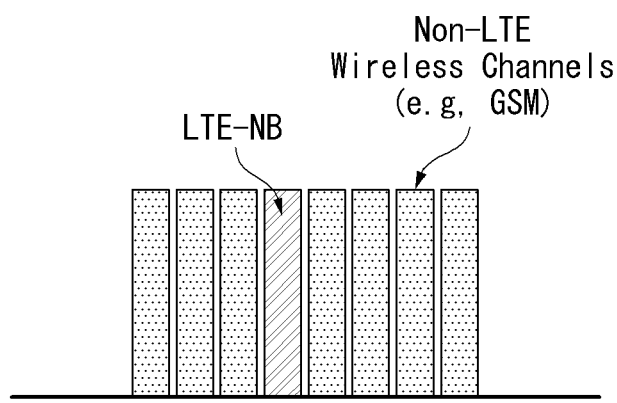

Next, an operation mode of the NB-IoT will be described. In the NB-IoT system, three operation modes may be supported. FIG. 32 shows an example of operation modes supported in the NB-IoT system. Although the operation mode of the NB-IoT is described herein on the basis of an LTE band, this is for convenience of explanation and may be extendedly applied to other system bands (e.g. NR system band).

Specifically, FIG. 32(a) shows an example of an in-band system, FIG. 32 (b) shows an example of a guard-band system, and FIG. 32(c) Represents an example of a stand-alone system. In this case, the in-band system may be expressed as an in-band mode, the guard-band system may be expressed as a guard-band mode, and the stand-alone system may be expressed in a stand-alone mode.

The in-band system may refer to a system or mode that uses a specific RB in the (legacy) LTE band. The in-band system may be operated by allocating some resource blocks of the LTE system carrier.

A guard-band system may refer to a system or mode that uses NB-IoT in a space reserved for a guard-band of the legacy LTE band. The guard-band system may be operated by allocating a guard-band of an LTE carrier not used as a resource block in the LTE system. For example, the (legacy) LTE band may be configured to have a guard-band of at least 100 kHz at the end of each LTE band, and with two non-contiguous guard-bands for 200 kHz for NB-IoT may be used.

As described above, the in-band system and the guard-band system may be operated in a structure in which NB-IoT coexists in the (legacy) LTE band.

By contrast, the stand-alone system may refer to a system or mode that is configured independently of the legacy LTE band. The stand-alone system may be operated by separately allocating frequency bands (e.g., reassigned GSM carriers in the future) used in a GERAN (GSM EDGE radio access network).

The three operation modes described above may be operated independently of each other, or two or more operation modes may be operated in combination.

NB-IoT Signal Transmission/Reception Process

Figure 33:
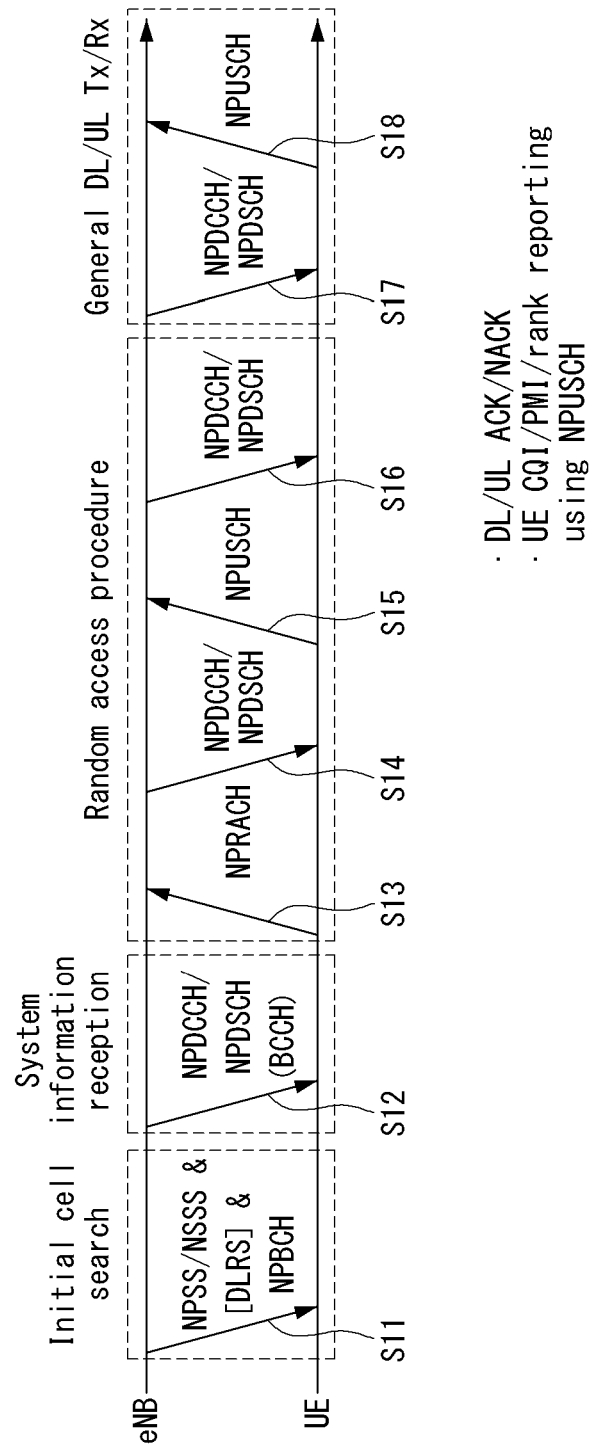
FIG. 33 is a diagram illustrating an example of physical channels that may be used for NB-IoT and a general signal transmission method using the same.

FIG. 33 is a diagram illustrating an example of physical channels that may be used for NB-IoT and a general signal transmission method using the same. In a wireless communication system, an NB-IoT UE may receive information from a BS through a downlink (DL) and the NB-IoT UE may transmit information to the BS through an uplink (UL). In other words, in the wireless communication system, the BS may transmit information to the NB-IoT UE through the downlink and the BS may receive information from the NB-IoT UE through the uplink.

The information transmitted/received by the BS and the NB-IoT UE includes data and various control information, and various physical channels may exist depending on the type/purpose of the information transmitted/received by the BS and NB-IoT UE. The signal transmission/reception method of the NB-IoT may be performed by the above-described wireless communication devices (e.g., BS and UE).

The NB-IoT UE, which is powered on again or enters a new cell, may perform an initial cell search operation such as adjusting synchronization with the BS, or the like (S11). To this end, the NB-IoT UE receives NPSS and NSSS from the BS, performs synchronization with the BS, and acquires cell identity information. Also, the NB-IoT UE may receive the NPBCH from the BS and acquire the in-cell broadcast information. In addition, the NB-IoT UE may receive a DL RS (downlink reference signal) in the initial cell search step to check a downlink channel state.

After completion of the initial cell search, the NB-IoT UE may receive the NPDCCH and the corresponding NPDSCH to acquire more specific system information (S12). In other words, the BS may transmit more specific system information by transmitting the NPDCCH and corresponding NPDSCH to the NB-IoT UE after completion of the initial cell search.

Thereafter, the NB-IoT UE may perform a random access procedure to complete connection to the BS (S13 to S16).

Specifically, the NB-IoT UE may transmit a preamble to the BS via the NPRACH (S13). As described above, the NPRACH may be configured to be repeatedly transmitted on the basis of frequency hopping or the like to enhance coverage or the like. In other words, the BS may (repeatedly) receive a preamble through the NPRACH from the NB-IoT UE.

Thereafter, the NB-IoT UE may receive a random access response (RAR) for the preamble from the BS through the NPDCCH and the corresponding NPDSCH (S14). In other words, the BS may transmit the RAR for the preamble to the NB-IoT UE through the NPDCCH and the corresponding NPDSCH.

Thereafter, the NB-IoT UE transmits the NPUSCH to the BS using scheduling information in the RAR (S15), and may perform a contention resolution procedure such as the NPDCCH and the corresponding NPDSCH (S16). In other words, the BS may receive the NPUSCH from the UE using the scheduling information in the NB-IoT RAR, and perform the contention resolution procedure.

The NB-IoT UE that has performed the above-described process may perform NPDCCH/NPDSCH reception (S17) and NPUSCH transmission (S18) as a general uplink/downlink signal transmission process. In other words, after performing the above-described processes, the BS may perform NPDCCH/NPDSCH transmission and NPUSCH reception as a general signal transmission/reception process to the NB-IoT UE.

In the case of NB-IoT, as mentioned above, NPBCH, NPDCCH, NPDSCH, and the like may be repeatedly transmitted for coverage improvement and the like. In the case of NB-IoT, UL-SCH (i.e., general uplink data) and uplink control information may be transmitted through the NPUSCH. Here, the UL-SCH and the uplink control information (UCI) may be configured to be transmitted through different NPUSCH formats (e.g., NPUSCH format 1, NPUSCH format 2, etc.).

Also, the UCI may include HARQ ACK/NACK (Hybrid Automatic Repeat and reQuest Acknowledgement/Negative-ACK), SR (Scheduling Request), CSI (Channel State Information), and the like. As described above, the UCI in the NB-IoT may generally be transmitted via the NPUSCH. Also, in response to a request/instruction from the network (e.g., BS), the UE may transmit the UCI via the NPUSCH in a periodic, aperiodic, or semi-persistent manner.

Hereinafter, the wireless communication system block diagram shown in FIG. 1 will be described in detail.

N. Wireless Communication Device

Referring to FIG. 1, a wireless communication system includes a first communication device 910 and/or a second communication device 920. 'A and/or B' may be interpreted to have the same meaning as 'includes at least one of A or B.' The first communication device may represent a BS and the second communication device may represent a UE (alternatively, the first communication device may represent a UE and the second communication device may represent a BS).

The first and second communication devices may include processors 911 and 921, memories 914 and 924, one or more Tx/Rx RF modules 915 and 925, Tx processors 912 and 922, Rx processors 913 and 923, and antennas 916 and 926, respectively. The Tx/Rx module is also called a transceiver. The processor implements the functions, procedures and/or methods discussed above. More specifically, in the DL (communication from the first communication device to the second communication device), a higher layer packet from the core network is provided to the processor 911. The processor implements the function of a layer 2 (i.e., L2) layer. In the DL, the processor multiplexes a logical channel and a transport channel, provides radio resource allocation to the second communication device 920, and is responsible for signaling to the second communication device. A transmission (TX) processor 912 implements various signal processing functions for the L1 layer (i.e., the physical layer). The signal processing function facilitates forward error correction (FEC) in the second communication device, and includes coding and interleaving. The encoded and interleaved signals are scrambled and modulated into complex-valued modulation symbols. For modulation, BPSK (Quadrature Phase Shift Keying), QPSK (Quadrature Phase Shift Keying), 16QAM (quadrature amplitude modulation), 64QAM, 246QAM, and the like may be used. The complex-valued modulation symbols (hereinafter referred to as modulation symbols) are divided into parallel streams, each stream being mapped to an OFDM subcarrier and multiplexed with a reference signal (RS) in the time and/or frequency domain, and combined together using IFFT (Inverse Fast Fourier Transform) to create a physical channel carrying a time domain OFDM symbol stream. The OFDM symbol stream is spatially precoded to produce multiple spatial streams. Each spatial stream may be provided to a different antenna 916 via a separate Tx/Rx module (or transceiver, 915). Each Tx/Rx module may upconvert each spatial stream into an RF carrier for transmission. In the second communication device, each Tx/Rx module (or transceiver, 925) receives a signal of the RF carrier via each antenna 926 of each Tx/Rx module. Each Tx/Rx module restores the RF carrier signal to a baseband signal and provides it to the reception (RX) processor 923. The RX processor implements various signal processing functions of the L1 (i.e., the physical layer). The RX processor may perform spatial processing on the information to recover any spatial stream directed to the second communication device. If multiple spatial streams are directed to the second communication device, they may be combined into a single OFDMA symbol stream by multiple RX processors. The RX processor transforms the OFDM symbol stream, which is a time domain signal, into a frequency domain signal using a fast Fourier transform (FFT). The frequency domain signal includes a separate OFDM symbol stream for each subcarrier of the OFDM signal. The modulation symbols and the reference signal on each subcarrier are recovered and demodulated by determining the most likely signal constellation points sent by the first communication device. These soft decisions may be based on channel estimate values. Soft decisions are decoded and deinterleaved to recover data and control signals originally transmitted by the first communication device on the physical channel. The corresponding data and control signals are provided to the processor 921.

The UL (communication from the second communication device to the first communication device) is processed in the first communication device 910 in a manner similar to that described in connection with a receiver function in the second communication device 920. Each Tx/Rx module 925 receives a signal via each antenna 926. Each Tx/Rx module provides an RF carrier and information to RX processor 923. The processor 921 may be related to the memory 924 that stores program code and data. The memory may be referred to as a computer-readable medium.

The above-mentioned 5G communication technique may be applied in combination with the methods as proposed in this specification, which will be described later in FIGS. 34 to 47. Alternatively, the above-mentioned 5G communication technique may be added for embodying or clarifying the technical features of the methods as proposed herein.

Hereinafter, a voice enable device searching method and apparatus according to an embodiment of the present disclosure will be described in detail with reference to FIGS. 34 to 47.

Figure 34:
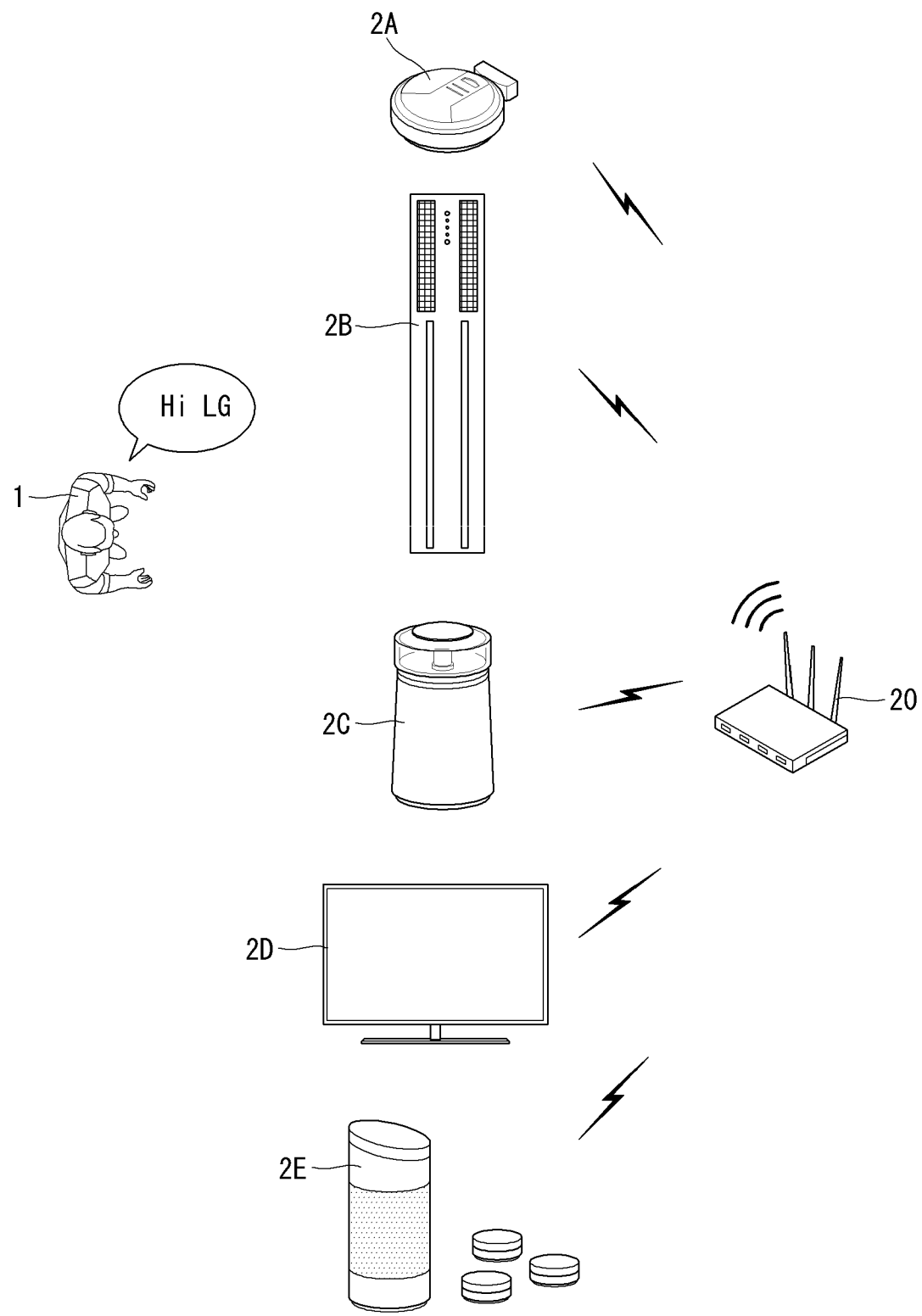
FIG. 34 shows the IoT system according to the embodiment of the present disclosure.

FIG. 34 shows the IoT system according to the embodiment of the present disclosure.

As shown in FIG. 34, according to an embodiment of the present disclosure, the IoT system may include a plurality of IoT devices 2A, 2B, 2C, 2D, and 2E that receive wake-up voice (e.g., "Hi LG") and a router 20. The router 20 may establish a wired/wireless communication network with the plurality of IoT devices 2A, 2B, 2C, 2D, and 2E, and may send and receive data using the wired/wireless communication network.

When each of the plurality of IoT devices recognizes a wake-up voice uttered by the user 1, each IoT device may transmit an audio signal resulting from recognizing the wake-up voice to the router 20.

The router 20 transmits the audio signal transmitted from each IoT device to a voice enable device searching apparatus (not shown). The voice enable device searching apparatus may analyze the transmitted audio signal. Based on the analysis results, the voice enable device searching apparatus may create a candidate group including some IoT devices (e.g., robot cleaner 2A, and air purification device 2C) or all IoT devices (robot cleaner 2A, air conditioner 2B, air purification device 2C, TV 2D and speaker 2E).

The voice enable device searching apparatus may select a voice enable device to respond to the wake-up voice among at least one device of the generated candidate group. The router 20 may transmit information to the selected voice enable device to indicate that the device has been selected as the voice enable device to respond to the wake-up voice.

Figure 35:
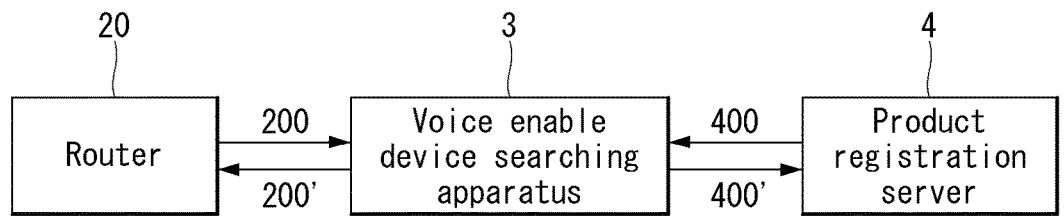
FIG. 35 shows the voice enable device searching system according to the embodiment of the present disclosure.

FIG. 35 shows the voice enable device searching system according to the embodiment of the present disclosure.

As shown in FIG. 35, according to an embodiment of the present disclosure, the voice enable device searching system may include the router 20, a voice enable device searching apparatus 3 connected to the router 20 via the wired/wireless network, and a product registration server 4 connected with voice enable device searching apparatus 3 via the wired/wireless network.

The router 20 may transmit IoT device information 200 including the audio signal transmitted from each IoT device to the voice enable device searching apparatus 3 using the wired/wireless network. For example, the IoT device information 200 may include the corresponding audio signal, the device ID of the IoT device that transmitted the corresponding audio signal, and the IP address of the corresponding IoT device.

The voice enable device searching apparatus 3 may receive the IoT device information 200 of each received IoT device using the wired/wireless network, and then may request 400' product registration information 400 corresponding to the device ID of the corresponding IoT device while transmitting the device ID of the IoT device to the product registration server 4.

In response to the request of the product registration information, the product registration server 4 may transmit the product registration information 400 corresponding to the device ID transmitted from the voice enable device searching apparatus 3 to the voice enable device searching apparatus 3. For example, the product registration information 400 may include the device ID of the corresponding IoT device and the user account stored in the product registration server 4 along with the device ID.

Upon receiving the product registration information 400, the voice enable device searching apparatus 3 may search a plurality of voice enable devices to be included in the candidate group based on the user account included in the received product registration information 400, the device ID and IP address included in the device information 200, and the audio signal. Further, the voice enable device searching apparatus 3 may include the plurality of voice enable devices as searched into the candidate group. Then, based on a predetermined condition (for example, the distance from the user 1 who has uttered the wake-up voice to each IoT device), the voice enable device searching apparatus 3 may select the voice enable device to respond to the up voice among the plurality of candidate voice-enabled devices in the candidate group.

Figure 36:
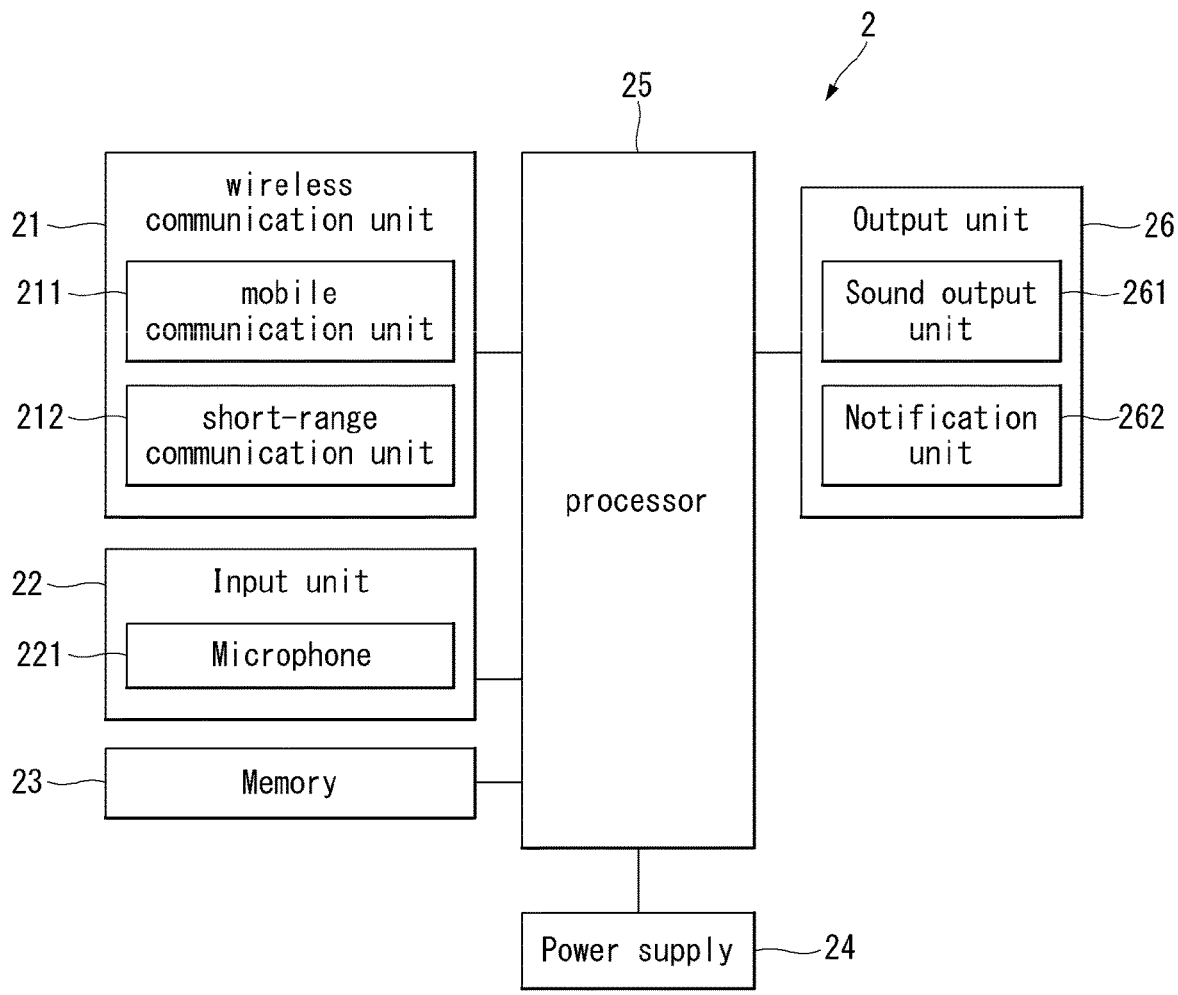
FIG. 36 is a block diagram showing the detailed configuration of the IoT device according to the embodiment of the present disclosure.

FIG. 36 is a block diagram showing the detailed configuration of the IoT device according to the embodiment of the present disclosure.

As shown in FIG. 36, according to one embodiment of the present disclosure, the IoT device 2 may include a wireless communication unit 21, an input unit 22, a memory 23, a power supply 24, an output unit 26 and a processor 25. The processor 25 controls the wireless communication unit 21, the input unit 22, the memory 23, the power supply 24, and the output unit 26.

The wireless communication unit 21 may also forward the audio signal received from the input unit to the processor 25. Further, the wireless communication unit 21 may receive, from the external voice enable device searching apparatus, a notification that a device is selected as the voice enable device to respond to the wake-up voice.

The wireless communication unit 21 may include one or more modules that enable wireless communication between the IoT device 2 and the wireless communication system, between the IoT device 2 and another IoT device, or between the IoT device 2 and the external server. Further, the wireless communication unit 21 may include one or more modules connecting the IoT device 2 to one or more networks.

The wireless communication unit 21 may include a mobile communication unit 211 and a short-range communication unit 212, which may transmit and receive data to and from an external IoT device or an external device, such as an external server or a cloud.

The mobile communication unit 211 transmits and receives a radio signal to and from at least one of a base station, an external terminal and a server on a mobile communication network constructed according to technical standards or communication schemes for mobile communication, for example, GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), etc. The radio signal may include various types of data for voice call, video call signal or text/multimedia message transmission/reception.

The short-range communication unit 212 is configured for short-range communication and may use at least one of Bluetooth™, RFID (Radio Frequency Identification), Infrared Data Association (IrDA), UWB (Ultra Wideband), Zig-Bee, NFC (Near Field Communication), Wi-Fi (Wireless-Fidelity), Wi-Fi Direct, Wireless USB (Wireless Universal Serial Bus) to support the short-range communication. This short-range communication unit 212 may support wireless communication between the IoT device 2 and the wireless communication system, between the IoT device 2 and another IoT device, or between the IoT device 2 and the network containing another IoT device, using the short-range wireless communication network. The short-range wireless communication network may be a wireless personal area network.

The input unit 22 may include an interface for inputting audio information or signal, data, or information input from a user. The input unit 22 may include a microphone 221 for recognizing an external wake-up voice.

The microphone 221 processes the external audio signal into electrical voice data. The processed voice data may be used variously depending on the function being executed in the IoT device 2 or the application program being executed. Further, the microphone 221 may be implemented with various noise reduction algorithms for eliminating noise generated in receiving an external audio signal.

The memory 23 stores data that supports various functions of IoT device 2. The memory 170 may store a plurality of application programs or applications driven by the IoT device 2, data and instructions for operation of the IoT device 2. At least some of these application programs may be downloaded from an external server using wireless communication. Further, at least some of these application programs may exist on IoT device 2 from the time of shipment for basic functions of the IoT device 2, for example, data reception and transmission functions. Further, the application program is stored in memory 23 and may be installed on the IoT device 2 and may be driven by the processor 25 to perform the operation or function of the IoT device 2.

Under the control of the processor 25, the power supply 24 receives and supplies external power and internal power to each component included in the IoT device 2. The power supply 24 includes a battery. The battery may be an internal battery or a replaceable battery.

The output unit 26 may include an audio output unit 261 for outputting an audio signal based on the control of the processor 25. The output unit 26 may include a notification unit 262 that outputs a tactile signal based on the control of the processor 25.

The processor 25 may, for example, analyze a voice signal that recognizes the transmitted wake-up voice. The processor 25 may analyze the voice signal to generate a plurality of different types of distance information including features relating to the distance from the location (user's location) where the wake-up voice was spoken to the corresponding IoT device 2. In another example, the processor 25 may be configured to transmit the voice signal recognizing the wake-up voice to the response device determination apparatus 3 such that the response device determination apparatus 3 may analyze the voice signal to generate a plurality of distance information.

The processor 25 may include a voice processing interface to perform analysis of the voice signal.

Further, the processor 25 may transmit the device ID and the shared IP address stored in the memory 23 and the audio signal recognized by the input unit 22 to the voice enable device searching apparatus 3 using the wireless communication unit 21.

Hereinafter, the voice processing process performed in the IoT device environment and/or the cloud environment or the server environment will be described with reference to FIGS. 37 and 38.

Figure 37:
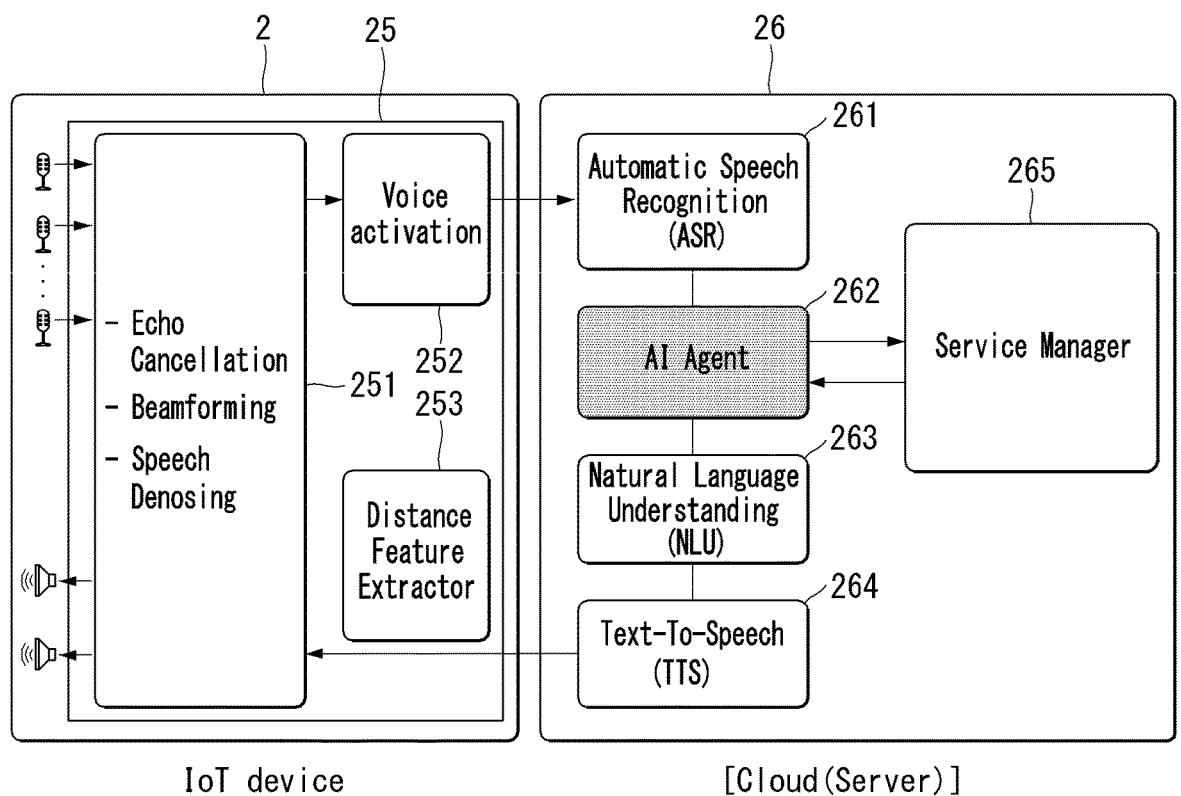
FIG. 37 is a block diagram of one example of the detailed configuration for voice processing by a processor in FIG. 36.

FIG. 37 shows an example in which receiving the voice may be done on the IoT device 2, and the process of synthesizing the voice by processing the input voice, that is, the overall operation of the voice processing may be performed in the cloud environment 26. On the other hand, FIG. 38 shows an example of on-device processing in which the IoT device 12 performs the overall operation of the voice processing for synthesizing the voice by processing the input voice as described above.

Figure 38:
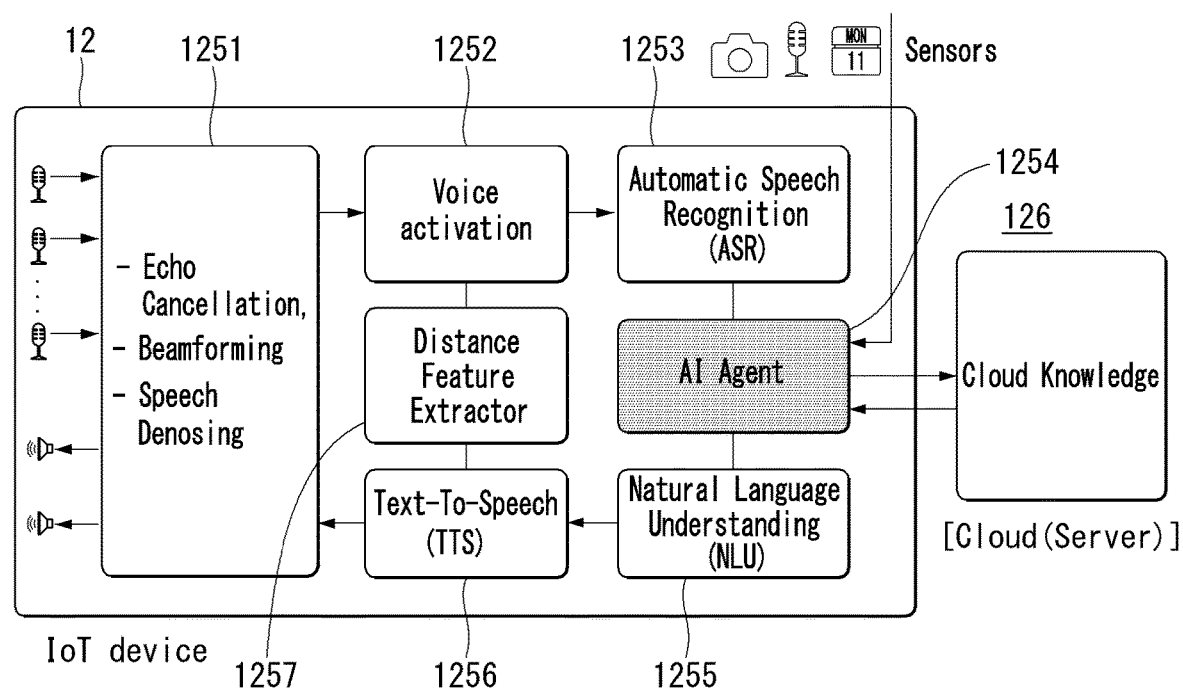
FIG. 38 is a block diagram of another example of the detailed configuration for voice processing by a processor in FIG. 36.

In FIG. 37 and FIG. 38, the IoT device environment 2 or 12 may be referred to as the IoT device, while the cloud environment 26 or 126 may be referred to as a server.

FIG. 37 is a block diagram of one example of the detailed configuration of the processor in FIG. 36.

Various components are required to process voice events in an end-to-end voice UI environment. The sequence in which the voice event is processed includes the voice signal acquisition and playback, speech pre-processing, voice activation, speech recognition, natural language processing, extraction of distance information, and finally, the distance information transmission from the IoT device to the response device determination apparatus.

The IoT device 2 may include an input module. The input module can receive user input from the user. For example, an input module may receive user input from a connected external device, for example, a keyboard or headset. Further, for example, an input module may include a touch screen. Further, for example, an input module may include a hardware key located at a user terminal. The input module may be the input unit 22 of FIG. 36.

According to one embodiment, the input module may include at least one microphone that may receive the user's speech as a voice signal. The input module includes a speech input system. The speech input system may be used to receive the user's speech as a voice signal. The at least one microphone may determine the digital input signal related to the user's speech by generating an input signal for the audio input. According to one embodiment, a plurality of microphones may be implemented in an array form. The array may be configured in a geometric pattern, for example, a linear geometric shape, a circular geometric shape, or any other pattern. For example, for a given point, the array of four sensors may be configured in a circular pattern in which the sensors are separated by 90 degrees to receive the sound in the four directions. In some implementations, the microphone may include sensors of spatially different arrays within a data communication range. A networked array of sensors may be included therein. The microphone may include omni-directional, or directional (e.g., shotgun) microphones.

The IoT device 2 may include a pre-processing module 251, which may pre-process the input voice signal received using the input module, for example a microphone.

The pre-processing module 251 may include an adaptive echo canceller (AEC) function, to remove the echo included in the user voice signal that was input using the microphone. The pre-processing module 251 can eliminate background noise included in the user input by including the noise suppression (NS) function therein. The pre-processing module 251 also includes an end-point detect (EPD) function, to detect the end-point of the user voice and locate the location of the user voice in the sound. Further, the pre-processing module 251 may include an automatic gain control (AGC) function to adjust the volume of the user input to recognize and process the user input reliably.

The IoT device 2 may include a voice recognition activation module 252. The voice recognition activation module 252 may recognize a wake up command that recognizes the user's call. The voice recognition activation module 252 may detect a predetermined keyword (e.g., "Hi LG") from the user input that has been subjected to a pre-processing process. The voice recognition activation module 252 may be in a standby state and may perform always-on keyword detection function.

The IoT device 2 may include a distance feature extractor 253 for analyzing the audio signal obtained by pre-processing the wake-up voice speech from the user and for extracting distance information from an audio signal. However, the present disclosure is not limited thereto. A response device determination apparatus other than the IoT device 2 may extract distance information directly from the audio signal.

The IoT device 2 may send the user voice input to the cloud server. Automatic voice recognition (ASR), and natural language understanding (NLU) operations as a key function for processing the user voice are traditionally executed in the cloud due to computing, storage, and power constraints. The cloud may include a cloud device 26 that processes user input sent from a client. The cloud device 26 may be in the form of a server.

The cloud device 26 may include Auto Speech Recognition (ASR) module 261, Artificial Intelligent Agent 262, Natural Language Understanding (NLU) module 263, Text-to-Speech (TTS) module 264, and service manager 265.

The ASR module 261 may convert user voice input received from IoT device 2 into text data.

The ASR module 261 includes a front-end speech pre-processor. The front-end speech pre-processor extracts representative features from the speech input. For example, the front-end speech pre-processor performs a Fourier transform on a speech input to extract spectral features that characterize a speech input as a sequence of representative multidimensional vectors. Further, the ASR module 261 includes one or more speech recognition models, e.g., an audio model and/or a language model, and may implement one or more speech recognition engines. Examples of speech recognition models include hidden Markov models, Gaussian-Mixture Models, Deep Neural Network Models, n-gram language models, and other statistical models. Examples of speech recognition engines include dynamic time distortion based engines and weighted finite state translator (WFST) based engines. One or more speech recognition models and one or more speech recognition engines may be used to process representative features of the front-end speech pre-processor to generate intermediate recognition results (e.g., phonemes, phoneme character string, and sub-words), and ultimately text recognition results Sequence) (e.g., words, word character string, sequence of tokens).

If the ASR module 261 generates a recognition result that includes a text character string, e.g., words, a sequence of words, or a sequence of tokens), the recognition results are passed to the natural language processing module 12532 for intention reasoning. In some examples, the ASR module 12530 generates multiple candidate text expressions of the speech input. Each candidate text expression is a sequence of words or tokens corresponding to the speech input.

The NLU module 263 may perform a syntactic analysis or a semantic analysis to determine a user's intention. In the syntactic analysis, the voice is divided into grammatical units, for example, words, phrases, morphemes. The syntactic analysis may figure out what grammatical elements the divided portions of the voice input are. The semantic analysis may be performed using semantic matching, rule matching, or formula matching. Accordingly, the NUL module 263 may obtain information about the domain of the user input and the intention of the user input or the parameter necessary to express the intention of the user input.

The NLU module 263 may determine the user intention and parameters using mapping rules between the domain, intention and parameters needed to identify the intention. For example, one domain (for example, alarm) may include a plurality of intentions, for example, an alarm setting, an alarm deactivation). One intention may include a number of parameters, for example, time, number of repetitions, alarms, and so on. A plurality of rules may, for example, include one or more required element parameter. The matching rules may be stored in a Natural Language Understanding Database.

The NLU module 263 identifies the meaning of words extracted from user input by using linguistic features (for example, grammatical elements) such as of morpheme or phrases, etc. The intention of the user may be determined by matching the identified meanings of the words to the domain and intention. For example, the NLU module 263 may determine the user intention by calculating how much of the word extracted from the user input is included in each domain and intention. According to one embodiment, the NLU module 263 may determine the parameters of the user input using the words which are used as a reference to determine the intention. According to one embodiment, the NLU module 263 may determine the intention of the user using a natural language recognition database storing therein a linguistic feature for identifying the intention of a user input. Further, according to one embodiment, the NLU module 263 may determine the intention of a user using a personal language model (PLM). For example, the NLU module 263 may determine the intention of a user using personalized information, such as a contact list, a music list, schedule information, or social network information. The personalization language model may be stored, for example, in a natural language recognition database. According to one embodiment, the NLU module 263 as well as ASR module 261 may recognize the user voice by referring to the personalized language model stored in the natural language recognition database.

The NLU module 263 may include a natural language creation module (not shown). The natural language creation module may change the specified information to text. The changed information into the text form may be in the form of natural language speech. The specified information may include, for example, information about additional input, information that indicates the completion of the action corresponding to the user input, or information that indicates the user additional input. The information changed into the text form may be transmitted to the IoT device and displayed on the display, or transmitted to the TTS module to be changed to the voice form.

The voice synthesis module (TTS module) 264 may change information in the form of text to information in the form of voice. The TTS module 264 receives information in text form from the natural language generation module of the NLU module 263. Then, the information of the text type may be converted into voice type information which then may be transmitted to the IoT device 2. The IoT device 2 may output the voice information using a speaker.

The voice synthesis module 264 synthesizes the speech output based on the provided text. For example, the result generated by the voice recognition module ASR 261 is in the form of a text characters string. The voice synthesis module 264 converts the text characters string into an audible speech output. The voice synthesis module 264 uses any suitable speech synthesis technique to generate the speech output from the text. This includes but is not limited to, concatenative synthesis, unit selection synthesis, diphone synthesis, domain-specific synthesis, formant synthesis, articulatory synthesis, HMM (hidden Markov model) based synthesis and sinewave synthesis.

In some instances, the voice synthesis module 264 is configured to synthesize individual words based on the phoneme string corresponding to the words. For example, the phoneme string is associated with a word in the generated text string. The phoneme string is stored in the meta data associated with the word. The voice synthesis module 264 is configured to directly process the phoneme strings in the meta data to synthesize words of speech type.

Since the cloud environment generally has more processing power or resources than the IoT device has, the cloud environment may obtain higher quality speech output than the IoT device. However, the present disclosure is not limited to this. In fact, the voice synthesis process may be done on the client side (see FIG. 38).

Further, according to one embodiment of the present disclosure, an additional intelligent agent (AI agent) 262, may be included in the cloud environment. The intelligent agent 262 may be designed to perform at least some of the functions performed by the ASR module 261, the NLU module 262 and/or the TTS module 264 as described above. Further, the intelligent agent module 262 may contribute to performing the independent functions of the ASR module 261, the NLU module 262 and/or the TTS module 264, respectively.

The intelligent agent module 262 may perform the functions as described above using the deep learning. The deep learning, when there is any data, represents the data in a form that the computer can understand (for example, in the case of an image, pixel information is represented using a column vector). In order to apply the representation to the learning, many studies are going (on how to create better representation techniques and how to create a model to learn the representation). As a result of these efforts, various deep learning techniques have been developed such as the deep neural networks (DNN), CNN (convolutional deep neural networks), RNN (Recurrent Boltzmann Machine), RBM (Restricted Boltzmann Machine), DBN (deep belief networks), and deep Q-Network and then may be applied to fields such as computer vision, voice recognition, natural language processing, and voice/signal processing.

Currently, all major commercial voice recognition systems such as MS Kotana, Skype Translator, Google Now, Apple Siri and others are based on deep-learning techniques.

In particular, the intelligent agent module 262 can perform a variety of natural language processing processes including machine translation, emotion analysis, and information search using a deep artificial neural network structure in the natural language processing field.

Further, the cloud environment may include the service manager 265, which may collect various personalized information to support the functions of the intelligent agent 262. The personalized information obtained using the service manager may include at least one data (calendar application, messaging service, music application, etc.) that the IoT device 2 uses with the cloud environment, at least one sensing data collected by the IoT device 2 and/or cloud 26 (camera, microphone, temperature, humidity, gyro sensor, C-V2X, pulse, ambient light, iris scan), or off device data that is not directly related to the IoT device 2. For example, the personalized information may include maps, SMS, News, Music, Stock, Weather, and Wikipedia information.

The intelligent agent 262 is represented as a separate block to distinguish it from the ASR module 261, the NLU module 263, and the TTS module 264. However, the intelligent agent 262 may perform at least some or all of the functions of the modules 261, 262 and 264.

In the above example, the intelligent agent 262 is implemented in the cloud environment due to computing operation, storage, and power constraints, but the present disclosure is not limited thereto.

For example, FIG. 38 is the same as shown in FIG. 37, except that the intelligent agent AI is included in the IoT device.

FIG. 38 is a block diagram showing another example of the detailed configuration of the processor in FIG. 36.

The IoT device 12 and cloud environment 126 shown in FIG. 38 may correspond to the IoT device 2 and the cloud environment 26 as described in FIG. 37 with some differences therebetween in configuration and function. Thus, see FIG. 37 for the specific function of the corresponding block.

Referring to FIG. 38, the IoT device 12 may include a pre-processing module 1251, a voice recognition activation module 1252, an ASR module 1253, an intelligent agent 1254, an NLU module 1255, a TTS module 1256, and a distance feature extractor 1257. Further, the IoT device 2 may include an input module such as at least one microphone and at least one output module.

Further, the cloud environment may include cloud knowledge 126, which stores personalized information in the form of knowledge.

See FIG. 37 for the function of each module as shown in FIG. 38. However, the ASR module 1253, the NLU module 1255, and the TTS module 1256 are included in the IoT device 12. Thus, communication thereof with the cloud may not be required for voice processing process including the voice recognition and voice synthesis. This enables immediate and real-time voice processing operations.

Each module shown in FIG. 37 and FIG. 38 is only an example to illustrate the voice processing process. More or fewer modules than the modules shown in FIG. 37 and FIG. 38 may be present. Further, it should be noted that more than one module may be combined with each other, or different modules or modules of different arrangements may be present. The various modules shown in FIG. 37 and FIG. 38 may be implemented using one or more signal processing and/or ASIC (application specific integrated circuits), hardware, software instructions for execution by one or more processors, firmware, or a combination thereof.

Figure 39:
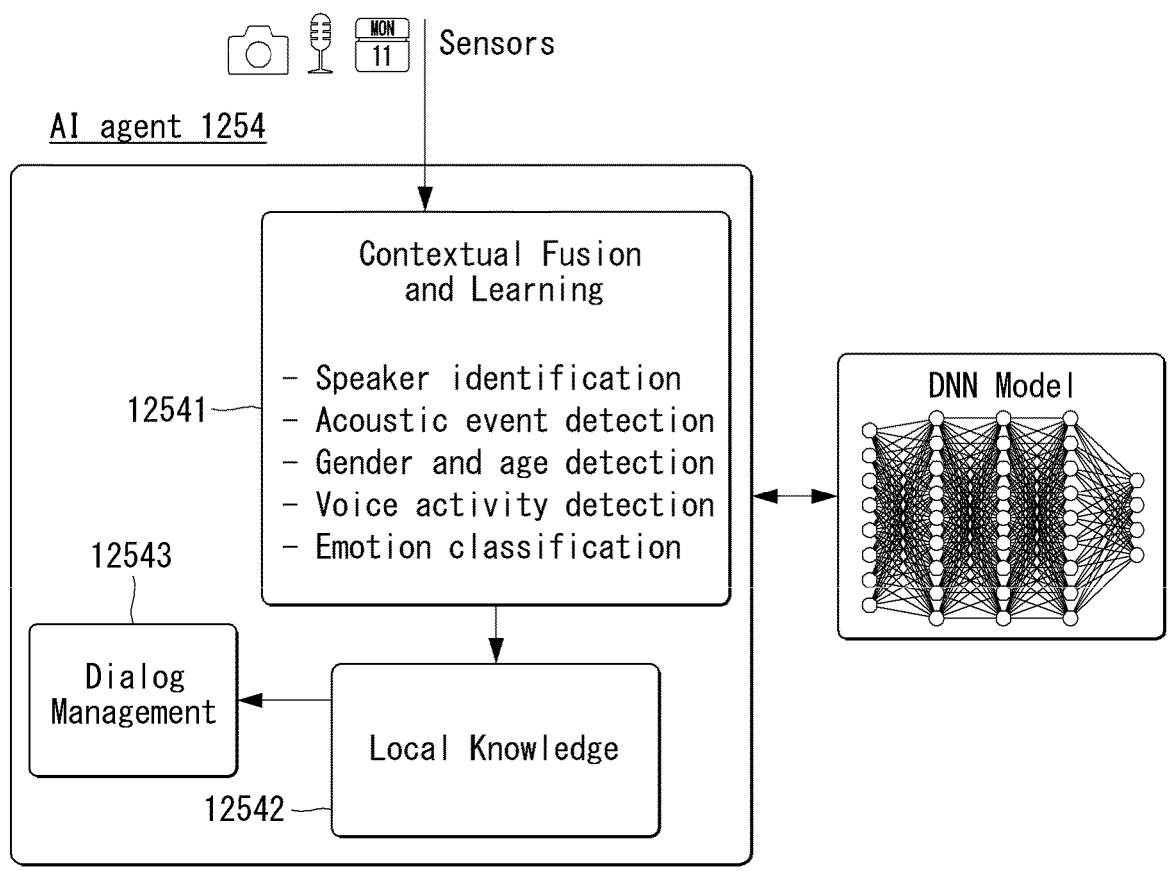
FIG. 39 is a block diagram showing the details of the intelligent agent in FIG. 37 and FIG. 38.

FIG. 39 shows a schematic block diagram of intelligent agents in FIG. 37 and FIG. 38.

Referring to FIG. 39, the intelligent agent 1254 performs the ASR operation, NLU operation, and TTS operation and distance information extraction operation in the voice processing process as described using FIG. 37 and FIG. 38, and may support interactive operation with the user. Alternatively, the intelligent agent 1254 may use the context information to allow the NLU module 263 to further clarify or supplement or further define the information included in the text expressions received from the ASR module 261.

In this connection, the context information may include IoT device user preference, IoT device hardware and/or software status, various sensor information collected before, during or after the user input, previous interactions between the intelligent agent and the user (for example, conversations). Herein, the context information is dynamic and thus varies depending on the time, location, content of the conversation, and other factors.

The intelligent agent 1254 may further include a context fusion and learning module 12541, local knowledge 12542, and dialog management 12543.

The context fusion and learning module 12541 may learn the user's intention based on at least one data. The at least one data may include at least one sensing data obtained from the IoT device or cloud environment. Further, the at least one data may include speaker identification, acoustic event detection, speaker personal information (gender and age detection), VAD (voice activity detection), and emotion classification.

The speaker identification may mean specifying the speaking person in a group of conversations as registered using voice. The speaker identification may include the process of identifying a pre-registered speaker or registering as a new speaker. The acoustic event detection can recognize the type of sound and the place where the sound occurs, by recognizing audio itself beyond voice recognition technology. The VAD is a speech processing technique that detects the presence or absence of a human speech voice in an audio signal that may include music, noise, or other sounds. According to one example, the intelligent agent 1254 may check the presence or absence of the speech from the input audio signal. According to one example, the intelligent agent 1254 may distinguish between speech data and non-speech data using a deep neural network (DNN) model. Further, the intelligent agent 1254 may perform Emotion Classification operation on speech data using a deep neural network (DNN) model. Using the emotion classification operation, the speech data may be classified into anger, boredom, fear, happiness, and sadness.

The context fusion and learning module 12541 may include a DNN model to perform the above operation and may identify the intent of the user input based on the sensing information collected from the DNN model and IoT device or cloud environment.

The at least one data is merely an example, and may include any data that may be referenced to identify the user's intention in the voice processing process. The at least one data may, of course, be obtained using the DNN model as described above.

The intelligent agent 1254 may include Local Knowledge 12542. The local knowledge 12542 may include user data. The user data may include user preference, user address, user's default setting language, and user's contact list. According to one example, the intelligent agent 1254 may additionally define the user intention by supplementing the information included in the user's voice input using specific information of the user. For example, in respond to a user request "Invite my friends to my birthday party", the intelligent agent 1254 does not require the user of providing clear information to determine who "friends" are, when and where "birthday party" is to be held, etc. Rather, the local knowledge 12542 may be used by the intelligent agent 1254 to get information.

The intelligent agent 1254 may include Dialog Management 12543. The intelligent agent 1254 may provide a dialog interface to enable voice interaction with a user. The dialog interface may refer to the process of outputting a response to a user's voice input using a speaker or display. In this connection, the final result to be output using the dialog interface may be based on the above-described ASR operation, NLU operation, TTS operation, and distance information extraction operation.

Figure 40:
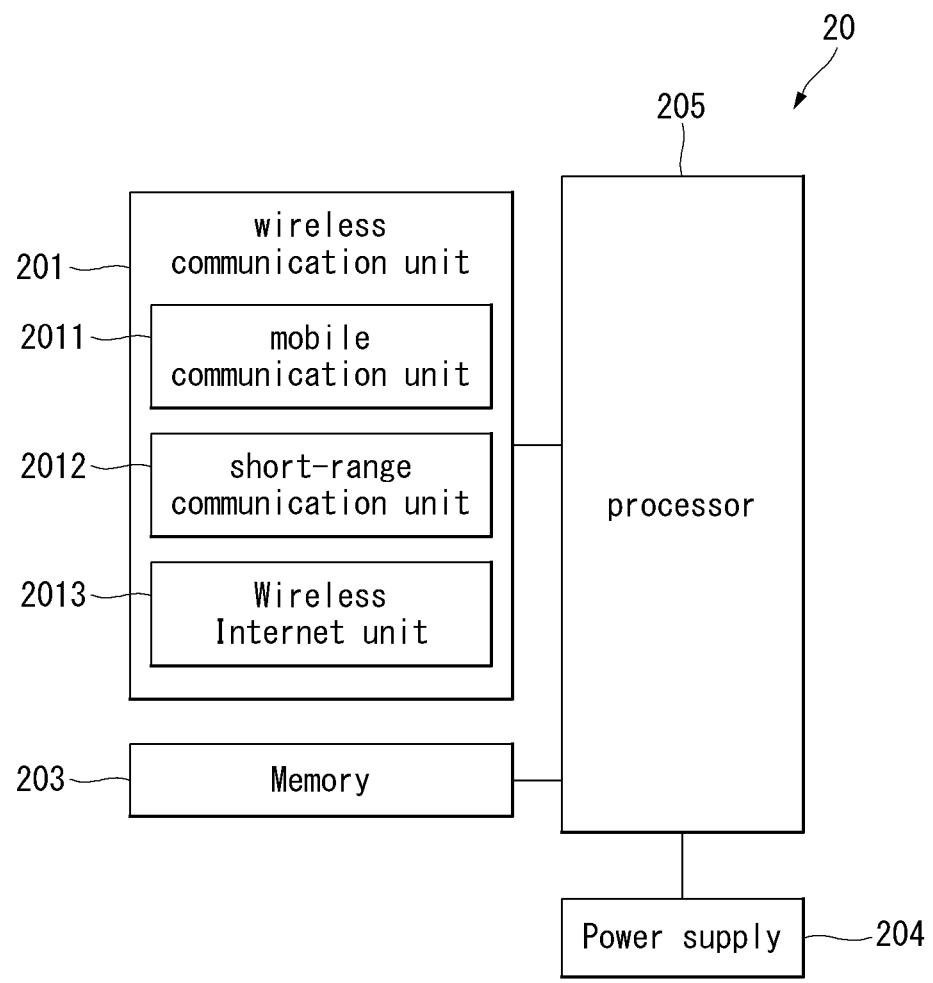
FIG. 40 is a block diagram showing the detailed configuration of the router according to the embodiment of the present disclosure.

FIG. 40 is a block diagram showing the detailed configuration of the router according to the embodiment of the present disclosure.

As shown in FIG. 40, according to an embodiment of the present disclosure, the router 20 controls the wireless communication unit 201, the memory 203, the power supply unit 204, and each interface 201, 203, 204. It may include a processor 205 for.

Basic characteristics of the wireless communication unit 201 of the router 20, the mobile communication unit 2011 of the wireless communication unit, the short range communication unit 2012, the memory 203, the power supply unit 204, and the processor 205 will be described with reference to FIG. Since the wireless communication unit 21, the mobile communication unit 211, the short-range communication unit 212, the memory 23, the power supply unit 24, and the processor 25 have the same basic characteristics, the detailed description thereof will be omitted.

The wireless communication unit 201 may further include a wireless internet unit 2013 for accessing the wireless internet. The wireless internet unit 2013 refers to a module for wireless internet access and may be embedded or external to the router 20. The wireless internet module 2013 is configured to transmit and receive wireless signals in a communication network according to wireless internet technologies.

Examples of wireless Internet technologies include Wireless LAN (WLAN), Wireless-Fidelity (Wi-Fi), Wireless Fidelity (Wi-Fi) Direct, Digital Living Network Alliance (DLNA), Wireless Broadband (WiBro), and WiMAX (World), Interoperability for Microwave Access (HSDPA), High Speed Downlink Packet Access (HSDPA), High Speed Uplink Packet Access (HSUPA), Long Term Evolution (LTE), Long Term Evolution-Advanced (LTE-A), and the like, and the wireless internet module 2013 transmits and receives data according to at least one wireless Internet technology in a range including internet technologies not listed above.

In view of the fact that wireless Internet access by WiBro, HSDPA, HSUPA, GSM, CDMA, WCDMA, LTE, LTE-A, etc. is made through a mobile communication network, the wireless internet module 2013 for performing wireless Internet access through the mobile communication network may be understood as a kind of mobile communication module 2012.

For example, the wireless communication unit 201 may receive device information including a plurality of voice signals or audio signals from a plurality of IoT devices and transmit the received device information to the processor 205. The processor 205 may transmit the received device information to the voice enable device searching apparatus using the wireless communication unit 201.

Further, the wireless communication unit 201 may receive information on the IoT device selected as the voice enable device to respond to the wake-up voice from the voice enable device searching apparatus, and may send a command instructing the selected IoT device to respond to the wake-up voice.

The memory 203 may store therein instructions for use by the processor 205.

Figure 41:
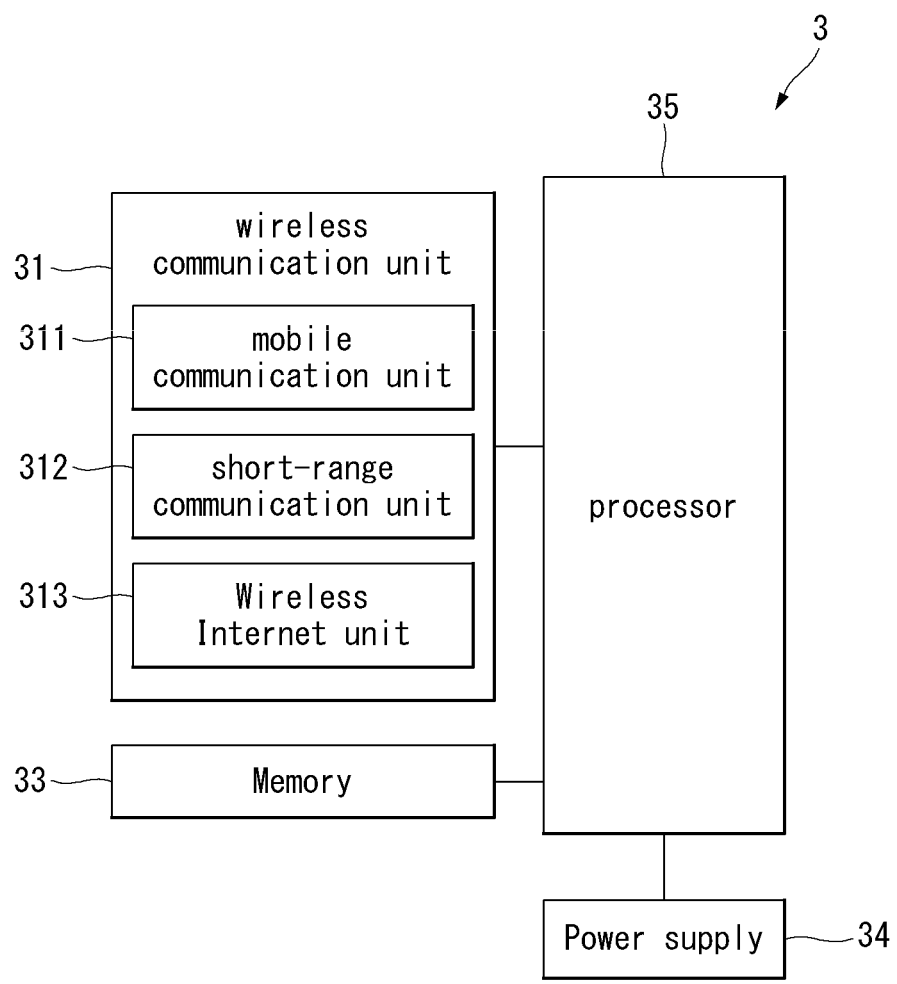
FIG. 41 is a block diagram showing the detailed configuration of the voice enable device searching apparatus according to the embodiment of the present disclosure.

FIG. 41 is a block diagram showing the detailed configuration of the voice enable device searching apparatus according to the embodiment of the present disclosure.

As shown in FIG. 41, according to an embodiment of the present disclosure, the voice enable device searching apparatus 3 may include a wireless communication unit 31, a memory 33, a power supply 34, and a processor 35.

The wireless communication unit 31 of the voice enable device searching apparatus 3, and the mobile communication unit 311 of the wireless communication unit 31, and the short-range communication unit 312 thereof may perform functions of the wireless communication unit 21 of the IoT device 2, and the mobile communication unit 211 of the wireless communication unit 21, and the short-range communication unit 212 thereof as described above with reference to FIG. 36 respectively. Further, the wireless Internet unit 313 of the voice enable device searching apparatus 3 may perform the function of the wireless Internet unit 2013 of the router 20 as described with reference to FIG. 40.

The power supply 34 of the voice enable device searching apparatus 3 of FIG. 41 may perform the functions of the power supply 24 of the IoT device 2 as described with reference to FIG. 36 and the power supply 204 of the router 20 as described with reference to FIG. 40.

The memory 33 may store therein the device information of each IoT device received using the wireless communication unit 31 and the product registration information received from the product registration server 4 using the wireless communication unit 31.

The processor 35 may obtain device information (e.g., an audio signal, the device ID of the IoT device that transmitted the audio signal, the IP address of the IoT device) from the router 20 using the wireless communication unit 31. The processor may obtain the product registration information (e.g., device ID, user account) from the product registration server 4.

The processor 35 searches the at least one user account corresponding to the IoT device that transmitted the device information using the obtained device information and product registration information. Further, the processor 35 searches at least one registered device registered in the user account that has been detected using the device information and product registration information. Further, the processor 35 searches at least one shared device that shares the IP with the IoT device that transmitted the device information using the device information.

The processor 35 may include the at least one registration device and at least one shared device as searched into the candidate group. The processor 35 may select a voice enable device corresponding to a predetermined condition as a voice enable device to respond to the wake-up voice among the plurality of IoT devices or voice enable devices included in the generated candidate group.

The processor 35 sends a request to the router 20 to wake up the IoT device selected as the voice enable device to respond to the wake-up voice using the wireless communication unit 31. The processor may cause the router 20 to wake up the selected IoT device.

Figure 42:
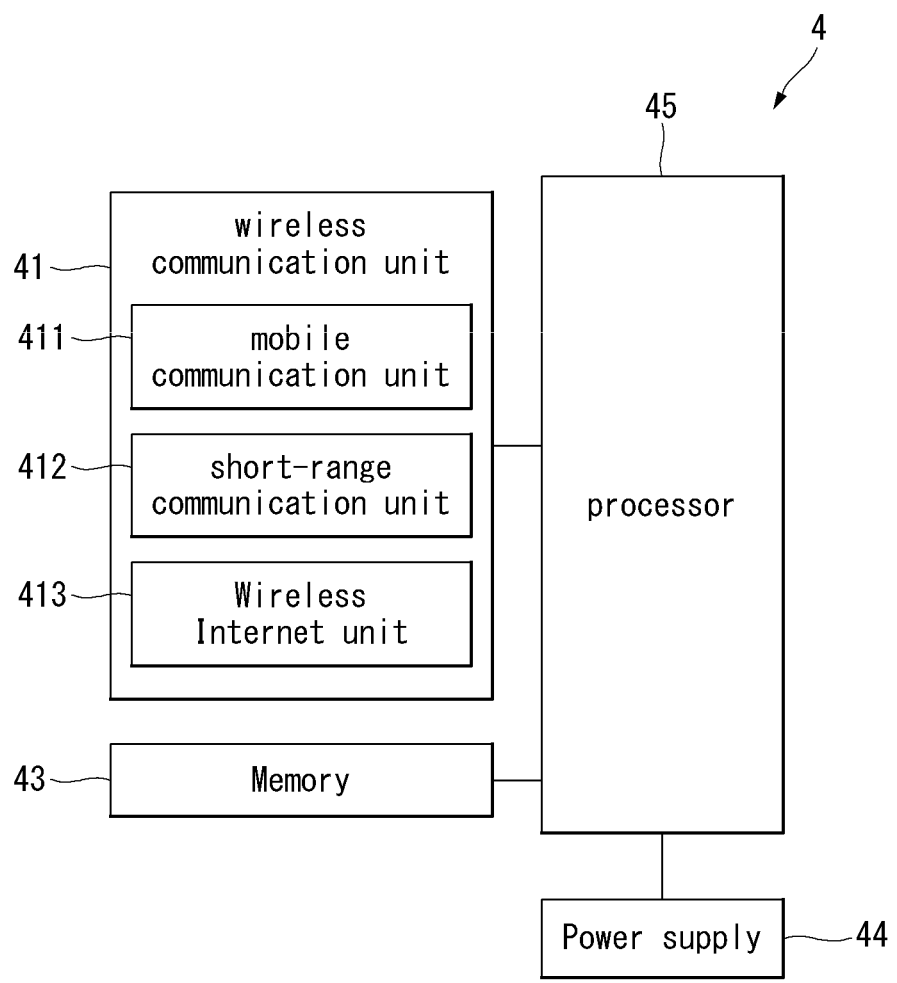
FIG. 42 is a block diagram showing the details of the product registration server according to the embodiment of the present disclosure.

FIG. 42 is a block diagram showing the details of the product registration server according to the embodiment of the present disclosure.

As shown in FIG. 42, according to an embodiment of the present disclosure, the product registration server 4 may include a wireless communication unit 41, a memory 43, a power supply 44 and a processor 45.

The wireless communication unit 41 of the product registration server 4, the mobile communication unit 411 of the wireless communication unit 41, and the short-range communication unit 412 thereof may perform functions of the wireless communication unit 21 of the IoT device 2, the mobile communication unit 211 of the wireless communication unit 21, and the short-range communication unit 212 thereof as described with reference to FIG. 36 respectively. Further, the wireless Internet unit 413 of the product registration server 4 may perform the function of the wireless Internet unit 2013 of the router 20 described with reference to FIG. 40.

The power supply 34 of the product registration server 4 in FIG. 42 may also perform the functions of the power supply 24 of the IoT device 2 described with reference to FIG. 36 and the power supply 204 of the router 20 described with reference to FIG. 40.

The memory 43 may store therein the previously generated product registration information (a device ID and a user account corresponding to the device).

The processor 45 may receive a request of the product registration information from the voice enable device searching apparatus 3 using the wireless communication unit 31. The processor 45 may transmit the product registration information stored in the memory 43 to the voice enable device searching apparatus 3 using the wireless communication unit 41 in response to the request of the product registration information.

Figure 43:
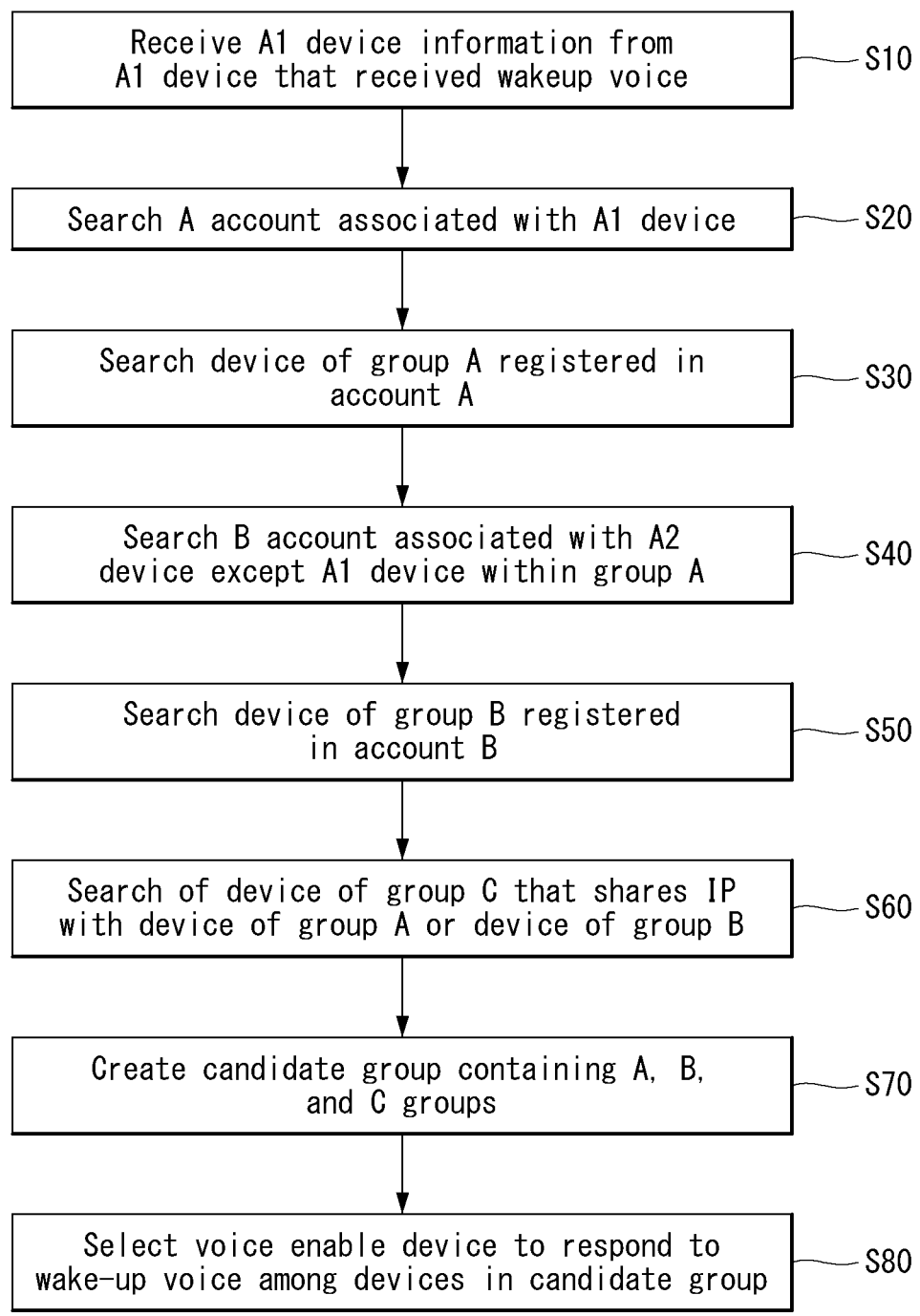
FIG. 43 is a flow chart showing the voice enable device searching method according to the embodiment of the present disclosure.

FIG. 43 is a flow chart showing the voice enable device searching method according to the embodiment of the present disclosure.

As shown in FIG. 43, according to an embodiment of the present disclosure, the voice-activated device searching apparatus (e.g., voice-enabled device searching apparatus 3 in FIG. 35) may receive A1 device information about the A1 device from the A1 device (e.g., IoT device 2A, 2B, 2C, 2D, or 2E in FIG. 34, or IoT device 2 in FIG. 36) receiving the wake-up voice using the router 20 S10. For example, the A1 device information may include an audio signal generated by the A1 device 2 recognizing the wake-up voice. For example, the A1 device information may include the device ID of the AI device 2. For example, the A1 device information may include the IP address shared by the A1 device 2.

The voice enable device searching apparatus 3 may search the A account associated with the A1 device 2 S20. For example, the voice enable device searching apparatus 3 transmits the request of the device ID of the A1 device included in the A1 device information acquired from the A1 device 2 and the user account linked with the A1 device to the product registration server (for example, the product registration server 4 as shown in FIG. 35). In response, the product registration server 4 may transmit the product registration information 400 including the device ID of the A1 device and the user account associated with the A1 device to the voice enable device searching apparatus 3. Upon receiving the product registration information, the voice enable device searching apparatus 3 may acquire an A account (A user account) linked with the A1 device from the product registration information.

The voice enable device searching apparatus 3 may search the device of the A group registered in the searched A account S30. For example, the voice enable device searching apparatus 3 may send a request of the searched A account, and a list of the plurality of devices registered in the A account (for example, a plurality of device IDs of the plurality of devices) to the product registration server 4. In response, the product registration server 4 may send a list of the plurality of devices A1, A2, . . . AN (A group) registered in the A account (for example, device IDs of the A1, A2, . . . , AN devices) to the voice enable device searching apparatus 3. Upon receiving the ID list of the A group, the voice enable device searching apparatus 3 may acquire the device list (A1, A2, . . . , AN) of the A group.

The voice enable device searching apparatus 3 searches the B account linked to the A2 device (or A2, . . . , AN device) as a remaining device except for the already-searched A1 device in the searched A group S40. For example, the voice enable device searching apparatus 3 may transmit a request of the B account linked with the A2 device as a device of the A group together with the device ID of the A2 device to the product registration server 4. In response, the product registration server 4 may transmit the B account or B user account stored therein together with the device ID of the A2 device to the voice enable device searching apparatus 3.

The voice enable device searching apparatus 3 may search the device of the B group registered in the acquired B account S50. For example, the voice enable device searching apparatus 3 may send a request of the B account, and a list of devices in the B group registered in the B account (for example, device IDs of the devices in the B group) to the product registration server 4 as in the case of searching the device in the A group. In response, the voice enable device searching apparatus 3 may receive a list of devices of the group B from the product registration server 4.

The voice enable device searching apparatus 3 may search the device of the C group sharing the IP address with each of the plurality of devices of the A group or the devices of the B group which are searched using the S30 and S50 steps. For example, the voice enable device searching apparatus 3 may acquire a list of a plurality of C1 devices sharing IP with a plurality of devices of the A group from the router 20 and may acquire a list of a plurality of C2 devices sharing IP with a plurality of devices of the B group from the router 20. The voice enable device searching apparatus 3 may create a C3 group including the plurality of C1 devices and the plurality of C2 devices.

The voice enable device searching apparatus 3 may generate a candidate group including the A group, the B group, and the C group, which are respectively searched using the steps S30, S50 and S60.

The voice enable device searching apparatus 3 may select a voice enable device to respond to the wake-up voice according to a predetermined condition among the devices of the generated candidate group S80.

Figure 44:
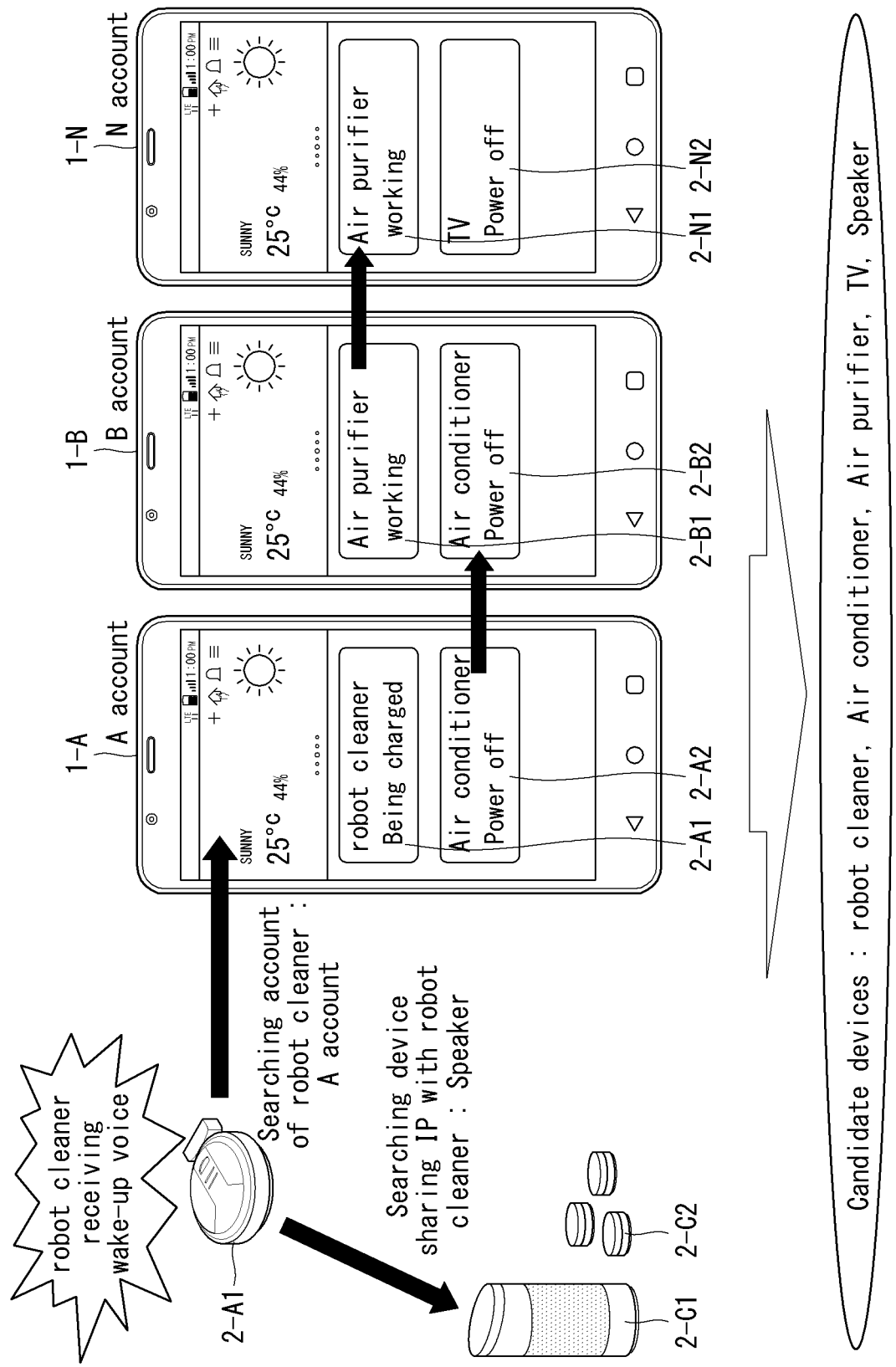
FIG. 44 shows the voice enable device search process of FIG. 43.

FIG. 44 shows the voice enable device searching process of FIG. 43.

As shown in FIG. 44, according to an embodiment of the present disclosure, the voice enable device searching apparatus 3 may acquire an audio signal generated by recognizing the wake-up voice from a robot cleaner 2-A1 that has received a wake-up voice among the plurality of IoT devices.

The voice enable device searching apparatus 3 may search the A account as a user account linked with the robot cleaner 2-A1 via the product registration server 4 and based on the obtained audio signal.

The voice enable device searching apparatus 3 may search the A group (robot cleaner 2-A1, air conditioner 2-A2) registered in the A account via the product registration server 4.

The voice enable device searching apparatus 3 may search the B account linked to the air conditioner 2-A2 included in the A group via the product registration server 4.

The voice enable device searching apparatus 3 may search a group B (air purification device 2-B1, air conditioner 2-B2) registered in the B account.

The voice enable device searching apparatus 3 may search a N account linked with the air purification device 2-B1 included in the B group. In this connection, the N is not limited to a specific number.

The voice enable device searching apparatus 3 may search a N group (air purification device 2-N1 and TV 2-N2) associated with the N account.

The voice enable device searching apparatus 3 may search a speaker 2-C1 or 2-C2 as a device sharing an IP with at least one of devices in the A group, B group, and N group (robot cleaner, air conditioner, air purification device, TV).

The voice enable device searching apparatus 3 configures the devices (robot cleaner, air conditioner, air purification device, TV, speaker) in the A group, B group, N group, C group (C1 and C2) as the candidate devices. The voice enable device searching apparatus 3 may include the candidate devices into the candidate group. Then, the voice enable device searching apparatus 3 may select the voice enable device to respond to the wake-up voice among the devices included in the candidate group.

Figure 45:
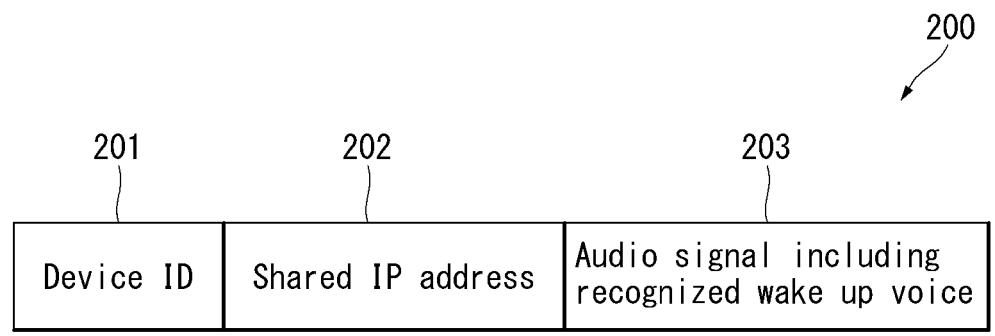
FIG. 45 is a block diagram of the configuration of device information according to the embodiment of the present disclosure.

FIG. 45 is a block diagram of the configuration of device information according to the embodiment of the present disclosure.

As shown in FIG. 45, according to an embodiment of the present disclosure, the device information 200 acquired from the router 20 by the voice enable device searching apparatus 3 may include the ID 201 of the corresponding device, the IP address 202 shared by the corresponding device, and the audio signal 203 generated from recognizing the wake-up voice by the corresponding device.

Figure 46:
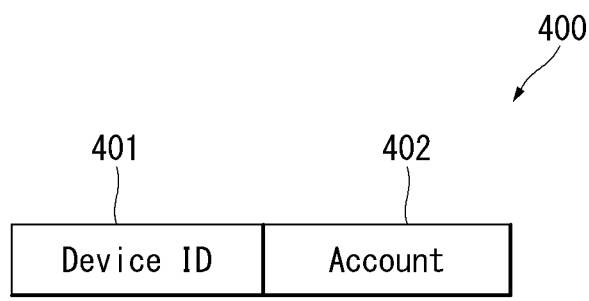
FIG. 46 is a block diagram showing the configuration of product registration information according to the embodiment of the present disclosure.

FIG. 46 is a block diagram showing the configuration of product registration information according to the embodiment of the present disclosure.

As shown in FIG. 46, according to an embodiment of the present disclosure, the product registration information 400 acquired from the product registration server 4 by the voice enable device searching apparatus 3 may include the device ID 401 of the device to be searched and the user account 402 to be searched.

Figure 47:
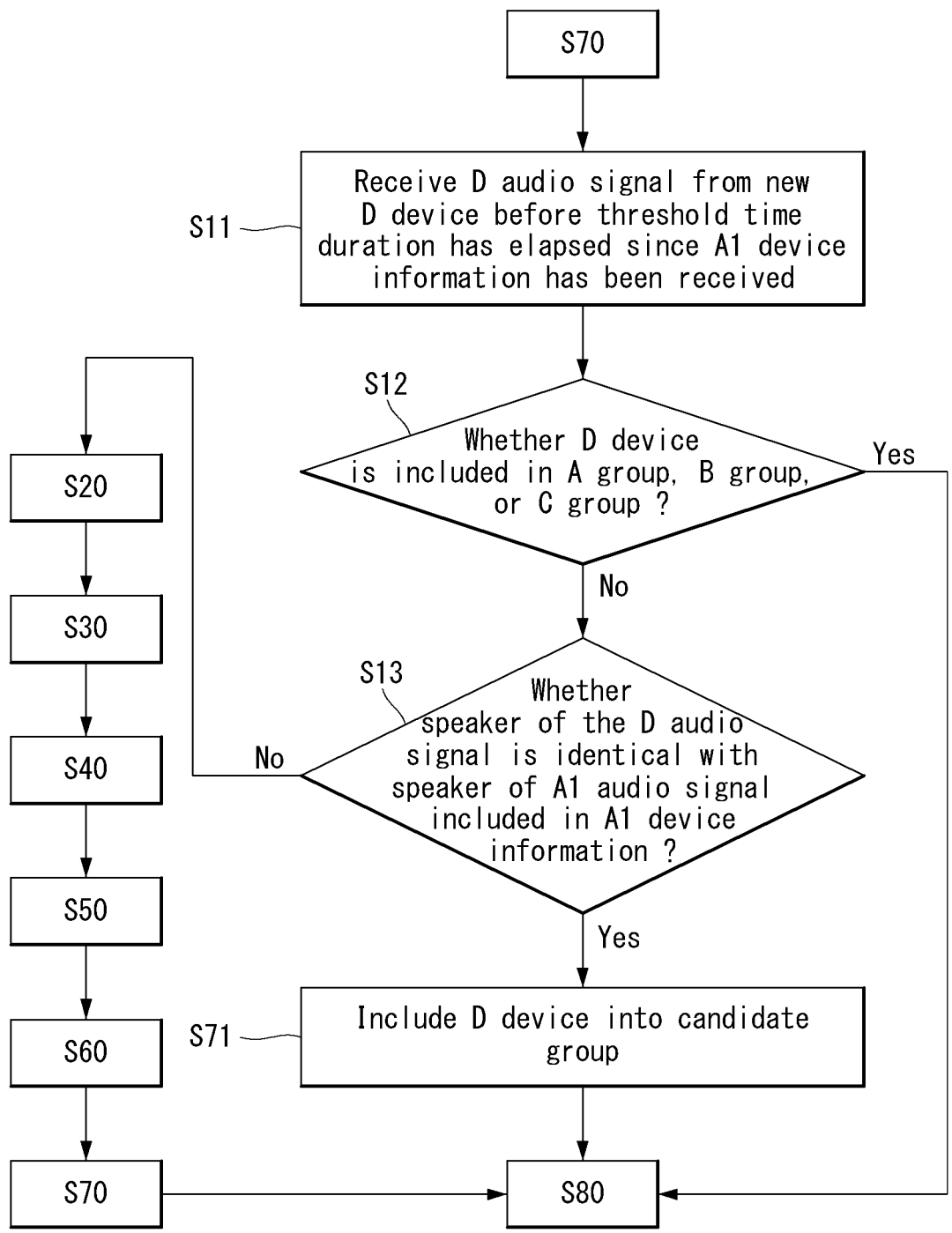
FIG. 47 is a flow chart illustrating a voice enable device searching method according to another embodiment of the present disclosure.

FIG. 47 is a flow chart illustrating a voice enable device searching method according to another embodiment of the present disclosure.

As shown in FIG. 47, according to an embodiment of the present disclosure, after the candidate group is created using the step S70 of FIG. 43, the voice enable device searching apparatus 3 may receive the D audio signal from the new D device before a threshold time duration has elapsed since the voice enable device searching apparatus 3 has received the A1 device information S11. For example, the threshold time duration may be configured by the user or the manufacturer. For example, the D audio signal may be an audio signal generated by the D device recognizing the wake-up voice. For example, the voice enable device searching apparatus 3 may receive not only the D audio signal from the D device but also the device ID of the D device or the IP address shared by the D device.

The voice enable device searching apparatus 3 may determine whether the D device is included in A group, B group, or C group S12. That is, the voice enable device searching apparatus 3 may determine whether the D device is included in the previously-searched A group, B group, or C group (or candidate group). For example, the voice enable device searching apparatus 3 determines whether the D device is associated with the same account as the A1 device, with the same account as the A2 device, or shares IP with the device of the A group or the device of the B group.

When from the determination result, the D device is included in the previously created candidate group (or A, B, C group), the voice enable device searching apparatus 3 may select a voice enable device to respond to the wake-up voice among the devices of the candidate group including the D device S80.

When from the determination result, the D device is not included in the previously created candidate group, the voice enable device searching apparatus 3 may determine whether the speaker of the D audio signal is the same as the speaker of the A1 audio signal included in the A1 device information S13. That is, the voice enable device searching apparatus 3 determines the similarity between the D audio signal and the A1 audio signal, and determines whether the determined similarity is lower than or equal to a predetermined threshold value. For example, the voice enable device searching apparatus 3 identifies the speaker of the D audio signal, and identifies the speaker of the A1 audio signal, and then determines the similarity between the speaker of the D audio signal and the speaker of the A1 audio signal. In this connection, the voice enable device searching apparatus 3 applies a GMM (Gaussian mixture model), SVM (Support Vector Machine) or DNN (Deep Neural Network) to the D audio signal and the A1 audio signal, thereby to obtain the similarity therebetween. For example, the voice enable device searching apparatus 3 applies a Gaussian mixture model to the D audio signal and the A1 audio signal to normalize the D audio signal and the A1 audio signal. Then, the voice enable device searching apparatus 3 inputs the normalized signals to a previously learned support vector machine or a previously learned deep network to obtain output values thereof. Thus, the similarity between the two audio signals may be obtained based on the output values.

When, from the determination result, the D audio signal and the A1 audio signal speaker are the same, the voice enable device searching apparatus 3 may include the D device into the previously created candidate group, and may select a voice enable device to respond to the wake-up voice within the updated candidate group.

In contrast, when the D audio signal and the A1 audio signal are different from each other, the voice enable device searching apparatus 3 may search a plurality of groups including a plurality of devices and a plurality of accounts related to the D device using the steps S20 to S70 as described with reference to FIG. 43. Specifically, the voice enable device searching apparatus 3 may search the D account associated with the D device via the product registration server 4 S20. Then, the voice enable device searching apparatus 3 may search the D group including the plurality of devices associated with the D account via the product registration server 4 S30. Then, the voice enable device searching apparatus 3 may search the E account linked with each device of the D group S40. The voice enable device searching apparatus 3 may search an E group that includes a plurality of devices registered in the E account via the product registration server 4 S50. The voice enable device searching apparatus 3 may then search an F group that includes at least one device that shares IP with a device of the D group or E group S60. Then, the voice enable device searching apparatus 3 may generate a new candidate group including the newly searched D, E, and F groups S70. Finally, the voice enable device searching apparatus 3 may select a voice enable device to respond to the wake-up voice in the newly created candidate groups D, E, F S80.

The present disclosure as described above may be implemented using a computer readable code on a medium on which a program is recorded. A computer readable medium may include any type of recording device that stores data that may be read by a computer system. Examples of the media that can be read by a computer include HDD (Hard Disk Drive), SSD (Solid State Disk), SDD (Silicon Disk Drive), ROM, RAM, CD-ROM, magnetic tape, floppy disk, optical data storage, etc. Further, a carrier wave, for example, in the form of transmission over the Internet may be used as the media. Accordingly, the detailed description above is to be considered in all respects only as illustrative and not in a limiting sense. The scope of the present disclosure should be determined by rational interpretation of the appended claims. All changes within the equivalent range of the present disclosure are included in the scope of the present disclosure.

The invention claimed is:

1. A method for searching a plurality of voice enable devices included in a single communication network, performed by a voice enable devices searching apparatus, the method comprising:
   receiving, by a transceiver included in the voice enable devices searching apparatus, first device information from a first device receiving a wake-up voice;
   searching, by a processor included in the voice enable devices searching apparatus, a first account associated with the first device based on the first device information;
   searching, by the processor, devices of a first group registered in the first account;
   searching, by the processor, a second account associated with a second device other than the first device among the devices of the first group;
   searching, by the processor, devices of a second group registered in the second account;
   searching, by the processor, devices of a third group sharing an IP address with the devices of the first group or the devices of the second group; and
   selecting, by the processor, a voice enable device to respond to the wake-up voice among the devices of the first group, the second group, and the third group.

2. The method of claim 1, wherein the first device information includes at least one of a device ID of the first device, an IP address shared by the first device, or a first audio signal generated by the first device recognizing the wake-up voice.

3. The method of claim 2, further comprising:
   receiving a second audio signal from a second device within a threshold time duration after receiving the first device information;
   based on the second device being included in the first group, the second group, or the third group, determining whether a speaker of the second audio signal is identical with a speaker of the first audio signal; and
   based on the speaker of the second audio signal being identical with the speaker of the first audio signal, selecting the voice enable device among the devices of the first group, the second group, and the second device.

4. The method of claim 3, further comprising:
   based on (i) the second device not being included in the first group, the second group, or the third group or (ii) the speaker of the second audio signal not being identical with the speaker of the first audio signal, generating a fourth group including the second device; and
   selecting a voice enable device to respond to the second audio signal among devices of the fourth group.

5. The method of claim 4, further comprising:
   searching a plurality of third accounts associated with the second device;
   searching a plurality of third devices registered in the plurality of third accounts;
   searching a plurality of fourth devices sharing an IP address with the plurality of third devices; and
   selecting a voice enable device to respond to the wake-up voice among the plurality of third devices and the plurality of fourth devices.

6. The method of claim 3, wherein determining whether the speaker of the second audio signal is identical with the speaker of the first audio signal includes applying Gaussian mixture model (GMM), support vector machine (SVM), or deep neural network (DNN) to the first audio signal and the second audio signal.

7. The method of claim 4, further comprising deleting each of the first group, the second group, the third group, and the fourth group after a threshold time duration has elapsed after each of the first group, the second group, the third group, and the fourth group has been generated.

8. An apparatus for searching a plurality of voice enable devices, the apparatus comprising:
a transceiver for receiving first device information from a first device receiving a wake-up voice;
a memory including at least one instruction; and
a processor executing the at least one instruction,
wherein executing the at least one instruction causes the processor to perform operations comprising:
searching a first account associated with the first device based on the first device information;
searching devices of a first group registered in the first account;
searching a second account associated with a second device other than the first device among the devices of the first group;
searching devices of a second group registered in the second account;
searching devices of a third group sharing an IP address with the devices of the first group or the devices of the second group; and
selecting a voice enable device to respond to the wake-up voice among the devices of the first group, the second group, and the third group.

9. The apparatus of claim 8, wherein the first device information includes at least one of a device ID of the first device, an IP address shared by the first device, or a first audio signal generated by the first device recognizing the wake-up voice.

10. The apparatus of claim 9, wherein the operations comprise:
receiving a second audio signal from a second device within a threshold time duration after receiving the first device information;
based on the second device being included in the first group, the second group, or the third group, determining whether a speaker of the second audio signal is identical with a speaker of the first audio signal; and
based on the speaker of the second audio signal being identical with the speaker of the first audio signal, selecting the voice enable device among the devices of the first group, the second group, and the second device.

11. The apparatus of claim 10, wherein the operations comprise:
based on (i) the second device not being included in the first group, the second group, or the third group or (ii) the speaker of the second audio signal not being identical with the speaker of the first audio signal, generating a fourth group including the second device; and
selecting a voice enable device to respond to the second audio signal among devices of the fourth group.

12. The apparatus of claim 11, wherein the operations comprise:
searching a plurality of third accounts associated with the second device;
searching a plurality of third devices registered in the plurality of third accounts;
searching a plurality of fourth devices sharing an IP address with the plurality of third devices; and
selecting a voice enable device to respond to the wake-up voice among the plurality of third devices and the plurality of fourth devices.

13. The apparatus of claim 12, wherein the operations comprise applying Gaussian mixture model (GMM), support vector machine (SVM), or deep neural network (DNN) to the first audio signal and the second audio signal.

14. The apparatus of claim 11, wherein the operations comprise deleting each of the first group, the second group, the third group and the fourth group after a threshold time duration has elapsed after each of the first group, the second group, the third group and the fourth group has been generated.

* * * * *